(12) United States Patent
Li et al.

(10) Patent No.: US 12,082,207 B2
(45) Date of Patent: Sep. 3, 2024

(54) UU BASED SIDELINK CONTROL FOR NR V2X

(71) Applicant: InterDigital Patent Holdings, Inc., Wilmington, DE (US)

(72) Inventors: Yifan Li, Conshohocken, PA (US); Pascal M. Adjakple, Great Neck, NY (US); Qing Li, Princeton Junction, NJ (US); Allan Y. Tsai, Boonton, NJ (US); Guodong Zhang, Woodbury, NY (US); Lakshmi R. Iyer, King of Prussia, PA (US); Mohamed Awadin, Plymouth Meeting, PA (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 609 days.

(21) Appl. No.: 17/279,173

(22) PCT Filed: Jul. 17, 2019

(86) PCT No.: PCT/US2019/042237
§ 371 (c)(1),
(2) Date: Mar. 24, 2021

(87) PCT Pub. No.: WO2020/068252
PCT Pub. Date: Apr. 2, 2020

(65) Prior Publication Data
US 2022/0007403 A1    Jan. 6, 2022

Related U.S. Application Data

(60) Provisional application No. 62/754,326, filed on Nov. 1, 2018, provisional application No. 62/737,257, filed on Sep. 27, 2018.

(51) Int. Cl.
*H04W 72/23* (2023.01)
*H04L 1/08* (2006.01)
(Continued)

(52) U.S. Cl.
CPC ............... *H04W 72/23* (2023.01); *H04L 1/08* (2013.01); *H04L 1/1812* (2013.01); *H04W 4/40* (2018.02)

(58) Field of Classification Search
CPC ........................... H04B 7/0417; H04W 72/12
(Continued)

(56) References Cited

U.S. PATENT DOCUMENTS

2014/0226552 A1    8/2014  Niu et al.
2017/0215183 A1    7/2017  Gulati et al.
(Continued)

FOREIGN PATENT DOCUMENTS

CN    103947142 A    7/2014
CN    107079437 A    8/2017
(Continued)

OTHER PUBLICATIONS

Third Generation Partnership Project (3GPP), "Study on enhancement of 3GPP Support for 5G V2X Services", Technical Specification Group Services and System Aspects, Release 15, 3GPP TR 22.886 V15.2.0, Jun. 2018, 58 pages.
(Continued)

*Primary Examiner* — Kiet M Doan
(74) *Attorney, Agent, or Firm* — Flaster Greenberg, P.C.

(57) ABSTRACT

Different sidelink resource configurations and allocation schemes may be controlled by an interface, such as the Uu interface. The radio resource control configurations may include dynamic assignment of broadcast sidelink transmission, unicast sidelink transmission, or group sidelink transmission. There may be radio resource control configured
(Continued)

static resource allocation for broadcast sidelink transmission, unicast sidelink transmission, or group sidelink transmission.

16 Claims, 29 Drawing Sheets

(51) Int. Cl.
*H04L 1/1812* (2023.01)
*H04W 4/40* (2018.01)
(58) Field of Classification Search
USPC .......................................... 455/522; 370/329
See application file for complete search history.

(56) References Cited

U.S. PATENT DOCUMENTS

| | | | |
|---|---|---|---|
| 2017/0347394 A1 | 11/2017 | Yasukawa et al. | |
| 2017/0359835 A1 | 12/2017 | Seo et al. | |
| 2018/0139724 A1 | 5/2018 | Loehr et al. | |
| 2018/0279218 A1* | 9/2018 | Park | H04W 48/20 |
| 2019/0230685 A1* | 7/2019 | Park | H04W 72/12 |
| 2019/0387501 A1* | 12/2019 | Park | H04L 5/005 |
| 2020/0068609 A1* | 2/2020 | Wang | H04W 72/02 |
| 2021/0377927 A1 | 12/2021 | Kusashima et al. | |

FOREIGN PATENT DOCUMENTS

| | | |
|---|---|---|
| CN | 107615844 A | 1/2018 |
| CN | 107733595 A | 2/2018 |
| EP | 3229551 A1 | 10/2017 |
| EP | 3273634 A1 | 1/2018 |
| JP | 2018-026624 A | 2/2018 |
| WO | 2014/076552 A2 | 5/2014 |
| WO | 2015/063186 A1 | 5/2015 |
| WO | 2016/076301 A1 | 5/2016 |
| WO | 2017/083388 A1 | 5/2017 |
| WO | WO 2018097947 A2 | 5/2018 |
| WO | 2018/145296 A1 | 8/2018 |
| WO | 2018/151637 A1 | 8/2018 |

OTHER PUBLICATIONS

Third Generation Partnership Project (3GPP), "Enhancement of 3GPP support for V2X scenarios", Technical Specification Group Services and System Aspects, Release 15, Stage 1, 3GPP TS 22.186 V15.3.0, Jun. 2018, 16 pages.

Third Generation Partnership Project (3GPP), "Evolved Universal Terrestrial Radio Access (E-UTRA), Physical Layer Procedures", Technical Specification Group Radio Access Network, Release 15, 3GPP TS 36.213 V15.2.0, Jun. 2018, 541 pages.

* cited by examiner

FIG. 2

| Symbol Number | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | D | D | D | X | ST | ST | ST | ST | ST | ST | X | SR | SR | SR |

←—————————————— One slot ——————————————→

FIG. 5

```
-- ASN1START
-- TAG-PSCCH-TIMEDOMAINRESOURCEALLOCATIONLIST-START

PSCCH-TimeDomainResourceAllocationList ::=   SEQUENCE (SIZE(1..maxNrofSL-PSCCH-Allocations)) OF
PSCCH-TimeDomainResourceAllocation PSCCH-TimeDomainResourceAllocation ::= SEQUENCE (
    kx                                  INTEGER(0..32)
    startSymbolAndLength                INTEGER (0..127)
    ...
}

-- TAG-PSCCH-TIMEDOMAINRESOURCEALLOCATIONLIST-STOP
-- ASN1STOP
```

FIG. 17

```
-- ASN1START
-- TAG-PSSCH-TIMEDOMAINRESOURCEALLOCATIONLIST-START

PSSCH-TimeDomainResourceAllocationList ::=    SEQUENCE (SIZE(1..maxNrofSL-PSSCH-Allocations)) OF
PSSCH-TimeDomainResourceAllocation PSSCH-TimeDomainResourceAllocation ::=    SEQUENCE (
    ky                              INTEGER(0..32)
    startSymbolAndLength            INTEGER (0..127)
    ...
}

-- TAG-PSSCH-TIMEDOMAINRESOURCEALLOCATIONLIST-STOP
-- ASN1STOP
```

FIG. 18

```
PSFCH-Resource ::=           SEQUENCE {
    psfch-ResourceId             PSFCH-ResourceId,
    startingPRB                  PRB-Id,
    intraSlotFrequencyHopping    ENUMERATED { enabled, disabled }
    secondHopPRB                 PRB-Id
    format                       CHOICE {
        format0                      PSFCH-format0,
        format1                      PSFCH-format1,
        ...
    }
}

PSFCH-ResourceId ::=         INTEGER (0..maxNrofPSFCH-Resources-1)

PSFCH-format0 ::=            SEQUENCE {
    initialCyclicShift           INTEGER(0..11),
    nrofSymbols                  INTEGER (1..2),
    startingSymbolIndex          INTEGER(0..13)
}

PSFCH-format1 ::=            SEQUENCE {
    nrofPRBs                     INTEGER (1..16),
    nrofSymbols                  INTEGER (1..2),
    startingSymbolIndex          INTEGER(0..13)
}
```

FIG. 19

UU BASED SIDELINK CONTROL FOR NR V2X

CROSS-REFERENCE TO RELATED APPLICATIONS

This application is the National Stage Application of International Patent Application No. PCT/US2019/042237, filed Jul. 17, 2019 which claims the benefit of U.S. Provisional Patent Application No. 62/737,257, filed on Sep. 27, 2018 and U.S. Provisional Patent Application No. 62/754,326, filed on Nov. 1, 2018, the contents of both are hereby incorporated by reference herein in their entirety.

BACKGROUND

As Vehicle-to-everything (V2X) applications making significant progress, transmission of short messages about vehicles' own status data for basic safety needs be extended with transmission of larger messages containing raw sensor data, vehicles' intention data, coordination, confirmation of future man oeuvre, etc. For these advanced applications, the expected requirements to meet the needed data rate, latency, reliability, communication range, and speed are made more stringent.

For enhanced V2X (eV2X) services, 3GPP has identified 25 use cases and the related requirements in TR 22.886 (GPP TR 22.886 Study on enhancement of 3GPP Support for 5G V2X Services, Release 15, V15.2.0.).

A set of the normative requirements are specified in TS 22.186 (GPP TS 22.186 Enhancement of 3GPP support for V2X scenarios (Stage 1), Release 15, V15.3.0) with the use cases categorized into four use case groups: vehicles platooning, extended sensors, advanced driving, and remote driving. The detailed description of performance requirements for each use case group specified in TS 22.186.

In Release 14 LTE V2X, basic requirements for V2X service have been supported for road safety service, e.g., support low latency and reliable exchange of messages among vehicles and the infrastructure to enhance safety and efficiency.

To satisfy the latency requirements and accommodate high Doppler spreads and high density of vehicles for V2X communications, sidelink transmission modes 3 and mode 4 have been specified in TS 36.213 (3GPP TS 36.213 Physical layer procedures, Release 15, V15.2.0).

Mode 3 uses the centralized eNB scheduler. The vehicular user equipment (UE) and eNB use the Uu interface to communicate. The eNB uses the downlink control information (DCI) format 5A to schedule the PSCCH and the PSSCH of the vehicular UE for sidelink communication.

In NR V2X, sidelink resource allocation mode 1 and mode 2 are agreed. In mode 1, the base station schedules the sidelink resources used by the UE for sidelink transmission. In mode 2, UE determines the sidelink resources used for sidelink transmission within the sidelink resources configured by the base station or pre-configured sidelink resources.

Mode 1 supports the gNB to assign the sidelink resources for both dedicated sidelink carrier and shared licensed carrier between Uu and sidelink through the Uu interface. The resources used for sidelink transmission may be dynamically allocated, or pre-configured by the RRC, or based on activation and deactivation.

SUMMARY

Disclosed herein are different sidelink resource configurations and allocation schemes which may be controlled by an interface, such as the Uu interface. For example, the following mechanisms for resource allocation on sidelink, which may be Uu based: 1) RRC configurations; 2) DCI signaling; 3) schedule the sidelink transmission; 4) designs of groupcast sidelink; or 5) measuring and reporting on the sidelink.

RRC configurations may include 1) dynamic resource assignment for broadcast, unicast, or group sidelink transmission; 2) RRC configured static resource allocation for broadcast, unicast, or group sidelink transmission; 3) activation/deactivation (e.g., activation or deactivation) based semi-persistent resource allocation for broadcast sidelink transmission; 4) activation/deactivation based semi-persistent resource allocation for unicast sidelink transmission; or 5) activation/deactivation based semi-persistent resource allocation for groupcast sidelink transmission, among other things.

Further disclosed are DCI signaling, gNB may schedule the sidelink transmission, designs of groupcast sidelink, and mechanisms of measuring and reporting on the sidelink, among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 2 illustrates an exemplary Slot Format for Sidelink;

FIG. 5 illustrates an exemplary of Slot Format for Unicast Sidelink;

FIG. 17 illustrates an exemplary PSCCH-TimeDomain-ResourceAllocationList information element;

FIG. 18 illustrates an exemplary PSSCH-TimeDomain-ResourceAllocationList information element;

FIG. 19 illustrates an exemplary RRC configuration PSFCH-Resource;

DETAILED DESCRIPTION

Figure 1:
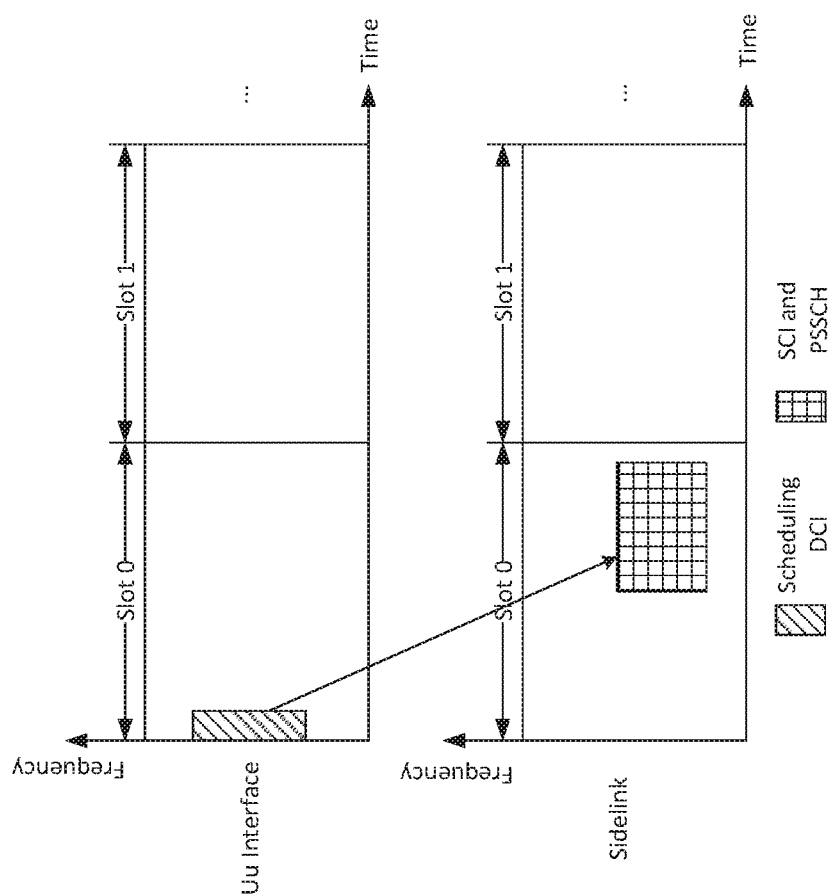
FIG. 1 illustrates an exemplary DCI scheduling the PSCCH and PSSCH.

Problem 1: In new radio (NR) V2X mode 1, the base station schedules the sidelink resources used by the UE for sidelink communication. NR V2X should support dynamic resource allocation, activation/deactivation based resource allocation, and RRC (pre-)configured resource allocation for the sidelink. Mechanisms need to be introduced to support aforementioned NR V2X resource allocation techniques.

In LTE mode 3, the time domain resources used for V2X sidelink transmission should be based on the pre-configured subframe resource pool. The granularity of the pool based resource allocation is in subframes. In NR V2X, both aperiodic and periodic traffic on the sidelink should be supported. Such subframe based resource allocation design may not fulfill the latency requirement. Therefore, enhancements are needed for Uu-based resource allocation to support lower latency.

Problem 2: In NR V2X mode 1, it should also support broadcast, groupcast, or unicastsidelink communication. In LTE V2X, only broadcast sidelink communication is supported. Therefore, mechanisms need to be introduced for allocating the resources for groupcast, or unicastsidelink communication in NR V2X. A UE may be configured with multiple resources for broadcast, groupcast, or unicastsidelink communication. When a UE receives the scheduling grant, the UE should be able to determine the received grant is used for which type of sidelink communication. Mechanisms need to be introduced to solve this problem.

A UE may be configured with multiple resources for broadcast, groupcast, or unicastsidelink communication. When a UE receives the scheduling grant, the UE should be able to determine the received grant is used for which type of sidelink communication. Mechanisms need to be introduced to solve this problem.

In LTE V2X, the receiver UE keeps on attempting to decode the Physical Sidelink Control Channel (PSCCH) at each candidate PSCCH resource configured by higher layers. While this is acceptable for LTE since V2X reception resources are relatively sparse in time, this may be very power inefficient in NR considering NR V2X requirements where the density of V2X reception monitoring opportunities may be much higher. For example, in NR V2X, a UE may be configured with multiple resources for broadcast, groupcast, and unicast sidelink communication. Additionally, the NR V2X reception resource configuration needs to account, not only for periodic traffic but also for aperiodic traffic which might require different resource sets to be configured. Therefore, the current design in LTE for receiving the PSCCH if applied to NR as is, may cause huge power consumption issue in NR, as the number of PSCCH blind decoding may drastically increase.

Disclosed herein are different sidelink resource configurations and allocation schemes which may be controlled by an interface, such as the Uu interface.

Uu Based Dynamic Resource Grant Assignment on Sidelink Broadcast Sidelink Transmission Broadcast Sidelink Transmission: In NR V2X, the gNB (e.g., gNB 201 of FIG. 3 or FIG. 9A) or gNB like node (e.g., base station) may dynamically assign the resources used by the UE (e.g., UE of FIG. 3 or FIG. 9A) for broadcast sidelink transmission. As disclosed herein, a UE may be assigned with the resources for broadcast sidelink transmission through the RRC configuration and DCI signaling. When a UE receives the scheduling DCI, the UE may broadcast the control and data using the scheduled resource on the sidelink. The detail resource assignment scheme is as follow.

Detail design for RRC configuration: A UE may be configured with one or multiple information elements (IEs), where each IE specifies configuration information for the resources for NR V2X sidelink transmission. To support the broadcast, groupcast, and unicast sidelink transmission in NR V2X, disclosed herein are different IEs, e.g., NR-SL-Resource-Broadcast, NR-SL-Resource-Groupcast, or NR-SL-Resource-Unicast may be used to configure the information of the resources for sidelink transmission; or the same IE (e.g., NR-SL-Resource) may be used where the type of sidelink transmission (e.g., broadcast, groupcast, or unicast) specified in the IE.

For broadcast sidelink transmission, the IE NR-SL-Resource or NR-SL-Resource-Broadcast may carry configuration information for the sidelink control or sidelink data transmission. A UE may be configured with the NR-SL-Resource or NR-SL-Resource-Broadcast through the broadcasted signal, e.g., OSI; or through common or the dedicated RRC configuration on the Uu interface. Disclosed herein, the IE NR-SL-Resource or NR-SL-Resource-Broadcast may carry the following RRC configuration: 1) type of sidelink transmission; 2) type of carrier; 3) numerology of the resource; 4) broadcast transmitting UE; 5) mask used for scrambling the scheduling DCI; 6) index of the candidate resource; 7) candidate time domain resources of the resource configuration; 8) number of the repetition and redundancy version; 9) candidate frequency domain resources of the resource configuration; or 10) beam sweeping, among others.

RRC configuration to indicate the type of the sidelink transmission. For example, RRC configuration NR-SL-CommuncationType which may be Broadcast, Groupcast, or Unicast if the same IE NR-SL-Resource is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz, etc. Or the numerology may be configured per BWP.

RRC configuration to indicate the broadcast transmitting UE sidelink ID on the sidelink. For broadcast sidelink transmission, a UE may be configured with UE ID on the sidelink as the source ID, or destination ID. For example, a UE may be configured with Sidelink Broadcast Transmission RNTI (SL-BT-RNTI) to be used as the source ID. A UE may be configured with Sidelink Broadcast Reception RNTI (SL-BR-RNTI) to be used as the destination ID where each destination ID may be associated with a different service.

When generating the sidelink control information (SCI) for broadcast sidelink transmission, the scrambling sequence for SCI may be jointly initialized by the source ID and the destination ID. Or the scrambling sequence for SCI may be initialized by one of the source ID and the destination ID with the other one is indicated in the SCI payload. For example, the destination ID is used to scramble the SCI and the source ID is carried by the SCI payload.

RRC configuration to indicate the mask used for scrambling the scheduling DCI. For example, a UE may be configured with a SLBroadcast-RNTI or a SL-RNTI. The gNB may generate and transmit the scheduling DCI for a UE with CRC scrambled by the configured SLBroadcast-RNTI or SL-RNTI. The UE may decode the DCI by using the configured SLBroadcast-RNTI or SL-RNTI.

RRC configuration to indicate the index of the candidate resource. A UE may be configured with multiple configurations of the resource for sidelink transmission, e.g., multiple resource pools. Each configuration of the resource may be associated with one dedicated resource index. For example, RRC configuration NR-SL-Resource-Index. The UE may determine the configuration of the resource to use for the sidelink transmission through the DCI scheduling the sidelink transmission.

RRC configuration to indicate the candidate time domain resources of the resource configuration, e.g., the time domain resources of each resource pool. As disclosed, the candidate time domain resources for broadcast sidelink transmission for each candidate resource may be configured with the following alternatives:

Alternative 1—the candidate time domain resources: A UE may be configured with one or multiple bitmaps by the RRC configuration to indicate the candidate time domain resources for sidelink transmission. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

When a UE receives the DCI carrying the scheduling grant of transmission on the sidelink, the UE may perform the transmission starting from the next available time resource within the configured candidate time resources. A minimum time gap constraint may be applied for the UE to switch from receiving mode to transmitting mode, the UE may perform the transmission starting from the next available time resource after the minimum time gap within the configured candidate time resources.

Or a UE may be configured with an offset value to indicate the time resource to be used for sidelink transmission within the configured candidate time resources. The offset value may be signaled by the DCI carrying the scheduling grant. The offset value may indicate the offset between the time resource for sidelink transmission and the time resource used for transmitting scheduling grant DCI; or the offset value may indicate the offset between the time resource for sidelink transmission and the next available time resource after the minimum time gap within the configured candidate time resources.

Alternative 2—the candidate time domain resources: A UE may be dynamically signaled by the DCI for the time resources used for broadcast sidelink transmission. The UE may not be configured with the candidate time domain resources through the RRC configuration. The DCI carrying the scheduling grant may indicate the time resources used for broadcast sidelink transmission.

RRC configuration to indicate the beam sweeping information. For Broadcast sidelink transmission, the transmitter UE 202 may broadcast the information to multiple directions using multiple beams. A UE need to be aware of the number of the beam sweeping it need to perform and the corresponding resources.

Alternative 1—beam sweeping information: The gNB may determine the number of the beam sweeping a UE should perform. For example, the UE may be configured with the number of or the maximum number of the beam sweeping through the RRC configuration. With another alternative, the number of the beam sweeping may be signaled by the DCI. The UE may provide assistance information to the node B (e.g., base station such as gNB or eNB) to assists the NB in determining the beam sweeping configuration. Such assistance information may include one or more of the following: the V2X service of interest, the UE capability for example in terms of the number of simultaneous beam sweeping direction the UE can cover, the UE scheduling preferences including power saving mode preference, etc.

Assume a UE is configured to broadcast the information through k directions/beams, the UE may be assigned with the k configurations of time and frequency resources, e.g., time and frequency resources for each direction/beam through RRC configuration and DCI signaling for beam sweeping of k directions respectively. If a UE need to broadcast on k directions, the UE need to usually form k beams (therefore directions/beams), each beam targeting to one direction. The UE can do beam sweeping of the k formed beams to cover all the directions.

Or the UE may be assigned with one configuration of time and frequency resources. With one possibility, the assigned time and frequency resources may be used for all the beams. The UE may evenly divide the assigned time resources into k parts and use each part for one beam. With another possibility, the assigned time and frequency resources may be used for one beam. For example, the UE may use the time resources across the beam sweeping directions as follows. In option 1 of this alternative 1 for beam sweeping, the UE may use the assigned time and frequency resources for the $1^{st}$ beam sweeping and use the next available time resources in the configured resource pool with the same time duration and same frequency resources as used for the $1^{st}$ beam sweeping is used for the rest of the beam sweeping. For example, assume a UE is configured with the time resources in mini slots and the UE is configured to use the mini slot n for the $1^{st}$ beam sweeping. The UE may use the mini slot n+1 to n+k−1 in the configured resource pool for the rest beam sweeping. The beams used for beam sweeping may be indicated by the gNB. Or the beams used for beam sweeping may be autonomously determined by the transmitter UE 202 based on the sensing or discovering. In Option 2 of this alternative 1 for beam sweeping, the UE may slice the time resources equally on a round robin basis across the beam sweeping directions, and may use the same 1 frequency resource in each direction. In Option 3 of this alternative 1 for beam sweeping, the UE may autonomously decide how to slice the time-frequency resources in both time domain and frequency domain across the beam sweeping direction.

Alternative 2—beam sweeping information: A UE may determine the number of the beam sweeping the UE need to perform for broadcast sidelink transmission. The UE may report the value of k beam sweeping to the gNB. gNB may schedule the time resources to the UE for the broadcast sidelink transmission.

The UE may be assigned with the k configurations of time and frequency resources through RRC configuration and DCI signaling for beam sweeping of k directions respectively. Or the UE may be assigned with one configuration of time and frequency resources. With one possibility, the assigned time and frequency resources may be used for all the beams. The UE may evenly divide the assigned time resources into k parts and use each part for one beam. With another possibility, the assigned time and frequency resources may be used for one beam. For example, the UE may use the assigned time and frequency resources for the $1^{st}$ beam sweeping and use the next available time resources in the configured resource pool for the rest of the beam sweeping with the same time duration and frequency resources as used for the $1^{st}$ beam sweeping. The beams used for beam sweeping may be indicated by the gNB. Or the beams used for beam sweeping may be autonomously determined by the transmitter UE 202 based on the sensing or discovering.

RRC configuration to indicate the candidate frequency domain resources of the resource configuration, e.g., the frequency domain resources of each resource pool. A UE may be configured with one or multiple SL-BWPs. Or the UE may be configured with one or multiple candidate frequency resources for broadcast sidelink transmission. We disclose the candidate frequency resources may be configured with the following alternatives:

Alternative 1—candidate frequency domain resources: A UE may be configured with contiguous frequency resources as the candidate frequency resource for the sidelink broadcast transmission. The frequency resources may be configured in RBs or may be configured in subchannels, e.g., in RBGs. For example, the UE may be configured with the parameters StartRB and LengthRB through the RRC configuration to indicate the starting and length value (SLV) of RB for the candidate frequency resource. Or the UE may be configured with the parameters StartRBG and LengthRBG through the RRC configuration to indicate the SLV of RBG for the candidate frequency resource. A UE may be configured with one candidate frequency resource for both the sidelink control information (SCI) transmission and sidelink data transmission. A UE may also be configured with two candidate frequency resources for the sidelink control information (SCI) transmission and sidelink data transmission respectively, e.g., StartRBG-PSCCH, LengthRBG-PSCCH and StartRBG-PSSCH, LengthRBG-PSSCH.

Alternative 2—candidate frequency domain resources: A UE may be configured with non-contiguous frequency resources as the candidate frequency resource for the sidelink broadcast transmission. The frequency resources may be configured in RBs or may be configured in subchannels, e.g., in RBGs. The non-contiguous frequency resources may be configured by multiple SLVs. For example, StartRBG_1 and LengthRBG_1, StartRBG_2 and LengthRBG_2, . . . , StartRBG_m and LengthRBG_m. Or the non-contiguous frequency resources may be configured by the starting value and the bitmap. For example, StartRBG and $\{b_{m-1}, \ldots, b_1, b_0\}$. Assume a UE is configured with StartRBG set to be k, $b_{m-1}$ is mapped to RBG k and $b_0$ is mapped to RBG k+m.

For the alternatives above, the UE may provide assistance information, for example in Sidelink UE Information message or in UE Assistance Information message or similar messages, to assist the NB to properly configure the UE. Such assistance information may include information such as UE capability, carrier frequency in which UE is interested in transmitting or receiving V2X communication or is interested in performing V2X discovery; V2X services the UE is interested in, the specific BWPs within a carrier frequency the UE is interested in transmitting or receiving V2X communication on or is interested in performing V2X discovery in. It should be noted that in LTE, the procedure may be used to inform E-UTRAN of the UE's power saving preference and SPS assistance information, maximum Physical Downlink Shared Channel/Physical Uplink Shared Channel (PDSCH/PUSCH) bandwidth configuration preference, etc, while sidelink UE information message if used to inform NB that the UE is interested or no longer interested to receive sidelink communication or discovery, to receive V2X sidelink communication, as well as to request assignment or release of transmission resources for V2X sidelink communication, V2X sidelink discovery gap, etc.

Note the aforementioned RRC configurations may be configured through the IE NR-SL-Resource or NR-SL-Resource-Broadcast, or some of the aforementioned RRC configurations may be configured by other IEs used for sidelink configuration.

Detail design for DCI signaling: A UE may be dynamically signaled with the scheduling grant through the DCI for the broadcast sidelink transmission. For example, a new DCI format, e.g., DCI format 3, may be used for scheduling the PSCCH and Physical Sidelink Shared Channel (PSSCH) for the broadcast sidelink transmission. To support dynamically scheduling the resource for broadcast, groupcast, or unicast sidelink transmission, gNB may transmit the scheduling DCI dynamically. To distinguish the scheduling DCI, different RNTIs may be used to scramble the CRC of the DCI for scheduling broadcast, groupcast, or unicast sidelink transmission. For example, SLBroadcast-RNTI, SLGroup-RNTI, SLUnicast-RNTI may be used to scramble the CRC of the DCI for scheduling broadcast, groupcast, or unicast respectively. A UE may be configured with SLBroadcast-RNTI, SLGroup-RNTI, SLUnicast-RNTI through the RRC configuration.

As an alternative, one RNTI may be used to scramble the Cyclic Redundancy Check (CRC) of the DCI for scheduling broadcast, groupcast, or unicast sidelink transmission. For example, the same RNTI, e.g., SL-RNTI, may be used to scramble the CRC of the DCI for scheduling broadcast, groupcast, or unicast. A field in the scheduling DCI may be used to indicate the DCI is used for scheduling the broadcast, groupcast, or unicast.

To schedule the resource for broadcast sidelink transmission, we disclose the scheduling DCI may carry the following information: 1) BWP indicator field; 2) resource indicator field; 3) sidelink type indicator field; 4) carrier type indicator field: 5) time domain resource management field; 6) beam sweeping information field; 7) frequency domain resource assignment field; or 8) slot format indicator (SFI) field, among others.

Bandwidth part (BWP) indicator field. A UE may be configured with multiple BWPs through the RRC configuration for sidelink communication. The scheduling DCI may indicate the BWP to be used for broadcast sidelink transmission. Or the scheduling DCI may indicate a UE to switch from current BWP to a new BWP. The BWP indicator field may indicate the index of the BWP the UE need to perform the broadcast sidelink transmission or the UE need to switch to. Assume a UE is configured with 4 BWPs, 2 bits BWP indicator field may be used with '00' indicating the first configured BWP, '01' indicating the second configured BWP, etc. Some fields may be dedicated in the bitmap and used to indicate initial BWP and the default BWP. For e.g., '00' may indicate the initial BWP, used for e.g. for discovery and synchronization. Alternatively, "00" may indicate default BWP. Yet in another alternative, "00" may indicate the initial BWP while "01" may indicate the default BWP.

Resource indicator field. A UE may be configured with multiple configurations of resources through the RRC, e.g., multiple resource pools. The scheduling DCI may indicate the index of the configuration of resources to be used for broadcast sidelink transmission. Assume a UE is configured with 8 configurations of resources, e.g., configuration 0 to configuration 7, 3 bits resource indicator field may be used with '000' indicating configuration 0, '001' indicating configuration 1, etc.

Sidelink type indicator field. The scheduling DCI may indicate the type of sidelink transmission. For example, 2 bits sidelink type indicator field may be used with '00' indicating the DCI is scheduling broadcast sidelink transmission, '01' indicating the DCI is scheduling groupcast sidelink transmission, '10' indicating the DCI is scheduling unicast sidelink transmission etc.

Carrier type indicator field. A UE may be dynamically indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Time domain resource assignment field. A UE may be signaled with the scheduled time domain resource through the DCI with following alternatives.

Alternative 1—time domain resource assignment: A UE may be configured with one or multiple candidate resources through the RRC configuration. The scheduling DCI may indicate the time domain resource to be used for broadcast sidelink transmission among the candidate resources.

To determine the starting of the time domain resource, a UE may be signaled with a time offset indicator. For example, a time offset value field may be carried by the scheduling DCI to indicate the number of time unit between the scheduling DCI and the scheduled time domain resource for broadcast sidelink transmission. The time unit may be in subframes, in slots, in mini-slots, or in symbols. Or a UE may be indicated with two level time offset to determine the starting point of the time domain resource. For example, a UE may be indicated with the slot/subframe (in other words slot or subframe) offset to determine the time domain resource is started from which slot/subframe. Then the UE may be indicated with index of the starting symbol/mini-slot (in other words slot or mini-slot) to determine the starting point within the slot/subframe. In one example, the two level time offset may be indicted by two DCI fields separately, e.g., through slot level offset indictor field and starting symbol indicator field.

In another example, the two level time offset may be indicted by one DCI field. For example, a table may include the combinations of the slot level offset and the starting symbol may be pre-defined or (pre)-configured by the RRC configuration with each combination associated with an index. A UE may be signaled by the scheduling DCI with one index through the DCI field. The UE may determine the time domain starting point by finding the corresponding two level offset from the table. The examples shown here may be also applied to dynamic resource allocation for groupcast sidelink transmission or unicast sidelink transmission.

To determine the duration of the time domain resources, a bitmap or the length of the duration may be indicated by the scheduling DCI. In an example, a UE may be signaled with a bitmap. The bitmap may indicate which time resources within the radio resource control (RRC) configured candidate resources are used for broadcast sidelink transmission. In another example, a UE may be signaled with the length of the time domain resource, e.g., 1. Then the UE may use the l contiguous resource units within the RRC configured candidate resources for broadcast sidelink transmission. The resource unit may be in subframes, in slots, in mini-slots, or in symbols.

The fields for indicating the starting and the duration of the time domain resource may also be signal through one DCI field. For example, a predefined or pre-configured table may contain the combinations of the starting and the duration of time domain resource with each combination associated with an index. A UE may be signaled by the scheduling DCI with one index through one DCI field. The UE may determine the time domain resource by finding the corresponding starting or duration values from the table.

Alternative 2—time domain resource assignment: A UE may not be configured with candidate resources through the RRC configuration. the UE may be dynamically indicated with time domain resource for broadcast sidelink transmission by the scheduling DCI. The DCI may carry the information such as slot/subframe offset, starting point, duration of the time domain resource, etc. The slot/subframe offset may be with respect to the slot/subframe used for DCI reception. The aforementioned parameters may be indicated by different DCI fields or may be jointly indicated by the DCI field. For example, the time domain resource may be dynamically signaled by the slot/subframe offset value and SLV through the scheduling DCI only.

For broadcast sidelink transmission, a UE may send the same information to multiple directions. The UE may be indicated with one time domain resource and determine the time domain resources for all the direction by some pre-defined rules. Or the UE may be indicated with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For broadcast sidelink transmission, the scheduling DCI may indicate the time domain resources for PSCCH or PSSCH as shown in FIG. 1. The time domain resource for PSCCH or PSSCH may be jointly assigned by the scheduling DCI, e.g., one time domain resource assignment may be used for PSCCH or PSSCH. For example, in one approach, a UE may receive one time domain resource assignment indicating the resources for PSCCH and PSSCH. When the PSCCH and PSSCH are FDM-ed, the UE may transmit the PSCCH and PSSCH on the allocated time resources using different frequency resources.

When the PSCCH or PSSCH are TDM-ed or transmitted on different time resources, the UE may determine the time resources for PSCCH or PSSCH within the scheduled time resources respectively. For example, a UE may be statically configured by the RRC or dynamically indicated by the scheduling DCI with the number of symbols that the PSCCH spans, e.g., k symbols. Then the UE may use the first k symbols to transmit the PSCCH and use the rest of the symbols to transmit the PSSCH in the assigned time resources if the PSCCH and PSSCH are TDM-ed. Or if the bandwidth of the PSCCH is smaller than the bandwidth of the PSSCH, the UE may transmit the PSCCH and PSSCH according to the frequency domain resource allocation using the first k symbols and transmit PSSCH using the rest symbols in the assigned time resources.

In another approach, a UE may receive one time domain resource assignment indicating the resources for PSSCH and the UE determines the time domain resources for PSCCH correspondingly or vice versa. The scheduled PSCCH and PSSCH may be in the same slot or may be in different slots. For example, a UE may be statically configured with the offset between the PSCCH and PSSCH by the RRC configuration, where the RRC configuration may include both slot level offset, or symbol level offset. The UE may be indicated by the scheduling DCI with the time domain resource allocation for the PSSCH and determines the time domain resources for the associated PSCCH based on the configured offset(s). The examples shown here may be also applied to dynamic resource allocation for groupcast sidelink transmission and unicast sidelink transmission.

Or the time domain resource for PSCCH and PSSCH may be assigned separately by the scheduling DCI. For example, the scheduling DCI may assign two time domain resources for PSCCH and PSSCH respectively. For example, a DCI field for time domain resource allocation for PSCCH and a DCI field for time domain resource allocation for PSSCH, where each field may indicate an index corresponding to an entry in the RRC configuration. For example, a UE may be RRC configured with the information element PSCCH_AllocationList and the information element PSSCH_AllocationList separately.

The information element PSCCH_AllocationList may contain a list of (one or multiple of) the configured time domain resource allocations for PSCCH, e.g., a list of information element PSCCH_TimeDomainResourceAllocation, where each indexed row configures the slot offset between the scheduling DCI and the scheduled PSCCH (e.g., kx), start and length indicator SLIV and etc. An example of the information element PSCCH-TimeDomainResourceAllocationList is shown in FIG. 17. Assume 3 bits are used in the PSCCH time domain resource allocation field, an example is shown in Table 1. The examples shown here for PSCCH may be also applied to dynamic resource allocation for groupcast sidelink transmission and unicast sidelink transmission.

In groupcast sidelink transmission or unicast sidelink transmission scenarios, 2 stages SCI may be used. In the scenario that 2 stages SCI is used, a UE may be explicitly indicated/configured (in other words indicated or configured) with time domain resource allocation for the transmission of $1^{st}$ stage SCI, e.g., through DCI field first stage PSCCH time domain resource allocation field and the information element First_Stage_PSCCH_TimeDomainResourceAllocation. In this case, the slot offset kx represents the slot offset between the scheduling DCI and the scheduled $1^{st}$ stage PSCCH. The UE may be jointly indicated with the time domain resource allocation for the transmission of $2^{nd}$ stage SCI and PSSCH, e.g., through DCI field PSSCH time domain resource allocation field. Then the UE may derive the time domain resources used for $2^{nd}$ stage SCI transmission or the time domain resources used for PSSCH transmission from the received PSSCH time domain resource allocation field using the methods provided above, for example.

TABLE 1

Example of PSCCH time domain resource allocation field

| Value of PSCCH time domain resource allocation field | Time domain resource allocation |
|---|---|
| 000 | $1^{st}$ PSCCH-TimeDomainResourceAllocation in the PSCCH-TimeDomainResourceAllocationList |
| 001 | $2^{nd}$ PSCCH-TimeDomainResourceAllocation in the PSCCH-TimeDomainResourceAllocationList |
| . . . | . . . |
| 111 | $8^{th}$ PSCCH-TimeDomainResourceAllocation in the PSCCH-TimeDomainResourceAllocationList |

The information element PSSCH_AllocationList may include a list of (one or multiple of) the configured time domain resource allocations for PSSCH, e.g., a list of information element PSSCH_TimeDomainResourceAllocation, where each indexed row configures the slot offset (e.g., ky), start and length indicator start and length indicator value (SLIV) and etc. For the slot offset ky, in one approach, it may be the slot offset between the scheduling DCI and the scheduled PSSCH. In another approach, the slot offset ky may be the slot offset between the scheduled PSCCH and the scheduled PSSCH. An example of the information element PSSCH-TimeDomainResourceAllocationList is shown in FIG. 18. Assume 4 bits are used in the PSSCH time domain resource allocation field, an example is shown in Table 2. The examples shown here may be also applied to dynamic resource allocation for groupcast sidelink transmission and unicast sidelink transmission.

In groupcast sidelink transmission or unicast sidelink transmission scenarios, 2 stages SCI may be used. In the scenario that 2 stages SCI is used, the slot offset ky may be the slot offset between the scheduled $1^{st}$ stage PSCCH transmission and the scheduled PSSCH transmission; or may be the slot offset between the scheduled 1$^{st}$ stage PSCCH transmission and the transmission of jointly scheduled 2$^{nd}$ stage PSCCH and PSSCH.

TABLE 2

Example of PSSCH time domain resource allocation field

| Value of PSSCH time domain resource allocation field | Time domain resource allocation |
| --- | --- |
| 0000 | 1$^{st}$ PSSCH-TimeDomainResourceAllocation in the PSSCH-TimeDomainResourceAllocationList |
| 0001 | 2$^{nd}$ PSSCH-TimeDomainResourceAllocation in the PSSCH-TimeDomainResourceAllocationList |
| . . . | . . . |
| 1111 | 16$^{th}$ PSSCH-TimeDomainResourceAllocation in the PSSCH-TimeDomainResourceAllocationList |

Beam sweeping information field. The scheduling DCI may indicate the number of the beam sweeping a UE may need to perform. The UE may be dynamically signaled with the value of the number of the beam sweeping by the scheduling DCI. Or the RRC may configure multiple potential values of the number of the beam sweeping where each value is associated with an index. The UE may be signaled with one index and determine the values of the number of the beam sweeping. The beams used for beam sweeping may be indicated by the gNB. Or the beams used for beam sweeping may be autonomously determined by the transmitter UE 202 based on the sensing or discovering.

Frequency domain resource assignment field. To determine the frequency domain resource for broadcast sidelink transmission, a UE may be indicated with the information of the lowest resource block (RB), resource block group (RBG), or subchannel to be used. A UE may be signaled with the index of the lowest RB, RBG, or subchannel. Or the UE may be signaled with the offset between the lowest RB, RBG, or subchannel of the frequency domain resource assignment and the lowest RB, RBG, or subchannel of the RRC configured candidate frequency domain resources. The offset may be in RBs, in RBGs, or subchannels.

To determine the range of the frequency domain resources, a bitmap or the width of the frequency domain resource may be indicated by the scheduling DCI. For one example, a UE may be signaled with a bitmap. The bitmap indicates which frequency resources within the RRC configured candidate frequency resources are used for broadcast sidelink transmission. For another example, a UE may be signaled with the width of the frequency domain resource, e.g., w. Then the UE may use the w contiguous RB, RBG, or subchannel for broadcast sidelink transmission.

For broadcast sidelink transmission, a UE may send the same information to multiple directions. The UE may be indicated with one frequency domain resource and use the same frequency domain resource for the transmission of all the directions. Or a UE may be signaled with different frequency domain resources for the transmission of different directions respectively.

For broadcast sidelink transmission, the scheduling DCI may indicate the frequency domain resources for both PSCCH or PSSCH. The frequency domain resource for PSCCH and PSSCH may be jointly assigned by the scheduling DCI, e.g., one frequency domain resource assignment may be used for both PSCCH and PSSCH. Or the frequency domain resource for PSCCH or PSSCH may be assigned separately by the scheduling DCI. For example, the scheduling DCI may assign two frequency domain resources for PSCCH or PSSCH respectively.

Figure 2:
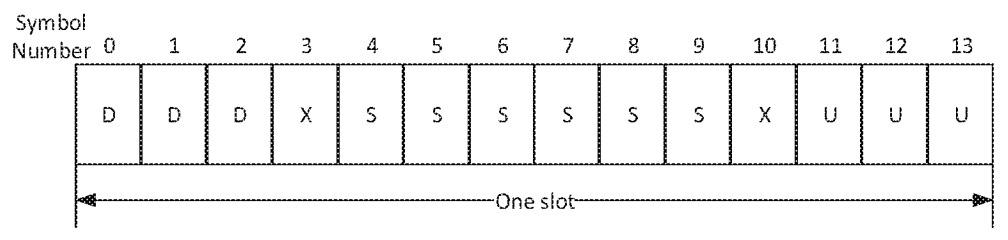

Slot format indicator (SFI) field. The SFI may be introduced to support sidelink transmission as shown in FIG. 2. Within a slot, the symbols used for sidelink transmission may be labeled as 'S'. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'. The symbols labeled as 'X' may be used as gap for switching the transmission and reception mode for the UE.

If there is conflict between the RRC configured candidate time resource and the DCI signaled SFI, the DCI may overwrite the RRC configuration. The UE may skip the conflict symbols and not perform sidelink transmission on them. For example, assume the symbol k in slot m is configured as the candidate time resource in the RRC configuration. If the symbol k in slot m is labeled as 'D' in the SFI, the UE may not treat the symbol k in slot m as candidate time resource. When the UE determines the time resource for broadcast sidelink transmission, the UE may skip the symbol k in slot m. If the candidate time resource is in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Unicast Sidelink Transmission

Unicast Sidelink Transmission: In NR V2X, the gNB or gNB like node may dynamically assign the resources used by the UE for unicast sidelink communication. For the transmitter UE 202, a UE may be assigned with the resources for unicast sidelink transmission through the RRC configuration and DCI signaling. For the receiver UE 203, a UE may be assigned with the resources for unicast sidelink reception through the RRC configuration and DCI signaling. When the gNB schedule a transmission on the sidelink, the transmitter UE 202 or receiver UE 203 may receive the scheduling grant. By receiving the scheduling grant, the transmitter may determine the resources and the beam used for transmission. By receiving the scheduling grant, the receiver UE 203 may determine the resources or the beam used for reception. The similar idea may apply to groupcast sidelink transmission as well. The detail resource assignment scheme is as follow.

Detail design for RRC configuration: For unicast sidelink transmission, the IE NR-SL-Resource or NR-SL-Resource-Unicast may carry configuration information for both the sidelink control and sidelink data transmission. A UE may be configured with the NR-SL-Resource or NR-SL-Resource-Unicast through the broadcasted signal, e.g., OSI; or through the common or dedicated RRC configuration on the Uu interface. The IE NR-SL-Resource or NR-SL-Resource-Unicast may carry the following RRC configuration: 1) type of sidelink transmission; 2) type of carrier; 3) numerology of the resource; 4) broadcast transmitting UE; 5) mask used for scrambling the scheduling DCI; 6) index of the candidate resource; 7) candidate time domain resources of the resource configuration; 8) number of the repetition and redundancy version; or 9) candidate frequency domain resources of the resource configuration, among others.

RRC configuration to indicate the type of the sidelink transmission. For example, RRC configuration NR-SL- CommuncationType which may be Broadcast, Groupcast, or unicast if the same IE NR-SL-Resource is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz, etc.

RRC configuration to indicate the unicast UE ID on the sidelink. For unicast sidelink communication, a UE may be configured with a UE ID, e.g., Sidelink Unicast RNTI (SL-U-RNTI). For a transmitter UE 202, the UE may use SL-U-RNTI as the source ID. For a receiver UE 203, the UE may use SL-U-RNTI as the destination ID.

To perform the unicast sidelink communication, a UE need to know the information of the paired UE. For a transmitter UE 202, the ID of the paired UE is the destination ID. For a receiver UE 203, the ID of the paired UE is the source ID. The UE may be indicated with the ID of the paired UE, e.g., Sidelink Unicast Paired RNTI (SL-UP-RNTI), through the RRC configuration or through the scheduling DCI.

When generating the SCI for unicast sidelink transmission, the scrambling sequence for SCI may be jointly initialized by the source ID and the destination ID. Or the scrambling sequence for SCI may be initialized by one of the source ID and the destination ID with the other one is indicated in the SCI payload. For example, the destination ID is used to scramble the SCI and the source ID is carried by the SCI payload.

RRC configuration to indicate the mask used for scrambling the scheduling DCI. For example, a UE may be configured with a SLUnicast-RNTI or a SL-RNTL The gNB may generate and transmit the scheduling DCI for a UE with CRC scrambled by the configured SLUnicast-RNTI or SL-RNTI. The may decode the DCI by using the configured SLUnicast-RNTI or SL-RNTI.

RRC configuration to indicate the index of the candidate resource. A UE may be configured with multiple configurations of the resource for sidelink transmission, e.g., multiple resource pools. Each configuration of the resource may be associated with one dedicated resource index. For example, RRC configuration NR-SL-Resource-Index. The UE may determine the configuration of the resource to use for the sidelink transmission through the DCI scheduling the sidelink transmission.

RRC configuration to indicate the candidate time domain resources of the resource configuration, e.g., the time domain resources of each resource pool. As disclosed, the candidate time domain resources for unicast sidelink transmission for each candidate resource may be configured with the following alternatives:

Alternative 1—the candidate time domain resources: A UE may be configured with one or multiple bitmaps by the RRC configuration to indicate the candidate time domain resources for sidelink transmission. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

When a UE receives the DCI carrying the scheduling grant of transmission on the sidelink, the UE may perform the transmission starting from the next available time resource within the configured candidate time resources. A minimum time gap constrain may be applied for the UE to switch from receiving mode to transmitting mode, the UE may perform the transmission starting from the next available time resource after the minimum time gap within the configured candidate time resources.

Or a UE may be configured with an offset value to indicate the time resource to be used for sidelink transmission within the configured candidate time resources. The offset value may be signaled by the DCI carrying the scheduling grant. The offset value may indicate the offset between the time resource for sidelink transmission and the time resource used for transmitting scheduling grant DCI; or the offset value may indicate the offset between the time resource for sidelink transmission and the next available time resource after the minimum time gap within the configured candidate time resources.

Alternative 2—the candidate time domain resources: A UE may be dynamically signaled by the DCI for the time resources used for unicast sidelink transmission. The UE may not be configured with the candidate time domain resources through the RRC configuration. The DCI carrying the scheduling grant may indicate the time resources used for unicast sidelink transmission.

RRC configuration to indicate the number of the repetition and redundancy version (RV). To improve the reliability, a UE may repeat the unicast sidelink transmission. The UE may be configured with the number of the repetition and RVs by the gNB through the RRC configuration. In one example, a UE may be configured with one repetition number (e.g., k) in the RRC configuration. In another example, a UE may be configured with multiple repetition numbers (e.g., $k_1, k_2, \ldots, k_i$) in the RRC configuration. A log 2(i) bits repetition indicator field may be signaled by the scheduling DCI to indicate the UE the number of repetitions for the scheduled the transmission.

Assume i=4, an example of the repetition indicator filed is shown in Table 3. In the example shown in Table 3, when repetition indicator field is set to '00', it indicates the number of repetitions is $k_1$. In another example, when repetition indicator field is set to '00', it indicates that no repetition is performed by the UE; and '01', '10', '11' indicate the number of repetitions is $k_1, k_2, k_3$, respectively. Similar idea may be applied to the groupcast sidelink transmission and broadcast sidelink transmission. When a UE repeat the initial transmission, inter-slot repetition or intra-slot repetition may be performed. The UE may use the same symbols or mini-slot in the following slots for repetition. Assume the initial transmission is scheduled in slot n, in one example, the UE may transmit the k repetitions in slot n+1, slot n+2, . . . , slot n+k; in another example, the UE may transmit the k repetitions in slot n+m, slot n+2*m, . . . , slot n+k*m where m is the gap between the initial transmission and the first repetition.

In this example, m is in unit of slot. In another example, m may be in unit of mini-slot or in unit of symbol. The value of m may be configured by the RRC configuration, e.g., along with the RRC configuration configuring the number of the repetition and redundancy version; or the value of m may be dynamically signaled by the scheduling DCI. Or the UE may use the symbols or mini-slots in the same slot for the repetition.

TABLE 3

Example of Repetition Indictor Field

| Value of repetition indicator field | Repetition number |
|---|---|
| 00 | $k_1$ |
| 01 | $k_2$ |
| 10 | $k_3$ |
| 11 | $k_4$ |

RRC configuration to indicate the candidate frequency domain resources of the resource configuration, e.g., the frequency domain resources of each resource pool. A UE may be configured with one or multiple SL-BWPs. Or the UE may be configured with one or multiple candidate frequency resources for unicast sidelink transmission. We disclose the candidate frequency resources may be configured with the following alternatives:

Alternative 1—candidate frequency domain resources: A UE may be configured with contiguous frequency resources as the candidate frequency resource for the sidelink unicast transmission. The frequency resources may be configured in RBs or may be configured in subchannels, e.g., in RBGs. For example, the UE may be configured with the parameters StartRB and LengthRB through the RRC configuration to indicate the starting and length value (SLV) of RB for the candidate frequency resource. Or the UE may be configured with the parameters StartRBG and LengthRBG through the RRC configuration to indicate the SLV of RBG for the candidate frequency resource. A UE may be configured with one candidate frequency resource for both the sidelink control information (SCI) transmission and sidelink data transmission. A UE may also be configured with two candidate frequency resources for the sidelink control information (SCI) transmission and sidelink data transmission respectively, e.g., StartRBG-PSCCH, LengthRBG-PSCCH and StartRBG-PSSCH, LengthRBG-PSSCH.

Alternative 2—candidate frequency domain resources: A UE may be configured with non-contiguous frequency resources as the candidate frequency resource for the sidelink unicast transmission. The frequency resources may be configured in RBs or may be configured in subchannels, e.g., in RBGs. The non-contiguous frequency resources may be configured by multiple SLVs. For example, StartRBG_1 and LengthRBG_1, StartRBG_2 and LengthRBG_2, . . . , StartRBG_m and LengthRBG_m. Or the non-contiguous frequency resources may be configured by the starting value and the bitmap. For example, StartRBG and $\{b_{m-1}, \ldots, b_1, b_0\}$. Assume a UE is configured with StartRBG set to be k, $b_{m-1}$ is mapped to RBG k and $b_0$ is mapped to RBG k+m.

For the alternative above, the UE may provide assistance information, for example in Sidelink UE Information message or in UE Assistance Information message or similar messages, to assist the NB to properly configure the UE. Such assistance information may include information such as UE capability, carrier frequency in which UE is interested in transmitting or receiving V2X communication or is interested in performing V2X discovery; V2X services the UE is interested in, the specific BWPs within a carrier frequency the UE is interested in transmitting or receiving V2X communication on or is interested in performing V2X discovery in. It should be noted that in LTE, the procedure may be used to inform E-UTRAN of the UE's power saving preference and SPS assistance information, maximum PDSCH/PUSCH bandwidth configuration preference, etc., while Sidelink UE Information message if used to inform NB that the UE is interested or no longer interested to receive sidelink communication or discovery, to receive V2X sidelink communication, as well as to request assignment or release of transmission resources for V2X sidelink communication, V2X sidelink discovery gap, etc.

Note the aforementioned RRC configurations may be configured through the IE NR-SL-Resource or NR-SL-Resource-Unicast, or some of the aforementioned RRC configurations may be configured by other IEs used for sidelink configuration.

Detail design for DCI signaling: A UE may be dynamically signaled with the scheduling grant through the DCI for the unicast sidelink transmission. For example, a new DCI format, e.g., DCI format 3, may be used for scheduling the PSCCH or PSSCH for the unicast sidelink transmission. To schedule the resource for unicast sidelink transmission, we disclose the scheduling DCI may carry the following information: 1) BWP indicator field; 2) resource indicator field; 3) sidelink type indicator field; 4) carrier type indicator field: 5) Transmission/reception indicator field; 6) Sidelink UE ID field; 7) Paired UE ID field; 8) time domain resource assignment field; 9) Retransmission field; 10) HARQ field; 11) CSI acquisition and report field; 12) Frequency domain resource assignment field; or 13) slot format indicator (SFI) field, among others.

BWP indicator field: A UE may be configured with multiple BWPs through the RRC configuration. The scheduling DCI may indicate the BWP to be used for unicast sidelink transmission. Or the scheduling DCI may indicate a UE to switch from current BWP to a new BWP. The BWP indicator field may indicate the index of the BWP the UE need to perform the unicast sidelink transmission or the UE need to switch to. Assume a UE is configured with 4 BWPs, 2 bits BWP indicator field may be used with '00' indicating the first configured BWP, '01' indicating the second configured BWP etc. Some fields may be dedicated in the bitmap and used to indicate initial BWP and the default BWP. For e.g., '00' may indicate the initial BWP (used for e.g. for discovery and synchronization) discovery. Alternatively, "00" may indicate default BWP. Yet in another alternative, "00" may indicate the initial BWP while "01" may indicate the default BWP.

Resource indicator field: A UE may be configured with multiple configurations of resources through the RRC, e.g., multiple resource pools. The scheduling DCI may indicate the index of the configuration of resources to be used for unicast sidelink transmission. Assume a UE is configured with 8 configurations of resources, e.g., configuration 0 to configuration 7, 3 bits resource indicator field may be used with '000' indicating configuration 0, '001' indicating configuration 1, etc.

Sidelink type indicator field: The scheduling DCI may indicate the type of sidelink transmission. For example, 2 bits sidelink type indicator field may be used with '00' indicating the DCI is scheduling unicast sidelink transmission, '01' indicating the DCI is scheduling unicast sidelink transmission, '10' indicating the DCI is scheduling unicast sidelink transmission etc.

Carrier type indicator field: A UE may be dynamically indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Transmission/reception indicator field: In unicast sidelink communication, both the transmitter UE 202 and the receiver UE 203 may receive the scheduling DCI. A transmission/reception indicator field may be signaled by the scheduling DCI to indicated if the DCI is scheduling the transmission or reception. For example, one bit field may be used with '0' indicating reception and '1' indicating transmission.

Sidelink UE ID field: For unicast sidelink communication, a UE may be dynamically signaled with a sidelink UE ID, e.g., SL-U-RNTI. For a transmitter UE 202, the UE may use SL-U-RNTI as the source ID. For a receiver UE 203, the UE may use SL-U-RNTI as the destination ID. The scheduling DCI may explicitly indicate the UE ID, e.g., SL-U-RNTI. Or a UE may be configured with $2^n$ UE IDs by the RRC where each UE ID associated with an index. The scheduling DCI may use an n bits field to indicate the index for the UE to determine the UE ID.

Paired UE ID field: A UE may be dynamically signaled with the ID of the paired UE. If a UE receives the scheduling DCI with transmission/reception indicator field set to be '0', the paired UE ID field indicates the ID of the transmitter UE 202. If a UE receives the scheduling DCI with transmission/reception indicator field set to be '1', the paired UE ID field indicates the ID of the receiver UE 203. The scheduling DCI may explicitly indicate the paired UE ID, e.g., SL-UP-RNTI. Or a UE may be configured with $2^n$ paired UE IDs by the RRC where each paired UE ID associated with an index. The scheduling DCI may use an n bits field to indicate the index for the UE to determine the paired UE ID.

Time domain resource assignment field: A UE may be signaled with the scheduled time domain resource through the DCI with following alternatives:

Alternative 1—time domain resource assignment: A UE may be configured with one or multiple candidate resources through the RRC configuration. The scheduling DCI may indicate the time domain resource to be used for unicast sidelink transmission among the candidate resources.

To determine the starting of the time domain resource, a UE may be signaled with a time offset value. For example, a time offset value field may be carried by the scheduling DCI to indicate the number of time unit between the scheduling DCI and the scheduled time domain resource for unicast sidelink transmission. The time unit may be in subframes, in slots, in mini-slots or in symbols. Or a UE may be indicated with two level time offset to determine the starting point of the time domain resource. For example, a UE may be indicated with the slot/subframe offset to determine the time domain resource is started from which slot/subframe. Then the UE may be indicated with index of the starting symbol/mini-slot to determine the starting point within the slot/subframe. To determine the duration of the time domain resources, a bitmap or the length of the duration may be indicated by the scheduling DCI. In an example, a UE may be signaled with a bitmap. The bitmap may indicate which time resources within the RRC configured candidate resources are used for unicast sidelink transmission. In another example, a UE may be signaled with the length of the time domain resource, e.g., l. Then the UE may use the l contiguous resource units within the RRC configured candidate resources for unicast sidelink transmission. The resource unit may be in subframes, in slots, in mini-slots or in symbols.

The fields for indicating the starting and the duration of the time domain resource may also be signal through one DCI field. For example, a predefined or pre-configured table may contain the combinations of the starting and the duration of time domain resource with each combination associated with an index. A UE may be signaled by the scheduling DCI with one index through one DCI field. The UE determines the time domain resource by finding the corresponding starting and duration values from the table.

Alternative 2—time domain resource assignment: A UE may not be configured with candidate resources through the RRC configuration. the UE may be dynamically indicated with time domain resource for unicast sidelink transmission by the scheduling DCI. The DCI may carry the information such as slot/subframe offset, starting point, duration of the time domain resource, etc. The aforementioned parameters may be indicated by different DCI fields or may be jointly indicated by the DCI field. For example, the time domain resource may be dynamically signaled by the slot/subframe offset value and SLV through the scheduling DCI only.

For unicast sidelink transmission, the scheduling DCI may indicate the time domain resources for both PSCCH or PSSCH. The time domain resource for PSCCH and PSSCH may be jointly assigned by the scheduling DCI, e.g., one time domain resource assignment may be used for both PSCCH and PSSCH. Or the time domain resource for PSCCH or PSSCH may be assigned separately by the scheduling DCI. For example, the scheduling DCI may assign two time domain resources for PSCCH or PSSCH respectively.

Retransmission field: HARQ feedback may be introduced on the unicast sidelink. When a transmission is NACK-ed at the receiver UE 203, the transmitter UE 202 may perform retransmission.

The retransmission at the transmitter UE 202 may be triggered by the receiver UE 203 or may be triggered by the gNB. With one alternative, the receiver UE 203 may feedback the NACK to the gNB. The gNB may trigger the transmitter UE 202 to do the retransmission by sending another scheduling DCI for retransmission. For the retransmission, the gNB may indicate the transmitter UE 202 to use the same MCS; or the gNB may indicate the transmitter UE 202 to use a different MCS. If repetition is performed, the UE may be signaled with a different RV for the repetition of the retransmission as well. For example, the scheduling DCI may carry an MCS index field to indicate the row index of the corresponding MCS level to be used for the sidelink transmission in the predefined modulation coding scheme (MCS) table; or to indicate the row index of the corresponding MCS level to be used for the sidelink transmission in the MCS table configured by RRC configuration.

The RRC configured MCS table may be a subset of the predefined MCS table, for example, the RRC configuration NR-SL-MCS may contain the starting index and the ending index of the predefined MCS table to configure the MCS table subset; or the RRC configuration NR-SL-MCS may include the starting index of the predefined MCS table or the size of the subset to configure the MCS table subset. The starting index or the ending index may be configured by 5 bits length bit strings in the RRC configuration. The size of the subset may be configured by integer in the RRC configuration, e.g., 1, 2, 4, 8, etc.

Figure 3:
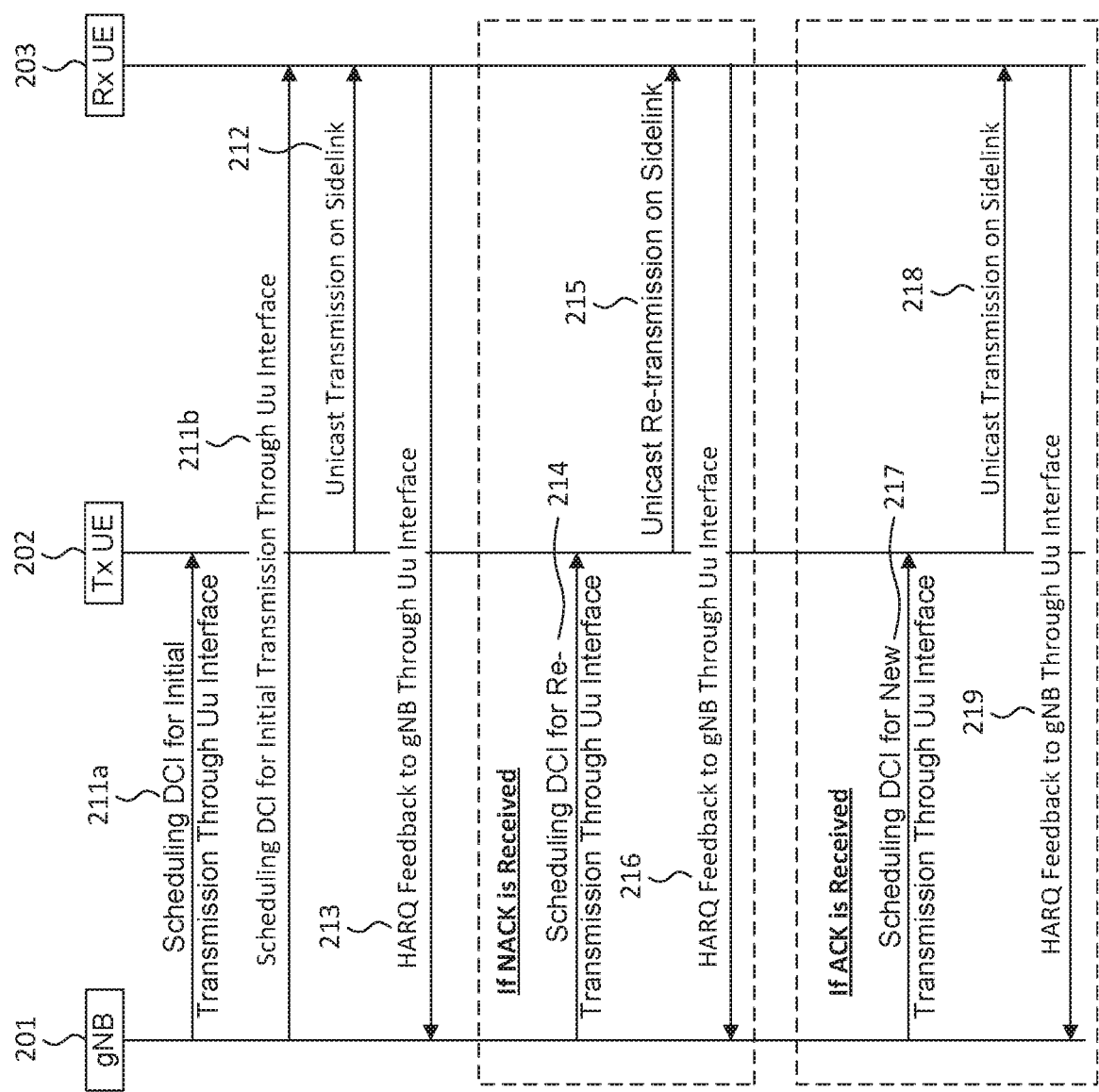
FIG. 3 illustrates an exemplary call flow of gNB triggered retransmission for unicast sidelink.

Assume row 10 to row 17 of the pre-defined MCS table are configured by the RRC configuration as the MCS table subset, the MCS index field will be 3 bits and an example is shown in Table 4. When a UE is indicated with MCS index field set to be '001', the UE may use the $2^{nd}$ row of the configured MCS table subset, which is the row 11 of the pre-defined MCS table in this example. The examples shown here may be also applied to dynamic resource allocation for groupcast sidelink transmission or broadcast sidelink transmission. In this case, the retransmission field may be one bit to indicate if the scheduling is for initial transmission or retransmission. For example, '0' may indicate the transmission is an initial transmission and '1' may indicate the transmission is a retransmission. An example call flow is shown in FIG. 3.

TABLE 4

Example of MCS Index Field

| Value of MCS index field | MCS value |
|---|---|
| 000 | $1^{st}$ row of the MCS table subset configured by RRC |
| 001 | $2^{nd}$ row of the MCS table subset configured by RRC |
| ... | ... |
| 111 | $8^{th}$ row of the MCS table subset configured by RRC |

FIG. 3 illustrates an example call flow of gNB triggered retransmission for unicast sidelink. At step 211a, Tx UE 202 obtains (e.g., receives) scheduling DCI for initial transmission through Uu interface. At step 211b, Rx UE 203 obtains scheduling DCI for initial transmission through Uu interface. At step 212 Rx UE 203 obtains unicast transmission on sidelink. At step 213, based on step 212 or step 211b, Rx UE 203 sends HARQ feedback to gNB 201 through Uu interface. Step 213 through step 216 may be executed if NACK is received. At step 214, scheduling DCI for retransmission through Uu interface may be obtained by Tx UE 202. Based on step 214, at step 215 unicast retransmission on sidelink may be sent by Tx UE 202. At step 216, based on step 215, RX UE 203 sent HARQ feedback to gNB through Uu interface. Step 217 through step 219 may be executed if ACK is received. At step 217, scheduling DCI for new transmission through Uu interface may be obtained by Tx UE 202. Based on step 217, at step 218 unicast transmission on sidelink may be sent by Tx UE 202. At step 219, based on step 218, RX UE 203 sent HARQ feedback to gNB through Uu interface.

With another alternative, the receiver UE 203 may feedback the NACK to the transmitter UE 202. By receiving the NACK from the receiver UE 203, the transmitter UE 202 may perform the retransmission. For the retransmission, the transmitter UE 202 may select to use the same MCS as it is used for the initial transmission; or the transmitter UE 202 may autonomously select a different MCS to use. For one example, the transmitter UE 202 may autonomously select the MCS from the predefined MCS table. For another example, the transmitter UE 202 may autonomously select the MCS from a subset of the predefined MCS table, where the subset may be configured by RRC through the RRC configuration NR-SL-MCS. Configuration details disclosed above may also be applied here. The examples shown here may also be applied to dynamic resource allocation for groupcast sidelink transmission or broadcast sidelink transmission.

The resource for retransmission may be pre-reserved by the retransmission field in the scheduling DCI carrying the grant for the initial transmission. The retransmission field may indicate the time or frequency resource assigned for the retransmission, e.g., symbol index, mini-slot index, RB index, etc. Or the retransmission field may indicate the time or frequency offset between the retransmission and the initial transmission, e.g., symbol offset, mini-slot offset, RB offset, etc.

If the transmitter UE 202 receives the NACK from the receiver UE 203, the transmitter UE 202 may use the pre-reserved resource for retransmission. If the transmitter UE 202 receives the ACK from the receiver UE 203, the transmitter UE 202 may skip the pre-reserved resource for retransmission. An example call flow is shown in FIG. 4.

Figure 4:
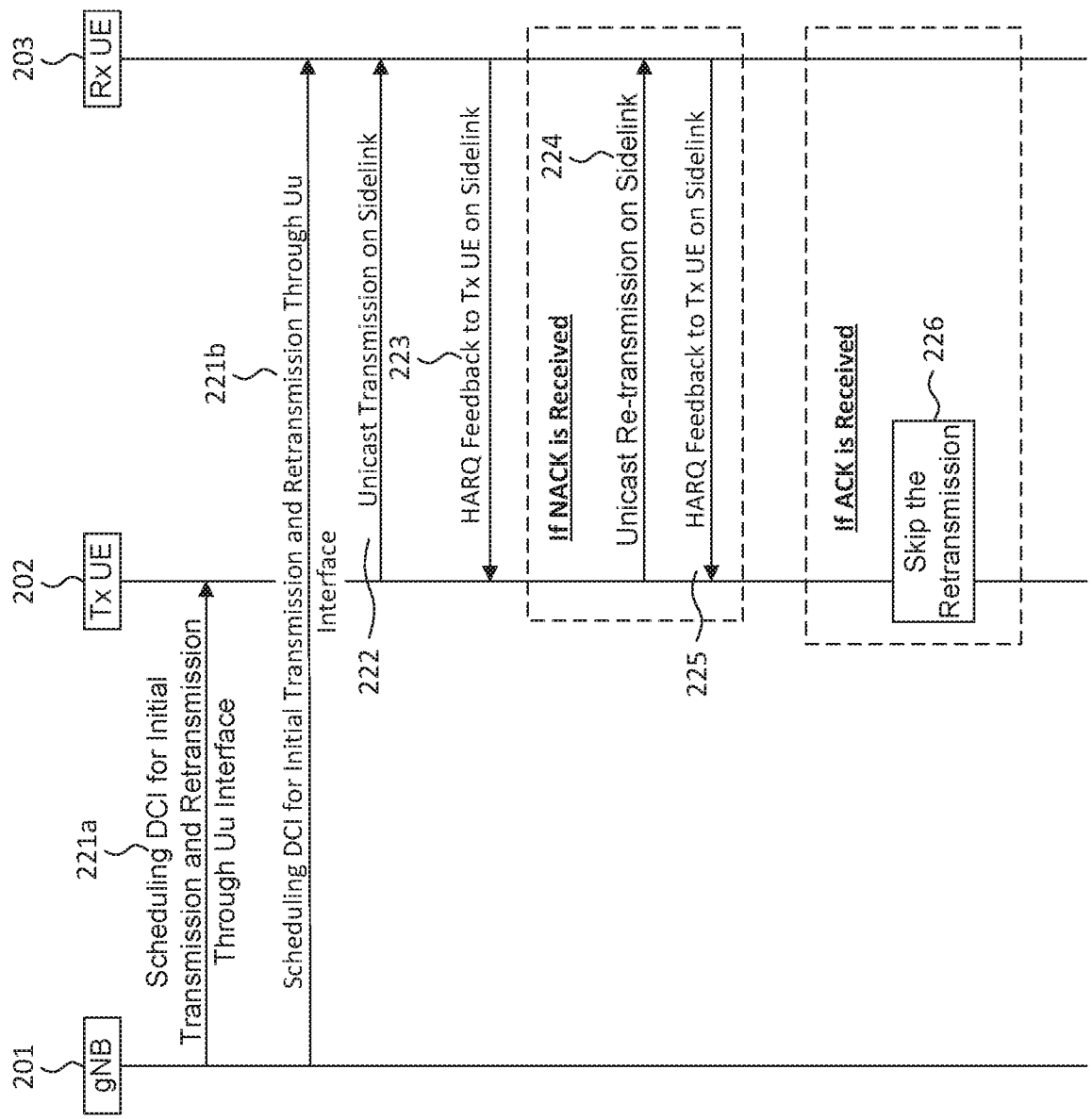
FIG. 4 illustrates an exemplary call flow of Rx UE triggered retransmission for unicast sidelink.

FIG. 4 illustrates an example call flow of Rx UE 203 triggered retransmission for unicast sidelink. At step 221a, Tx UE 202 obtains (e.g., receives) scheduling DCI for initial transmission through Uu interface. At step 221b, Rx UE 203 obtains scheduling DCI for initial transmission and retransmission through Uu interface. At step 222 Rx UE 203 obtains unicast transmission on sidelink from Tx UE 202. At step 223, based on step 222, Rx UE 203 sends HARQ feedback to Tx UE 202 on sidelink. Step 224 through step 225 may be executed if NACK is received. At step 224, unicast retransmission through sidelink may be obtained by Rx UE 203. Based on step 224, at step 225, RX UE 203 sends HARQ feedback to Tx UE 202 through sidelink. if ACK is received at step 223, for example, then Tx UE 202 may skip the retransmission.

HARQ filed. The scheduling DCI may indicate the HARQ ID or HARQ process number to the transmitter UE 202 and the receiver UE 203. The scheduling DCI may also indicate the resource assignment for the HARQ feedback. The scheduling DCI may indicate the time or frequency resource for the HARQ feedback, e.g., symbol index, mini-slot index, RB index, etc. Or the scheduling DCI may indicate the time or frequency offset between the HARQ feedback and the initial transmission, e.g., symbol offset, mini-slot offset RB offset, etc. If the retransmission is triggered by the receiver UE 203, the receiver UE 203 may send the HARQ feedback to the transmitter UE 202 using the assigned HARQ feedback resource. If the retransmission is triggered by the gNB 201, the receiver UE 203 may send the HARQ feedback to the gNB 201 using the assigned HARQ feedback resource.

Channel state information (CSI) acquisition and report field. The gNB 201 may schedule the CSI acquisition and report on the sidelink. The scheduling DCI may indicate the CSI-RS configuration and the resource used for reporting to the transmitter UE 202 and the receiver UE 203. The scheduling DCI may indicate the time or frequency resource for the CSI feedback, e.g., symbol index, mini-slot index, RB index, etc. Multiple CSI-RS configurations may be configured by the RRC, the scheduling DCI may signal an index to indicate the CSI-RS configuration used.

Frequency domain resource assignment field. To determine the frequency domain resource for unicast sidelink transmission/reception, a UE may be indicated with the information of the lowest RB, RBG, or subchannel to be used. A UE may be signaled with the index of the lowest RB or RBG. Or the UE may be signaled with the offset between the lowest RB, RBG, or subchannel of the frequency domain resource assignment and the lowest RB, RBG, or subchannel of the RRC configured candidate frequency domain resources. The offset may be in RBs or in RBGs.

To determine the range of the frequency domain resources, a bitmap or the width of the frequency domain resource may be indicated by the scheduling DCI. For one example, a UE may be signaled with a bitmap. The bitmap indicates which frequency resources within the RRC configured candidate frequency resources are used for unicast sidelink transmission. For another example, a UE may be signaled with the width of the frequency domain resource, e.g., w. Then the UE may use the w contiguous RB, RBG, or subchannel for unicast sidelink transmission.

For unicast sidelink transmission, the scheduling DCI may indicate the frequency domain resources for both PSCCH or PSSCH. The frequency domain resource for PSCCH and PSSCH may be jointly assigned by the scheduling DCI, e.g., one frequency domain resource assignment may be used for both PSCCH and PSSCH. Or the frequency domain resource for PSCCH or PSSCH may be assigned separately by the scheduling DCI. For example, the scheduling DCI may assign two frequency domain resources for PSCCH or PSSCH respectively.

Slot format indicator field. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the RRC configured candidate time resource and the DCI signaled SFI, the DCI may overwrite the RRC configuration. The UE may skip the conflict symbols and not perform sidelink transmission on them. For example, assume the symbol k in slot m is configured as the candidate time resource in the RRC configuration. If the symbol k in slot m is labeled as 'D' in the SFI, the UE may not treat the symbol k in slot m as candidate time resource. When the UE determines the time resource for unicast sidelink transmission, the UE may skip the symbol k in slot m. If the candidate time resource is in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

The symbols used for sidelink communication may be further divided into symbols used for sidelink transmission and symbols used for sidelink reception. As disclosed, the labels 'ST' and 'SR' may be introduced for slot format as shown in FIG. 5. FIG. 5 illustrates an example of Slot Format for Unicast Sidelink. For a transmitter UE 202, the UE may use the symbols labeled by the SFI as 'ST' for sidelink transmission and may use the symbols labeled by the SFI as 'SR' for receiving the feedback, e.g., HARQ feedback. For a receiver UE 203, the UE may use the symbols labeled by the SFI as 'ST' for receiving the sidelink transmission and may use the symbols labeled by the SFI as 'SR' for sending the feedback, e.g., HARQ feedback. The similar idea may apply to groupcast sidelink as well. The symbols labeled as 'X' may be used as gap for switching the transmission and reception mode for the UE.

55 Groupcast Sidelink Transmission

Groupcast Sidelink Transmission: In NR V2X, the gNB 201 or gNB like node may dynamically assign the resources used by the UE for groupcast sidelink transmission. For the transmitter UE 202, a UE may be assigned with the resources for groupcast sidelink transmission through the RRC configuration and DCI signaling. For the receiver UE 203, a UE may be assigned with the resources for reception through the RRC configuration and DCI signaling. When the gNB 201 schedule a transmission on the sidelink, both the transmitter UE 202 and receiver UE 203 may receive the scheduling grant. By receiving the scheduling grant, the transmitter may determine the resources and the beams used for transmission. By receiving the scheduling grant, the receiver UE 203 may determine the resources and the beam used for reception. The detail resource assignment scheme is as follow.

Detail design for RRC configuration: For groupcast sidelink transmission, the IE NR-SL-Resource or NR-SL-Resource-Groupcast may carry configuration information for both the sidelink control and sidelink data transmission. A UE may be configured with the NR-SL-Resource or NR-SL-Resource-Groupcast through the broadcasted signal, e.g., OSI; or through the common or dedicated RRC configuration on the Uu interface. The IE NR-SL-Resource or NR-SL-Resource-Groupcast may carry the following RRC configurations: 1) type of sidelink transmission; 2) type of carrier; 3) numerology of the resource; 4) groupcast transmitting UE; 5) mask used for scrambling the scheduling DCI; 6) index of the candidate resource; 7) candidate time domain resources of the resource configuration; 8) number of the repetition and redundancy version; 9) candidate frequency domain resources of the resource configuration; or 10) beam sweeping information, among others.

RRC configuration to indicate the type of the sidelink transmission. For example, RRC configuration NR-SL-CommuncationType which may be Broadcast, Groupcast, or unicast if the same IE NR-SL-Resource is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz etc.

RRC configuration to indicate the groupcast transmitting UE ID on the sidelink. For groupcast sidelink transmission, a UE may be configured with a UE ID, e.g., Sidelink Groupcast RNTI (SL-G-RNTI). If a UE needs to groupcast on the sidelink, the UE may use SL-G-RNTI as the source ID in the formed group.

To perform the groupcast sidelink communication, a UE may need to be indicated with the group ID. A UE may be configured with a group ID, e.g., Sidelink Groupcast Destination RNTI (SL-GD-RNTI). The UE may use the configured group ID as the destination group ID. The group ID may be dynamically signaled by the scheduling DCI as well.

The scrambling sequence for SCI may be jointly initialized by the destination group ID and the source ID. Or the scrambling sequence for SCI may be initialized by one of the destination group ID or source ID with the other one is indicated in the SCI payload. For example, the destination group ID is used to scramble the SCI and source ID is carried by the SCI payload.

RRC configuration to indicate the mask used for scrambling the scheduling DCI. For example, a UE may be configured with a SLGroupcast-RNTI or a SL-RNTI. The gNB 201 may generate and transmit the scheduling DCI for a UE with CRC scrambled by the configured SLGroupcast- RNTI or SL-RNTI The may decode the DCI by using the configured SLGroupcast-RNTI or SL-RNTI.

RRC configuration to indicate the number of the repetition and redundancy version (RV). To improve the reliability, a UE may repeat the groupcast sidelink transmission. The UE may be configured with the number of the repetition and RVs by the gNB 201 through the RRC configuration. When a UE repeat the initial transmission, inter-slot repetition or intra-slot repetition may be performed. The UE may use the same symbols or mini-slot in the following slots for repetition. Or the UE may use the symbols or mini-slots in the same slot for the repetition. If beam sweeping is applied in the groupcast, the transmitter UE 202 may repeat the whole beam sweeping, e.g., beam 1, beam 2, . . . , beam k, beam 1, beam 2, . . . , beam k, . . . , beam 1, beam 2, . . . , beam k. Or the UE may repeat for each beam and then do the beam sweeping, e.g., beam 1, beam 1, . . . , beam 1, beam 2, beam 2, . . . , beam 2, . . . , beam k, beam k, . . . , beam k.

RRC configuration to indicate the index of the candidate resource. A UE may be configured with multiple configurations of the resource for sidelink transmission, e.g., multiple resource pools. Each configuration of the resource may be associated with one dedicated resource index. For example, RRC configuration NR-SL-Resource-Index. The UE may determine the configuration of the resource to use for the sidelink transmission through the DCI scheduling the sidelink transmission.

RRC configuration to indicate the candidate time domain resources of the resource configuration, e.g., the time domain resources of each resource pool. We disclose the candidate time domain resources for groupcast sidelink transmission for each candidate resource may be configured with the following alternatives:

Alternative 1—the candidate time domain resources: A UE may be configured with one or multiple bitmaps by the RRC configuration to indicate the candidate time domain resources for sidelink transmission. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-i}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

When a UE receives the DCI carrying the scheduling grant of transmission on the sidelink, the UE may perform the transmission starting from the next available time resource within the configured candidate time resources. A minimum time gap constrain may be applied for the UE to switch from receiving mode to transmitting mode, the UE may perform the transmission starting from the next available time resource after the minimum time gap within the configured candidate time resources.

Or a UE may be configured with an offset indicator to indicate the time resource to be used for sidelink transmission within the configured candidate time resources. The offset value may be signaled by the DCI carrying the scheduling grant. The offset value may indicate the offset between the time resource for sidelink transmission and the time resource used for transmitting scheduling grant DCI; or the offset value may indicate the offset between the time resource for sidelink transmission and the next available time resource after the minimum time gap within the configured candidate time resources.

Alternative 2—the candidate time domain resources: A UE may be dynamically signaled by the DCI for the time resources used for groupcast sidelink transmission. The UE may not be configured with the candidate time domain resources through the RRC configuration. The DCI carrying the scheduling grant may indicate the time resources used for groupcast sidelink transmission.

RRC configuration to indicate the beam sweeping information. For groupcast sidelink transmission, the transmitter UE 202 may send the information to multiple directions through multiple beams. A UE need to be aware of the number of the beam sweeping it need to perform and the corresponding resources.

Alternative 1—beam sweeping information: The gNB 201 may determine the number of the beam sweeping a UE need to perform. For example, the UE may be configured with the number of or the maximum number of the beam sweeping through the RRC configuration. With another alternative, the number of the beam sweeping may be signaled by the DCI. The UE may provide assistance information to the NB to assists the NB in determining the beam sweeping configuration. Such assistance information may include one or more of the following: the V2X service of interest, the UE capability for example in terms of the number of simultaneous beam sweeping direction the UE can cover, the UE scheduling preferences including power saving mode preference, etc.

Assume a UE is configured to send the information through k directions/beams, the UE may be assigned with the k configurations of time and frequency resources, e.g., time and frequency resources for each direction/beam through RRC configuration and DCI signaling for beam sweeping of k directions respectively.

Or the UE may be assigned with one configuration of time and frequency resources. With one possibility, the assigned time and frequency resources may be used for all the beams. The UE may evenly divide the assigned time resources into k parts and use each part for one beam. With another possibility, the assigned time and frequency resources may be used for one beam. For example, the UE may use the time resources across the beam sweeping directions as follows. In option 1 of this alternative beam sweeping information, the UE may use the assigned time and frequency resources for the $1^{st}$ beam sweeping and use the next available time resources in the configured resource pool with the same time duration and same frequency resources as used for the $1^{st}$ beam sweeping is used for the rest of the beam sweeping. For example, assume a UE is configured with the time resources in mini slots and the UE is configured to use the mini slot n for the $1^{st}$ beam sweeping. The UE may use the mini slot n+1 to n+k−1 in the configured resource pool for the rest beam sweeping. The beams used for beam sweeping may be indicated by the gNB 201. Or the beams used for beam sweeping may be autonomously determined by the transmitter UE 202 based on the sensing or discovering. In Option 2 of this alternative, the UE slices the time resources equally on a round robin basis across the beam sweeping directions, and uses the same frequency resource in each direction. In Option 3 of this alternative, the UE autonomously decide how to slice the time-frequency resources in both time domain and frequency domain across the beam sweeping direction.

Alternative 2—beam sweeping information: A UE may determine the number of the beam sweeping the UE need to perform for groupcast sidelink transmission. The UE may report the value of k beam sweeping to the gNB 201. gNB 201 schedules the time resources to the UE for the groupcast sidelink transmission.

The UE may be assigned with the k configurations of time and frequency resources through RRC configuration and DCI signaling for beam sweeping of k directions respectively. Or the UE may be assigned with one configuration of time and frequency resources. With one possibility, the assigned time and frequency resources may be used for all the beams. The UE may evenly divide the assigned time resources into k parts and use each part for one beam. With another possibility, the assigned time and frequency resources may be used for one beam. The UE may use the assigned time and frequency resources for the $1^{st}$ beam sweeping and use the next available time resources in the configured resource pool for the rest of the beam sweeping with the same time duration and frequency resources as used for the $1^{st}$ beam sweeping. The beams used for beam sweeping may be indicated by the gNB 201. Or the beams used for beam sweeping may be autonomously determined by the transmitter UE 202 based on the sensing or discovering.

RRC configuration to indicate the candidate frequency domain resources of the resource configuration, e.g., the frequency domain resources of each resource pool. A UE may be configured with one or multiple SL-BWPs. Or the UE may be configured with one or multiple candidate frequency resources for groupcast sidelink transmission. We disclose the candidate frequency resources may be configured with the following alternatives:

Alternative 1—candidate frequency domain resources: A UE may be configured with contiguous frequency resources as the candidate frequency resource for the sidelink groupcast transmission. The frequency resources may be configured in RBs or may be configured in subchannels, e.g., in RBGs. For example, the UE may be configured with the parameters StartRB and LengthRB through the RRC configuration to indicate the starting and length value (SLV) of RB for the candidate frequency resource. Or the UE may be configured with the parameters StartRBG and LengthRBG through the RRC configuration to indicate the SLV of RBG for the candidate frequency resource. A UE may be configured with one candidate frequency resource for both the sidelink control information (SCI) transmission and sidelink data transmission. A UE may also be configured with two candidate frequency resources for the sidelink control information (SCI) transmission and sidelink data transmission respectively, e.g., StartRBG-PSCCH, LengthRBG-PSCCH and StartRBG-PSSCH, LengthRBG-PSSCH.

Alternative 2—candidate frequency domain resources: A UE may be configured with non-contiguous frequency resources as the candidate frequency resource for the sidelink groupcast transmission. The frequency resources may be configured in RBs or may be configured in subchannels, e.g., in RBGs. The non-contiguous frequency resources may be configured by multiple SLVs. For example, StartRBG_1 and LengthRBG_1, StartRBG_2 and LengthRBG_2, . . . , StartRBG_m and LengthRBG_m. Or the non-contiguous frequency resources may be configured by the starting value and the bitmap. For example, StartRBG and $\{b_{m-1}, \ldots, b_1,$ $b_0\}$. Assume a UE is configured with StartRBG set to be k, $b_{m-1}$ is mapped to RBG k and $b_0$ is mapped to RBG k+m.

For the alternatives above, the UE may provide assistance information, for example in Sidelink UE Information message or in UE Assistance Information message or similar messages, to assist the NB to properly configure the UE. Such assistance information may include information such as UE capability, carrier frequency in which UE is interested in transmitting or receiving V2X communication or is interested in performing V2X discovery; V2X services the UE is interested in, the specific BWPs within a carrier frequency the UE is interested in transmitting or receiving V2X communication on or is interested in performing V2X discovery in. It should be noted that in LTE, the procedure may be used to inform E-UTRAN of the UE's power saving preference and SPS assistance information, maximum PDSCH/PUSCH bandwidth configuration preference, etc., while Sidelink UE Information message if used to inform NB that the UE is interested or no longer interested to receive sidelink communication or discovery, to receive V2X sidelink communication, as well as to request assignment or release of transmission resources for V2X sidelink communication, V2X sidelink discovery gap, etc.

Note the abovementioned RRC configurations may be configured through the IE NR-SL-Resource or NR-SL-Resource-Groupcast, or some of the abovementioned RRC configurations may be configured by other IEs used for sidelink configuration.

Detail design for DCI signaling: A UE may be dynamically signaled with the scheduling grant through the DCI for the groupcast sidelink transmission. For example, a new DCI format, e.g., DCI format 3, may be used for scheduling the PSCCH or PSSCH for the groupcast sidelink transmission. To schedule the resource for groupcast sidelink transmission, the scheduling DCI may carry the following information: 1) BWP indicator field; 2) resource indicator field; 3) sidelink type indicator field; 4) carrier type indicator field: 5) time domain resource assignment field; 6) transmission/reception indicator field; 7) sidelink UE ID field; 8) group ID field; 9) retransmission field; 10) HARQ field; 11) Beam sweeping information field; 12) frequency domain resource assignment field: or 13) slot format indicator (SFI) field, among others.

BWP indicator field. A UE may be configured with multiple BWPs through the RRC configuration. The scheduling DCI may indicate the BWP to be used for groupcast sidelink transmission. Or the scheduling DCI may indicate a UE to switch from current BWP to a new BWP. The BWP indicator field may indicate the index of the BWP the UE need to perform the groupcast sidelink transmission or the UE need to switch to. Assume a UE is configured with 4 BWPs, 2 bits BWP indicator field may be used with '00' indicating the first configured BWP, '01' indicating the second configured BWP etc. Some fields may be dedicated in the bitmap and used to indicate initial BWP and the default BWP. For e.g., '00' may indicate the initial BWP (used for e.g. for discovery and synchronization) discovery. Alternatively, "00" may indicate default BWP. Yet in another alternative, "00" may indicate the initial BWP while "01" may indicate the default BWP.

Resource indicator field. A UE may be configured with multiple configurations of resources through the RRC, e.g., multiple resource pools. The scheduling DCI may indicate the index of the configuration of resources to be used for groupcast sidelink transmission. Assume a UE is configured with 8 configurations of resources, e.g., configuration 0 to configuration 7, 3 bits resource indicator field may be used with '000' indicating configuration 0, '001' indicating configuration 1, etc.

Sidelink type indicator field. The scheduling DCI may indicate the type of sidelink transmission. For example, 2 bits sidelink type indicator field may be used with '00' indicating the DCI is scheduling groupcast sidelink transmission, '01' indicating the DCI is scheduling groupcast sidelink transmission, '10' indicating the DCI is scheduling unicast sidelink transmission etc.

Carrier type indicator field. A UE may be dynamically indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Transmission/reception indicator field. In unicast sidelink communication, both the transmitter UE 202 and the receiver UE 203 may receive the scheduling DCI. A transmission/reception indicator field may be signaled by the scheduling DCI to indicated if the DCI is scheduling the transmission or reception. For example, one bit field may be used with '0' indicating reception and '1' indicating transmission.

Sidelink UE ID field. A UE may be dynamically signaled with the UE ID in a sidelink group to indicate the source ID. The scheduling DCI may explicitly indicate the UE ID, e.g., SL-G-RNTL Or a UE may be configured with $2^n$ candidate IDs by the RRC where each candidate ID associated with an index. The scheduling DCI may use an n bits field to indicate the index for the UE to determine the source ID.

Group ID field. A UE may be dynamically signaled with the group ID to indicate the destination group ID. The scheduling DCI may explicitly indicate the group ID, e.g., SL-GD-RNTL Or a UE may be configured with $2^n$ candidate IDs by the RRC where each candidate ID associated with an index. The scheduling DCI may use an n bits field to indicate the index for the UE to determine the group ID.

Time domain resource assignment field. A UE may be signaled with the scheduled time domain resource through the DCI with following alternatives:

Alternative 1—time domain resource assignment: A UE may be configured with one or multiple candidate resources through the RRC configuration. The scheduling DCI may indicate the time domain resource to be used for groupcast sidelink transmission among the candidate resources.

To determine the starting of the time domain resource, a UE may be signaled with a time offset value. For example, a time offset value field may be carried by the scheduling DCI to indicate the number of time unit between the scheduling DCI and the scheduled time domain resource for groupcast sidelink transmission. The time unit may be in subframes, in slots, in mini-slots or in symbols. Or a UE may be indicated with two level time offset to determine the starting point of the time domain resource. For example, a UE may be indicated with the slot/subframe offset to determine the time domain resource is started from which slot/subframe. Then the UE may be indicated with index of the starting symbol/mini-slot to determine the starting point within the slot/subframe.

To determine the duration of the time domain resources, a bitmap or the length of the duration may be indicated by the scheduling DCI. In an example, a UE may be signaled with a bitmap. The bitmap may indicate which time resources within the RRC configured candidate resources are used for groupcast sidelink transmission. In another example, a UE may be signaled with the length of the time domain resource, e.g., l. Then the UE may use the l contiguous resource units within the RRC configured candidate resources for groupcast sidelink transmission. The resource unit may be in subframes, in slots, in mini-slots or in symbols.

The fields for indicating the starting and the duration of the time domain resource may also be signal through one DCI field. For example, a predefined or pre-configured table may contain the combinations of the starting and the duration of time domain resource with each combination associated with an index. A UE may be signaled by the scheduling DCI with one index through one DCI field. The UE determines the time domain resource by finding the corresponding starting and duration values from the table.

Alternative 2—time domain resource assignment: A UE may not be configured with candidate resources through the RRC configuration. the UE may be dynamically indicated with time domain resource for groupcast sidelink transmission by the scheduling DCI. The DCI may carry the information such as slot/subframe offset, starting point, duration of the time domain resource, etc. The abovementioned parameters may be indicated by different DCI fields or may be jointly indicated by the DCI field. For example, the time domain resource may be dynamically signaled by the slot/subframe offset value and SLV through the scheduling DCI only.

For groupcast sidelink transmission, a UE may send the same information to multiple directions, e.g., through k beams. The UE may be indicated with one time domain resource and determine the time domain resources for all the beams by some pre-defined rules. For example, a UE may be indicated with mini-slot n, the UE may use the mini-slot n for the $1^{st}$ beam and use the following k–1 mini-slots in the configured candidate time resources for the rest beams. Or the UE may be indicated with the time domain resource for each beam respectively. For example, a UE may be indicated with k starting and the duration values of the time domain resource. Or a UE may be indicated with gaps between the time domain resource for the transmission of the first direction and for the transmission of the rest directions.

For groupcast sidelink transmission, the scheduling DCI may indicate the time domain resources for both PSCCH or PSSCH. The time domain resource for PSCCH and PSSCH may be jointly assigned by the scheduling DCI, e.g., one time domain resource assignment may be used for both PSCCH and PSSCH. Or the time domain resource for PSCCH or PSSCH may be assigned separately by the scheduling DCI. For example, the scheduling DCI may assign two time domain resources for PSCCH or PSSCH respectively.

Retransmission field. HARQ feedback may be introduced on the groupcast sidelink. The transmitter UE 202 may groupcast the message to multiple receiver UEs through multiple beams where each beam may cover one or multiple UEs. The retransmission may be triggered per beam. For one beam, the retransmission may be trigger if any UE under that beam is NACK-ed or the retransmission may be trigger if all the UEs under that beam are NACK-ed.

The retransmission at the transmitter UE 202 may be triggered by the receiver UE 203 or may be triggered by the gNB 201. With one alternative, the receiver UEs may feedback the NACK to the gNB 201. The gNB 201 may trigger the transmitter UE 202 to do the retransmission by sending another scheduling DCI for retransmission. For the retransmission, the gNB 201 may indicate the transmitter UE 202 to use the same MCS; or the gNB 201 may indicate the transmitter UE 202 to use a different MCS. If repetition is performed, the UE may be signaled with a different RV for the repetition of the retransmission as well. In this case, the retransmission field may be one bit to indicate if the scheduling is for initial transmission or retransmission. For example, '0' indicating the transmission is an initial transmission and '1' indicating the transmission is a retransmission. A bit map may be signaled in the scheduling DCI to indicate which beams need to be retransmitted, e.g., $\{b_{k-1}, \ldots, b_1, b_0\}$ is mapped with $b_{k-1}$ to the $1^{st}$ beam and $b_0$ to the $k^{th}$ beam. An example call flow is shown in FIG. 6.

Figure 6:
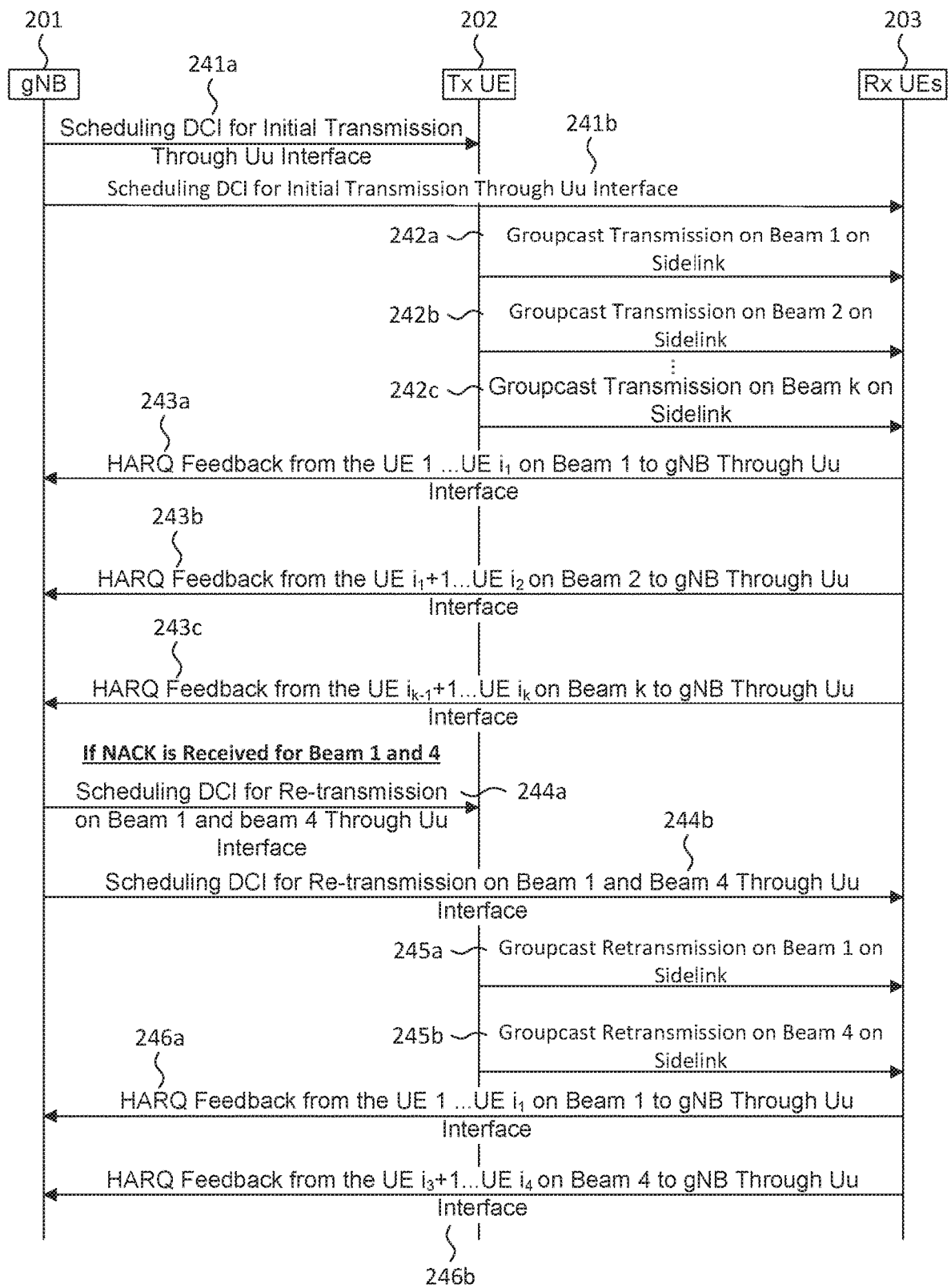
FIG. 6 illustrates an exemplary call flow of gNB triggered retransmission for groupcast sidelink.

FIG. 6 illustrates an example call flow of gNB 201 triggered retransmission for groupcast sidelink. At step 241a, Tx UE 202 obtains (e.g., receives) scheduling DCI for initial transmission through Uu interface. At step 241b, Rx UEs 203 obtain scheduling DCI for initial transmission through Uu interface. At step 242a, Rx UEs 203 obtain groupcast transmission on beam 1 on sidelink. At step 242b, Rx UEs 203 obtain groupcast transmission on beam 2 on sidelink. At step 242c, Rx UEs 203 obtain groupcast transmission on beam k on sidelink. Based on steps 242a through 242c, step 243a through step 243c may be executed. At step 243a, Rx UEs 203 send HARQ feedback from the UE 1 . . . UE $i_1$ on beam 1 to gNB 201 through Uu interface. At step 243b, Rx UEs 203 send HARQ feedback from the UE $i_1$+1 . . . UE $i_2$ on beam 2 to gNB 201 through Uu interface. At step 243c, Rx UEs 203 sends HARQ feedback from the UE $i_{k-1}$+1 . . . UE $i_k$ on beam k to gNB 201 through Uu interface. Step 244a through step 246b may be executed if NACK is received for beam 1 and beam 4, for example. At step 244a, scheduling DCI for retransmission on beam 1 and beam 4 through Uu interface may be sent to Tx UE 202. At step 244b, scheduling DCI for retransmission on beam 1 and beam 4 through Uu interface may be sent to Rx UEs 203. At step 245a, obtains groupcast retransmission on beam 1 on sidelink. At step 245b, Rx UE 203 obtains groupcast retransmission on beam 4 on sidelink. Based on step 245a through 245b, step 246a through step 246c may be executed. At step 246a, Rx UEs 203 send HARQ feedback from the UE 1 . . . UE $i_1$ on beam 1 to gNB 201 through Uu interface. At step 246b, Rx UEs 203 send HARQ feedback from the UE $i_3$+1 . . . UE $i_4$ on beam 4 to gNB 201 through Uu interface.

With another alternative, the receiver UEs may feedback the NACK to the transmitter UE 202. For each beam, the transmitter UE 202 may determine if to do the retransmission based on the feedback. For the retransmission, the transmitter UE 202 may select to use the same MCS as it is used for the initial transmission; or the transmitter UE 202 may autonomously select a different MCS to use.

The resource for retransmission may be pre-reserved by the retransmission field in the scheduling DCI carrying the grant for the initial transmission. Assume k beams are used for groupcast transmission, similar to the resource assignment for the initial transmission, the retransmission field may indicate k time or frequency resources for the retransmission, or the retransmission field may indicate one time or frequency resource and the transmitter UE 202 determines the resource for the rest beams by some pre-defined rules, e.g., use the following k−1 time resource unit in the candidate time resources. The assignment of the retransmission may be indicated by time resources, e.g., symbol index, mini-slot index, RB index, etc. Or the assignment of the retransmission may be indicated by the time or frequency offset between the retransmission and the initial transmission, e.g., symbol offset, mini-slot offset RB offset, etc. If the retransmission is triggered on any beam, the transmitter UE 202 may use the corresponding pre-reserved resource for retransmission on that beam. An example call flow is shown in FIG. 7.

Figure 7:
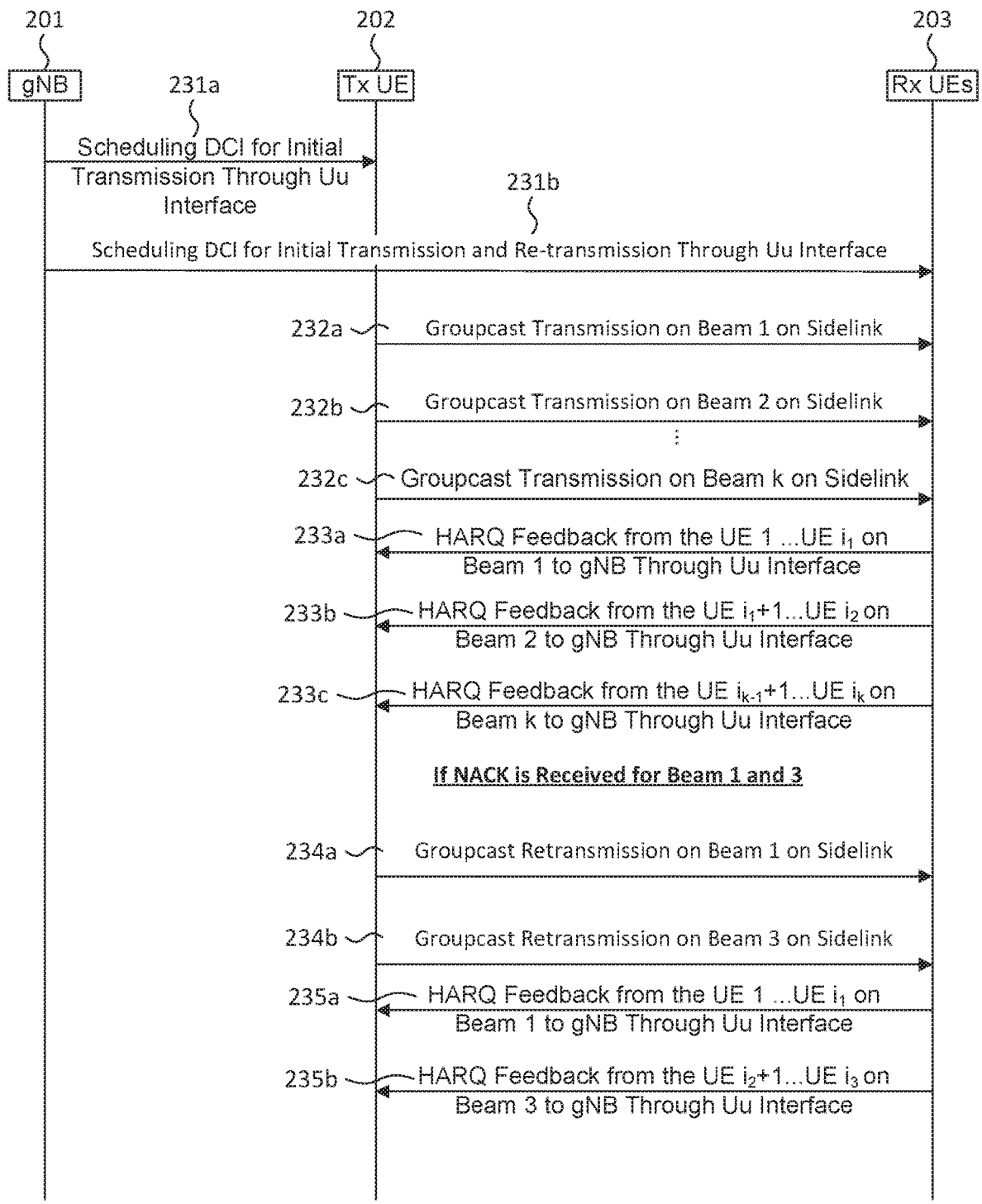
FIG. 7 illustrates an exemplary call flow of Rx UE triggered retransmission for groupcast sidelink.

FIG. 7 illustrates an example call flow of Rx UE 203 triggered retransmission for groupcast sidelink. At step 231a, Tx UE 202 obtains (e.g., receives) scheduling DCI for initial transmission and retransmission through Uu interface. At step 231b, Rx UEs 203 obtain scheduling DCI for initial transmission and retransmission through Uu interface. At step 232a, Rx UEs 203 obtain groupcast transmission on beam 1 on sidelink. At step 232b, Rx UEs 203 obtains groupcast transmission on beam 2 on sidelink. At step 232c, Rx UEs 203 obtains groupcast transmission on beam k on sidelink. Based on steps 232a through 232c (which may be received from Tx UE 202), step 233a through step 233c may be executed and sent to Tx UE 202 (or gNB 201 in alternative implementation). At step 233a, Rx UEs 203 send HARQ feedback from the UE 1 . . . UE $i_1$ on beam 1 to Tx UE 202 on sidelink. The communication between Tx UE and Rx UE is happened on sidelink. The communication between vehicle UE (e.g., Tx UE or Rx UE) and gNB is happened on Uu interface. At step 233b, Rx UEs 203 send HARQ feedback from the UE $i_1$+1 . . . UE $i_2$ on beam 2 to Tx UE 202 on sidelink. At step 233c, Rx UEs 203 send HARQ feedback from the UE $i_{k-1}$+1 . . . UE $i_k$ on beam k to Tx UE 202 on sidelink. Step 234a through step 235b may be executed if NACK is received for beam 1 and beam 3, for example. At step 234a, RX UES 203 obtain groupcast retransmission on beam 1 on sidelink. At step 234b, Rx UEs 203 obtain groupcast retransmission on beam 3 on sidelink. Based on step 234a through 234b, step 235a through step 236b may be executed. At step 235a, Rx UEs 203 send HARQ feedback from the UE 1 . . . UE $i_1$ on beam 1 to Tx UE 202 on sidelink. At step 235b, Rx UEs 203 send HARQ feedback from the UE $i_2$+1 . . . UE $i_3$ on beam 3 to Tx UE 202 on sidelink.

HARQ field. The scheduling DCI may indicate the HARQ ID or HARQ process number to transmitter UE 202 and the receiver UE 203. The scheduling DCI may also indicate the resource assignment for the HARQ feedback. The resources used for HARQ feedback for different beams may be TDM-ed and the resources used for HARQ feedback for different UEs on the same beam may be FDM-ed. The scheduling DCI may indicate the time or frequency resource for the HARQ feedback, e.g., symbol index, mini-slot index, RB index, etc. Or the scheduling DCI may indicate the time or frequency offset between the HARQ feedback and the initial transmission, e.g., symbol offset, mini-slot offset RB offset, etc. If the retransmission is triggered by the receiver UE 203, the receiver UE 203 may send the HARQ feedback to the transmitter UE 202 using the assigned HARQ feedback resource. If the retransmission is triggered by the gNB 201, the receiver UE 203 may send the HARQ feedback to the gNB 201 using the assigned HARQ feedback resource.

Beam sweeping information field. The scheduling DCI may indicate the number of the beam sweeping a UE need to perform. The UE may be dynamically signaled with the value of the number of the beam sweeping by the scheduling DCI. Or the RRC may configure multiple potential values of the number of the beam sweeping where each value is associated with an index. The UE may be signaled with one index and determine the values of the number of the beam sweeping. The beams used for beam sweeping may be indicated by the gNB 201. Or the beams used for beam sweeping may be autonomously determined by the transmitter UE 202 based on the sensing or discovering.

Frequency domain resource assignment field. To determine the frequency domain resource for groupcast sidelink transmission, a UE may be indicated with the information of the lowest RB, RBG, or subchannel to be used. A UE may be signaled with the index of the lowest RB or RBG. Or the UE may be signaled with the offset between the lowest RB, RBG, or subchannel of the frequency domain resource assignment and the lowest RB, RBG, or subchannel of the RRC configured candidate frequency domain resources. The offset may be in RBs or in RBGs.

To determine the range of the frequency domain resources, a bitmap or the width of the frequency domain resource may be indicated by the scheduling DCI. For one example, a UE may be signaled with a bitmap. The bitmap may indicate which frequency resources within the RRC configured candidate frequency resources are used for groupcast sidelink transmission. For another example, a UE may be signaled with the width of the frequency domain resource, e.g., w. Then the UE may use the w contiguous RB, RBG, or subchannel for groupcast sidelink transmission.

For groupcast sidelink transmission, a UE may send the same information to multiple directions. The UE may be indicated with one frequency domain resource and use the same frequency domain resource for the transmission of all the directions. Or a UE may be signaled with different frequency domain resources for the transmission of different directions respectively.

For groupcast sidelink transmission, the scheduling DCI may indicate the frequency domain resources for both PSCCH or PSSCH. The frequency domain resource for PSCCH and PSSCH may be jointly assigned by the scheduling DCI, e.g., one frequency domain resource assignment may be used for both PSCCH and PSSCH. Or the frequency domain resource for PSCCH or PSSCH may be assigned separately by the scheduling DCI. For example, the scheduling DCI may assign two frequency domain resources for PSCCH or PSSCH respectively.

Slot format indicator field. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the RRC configured candidate time resource and the DCI signaled SFI, the DCI may overwrite the RRC configuration. The UE may skip the conflict symbols and not perform sidelink transmission on them. For example, assume the symbol k in slot m is configured as the candidate time resource in the RRC configuration. If the symbol k in slot m is labeled as 'D' in the SFI, the UE may not treat the symbol k in slot m as candidate time resource. When the UE determines the time resource for groupcast sidelink transmission, the UE may skip the symbol k in slot m. If the candidate time resource is in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

The symbols used for sidelink communication may be further divided into symbols used for sidelink transmission and symbols used for sidelink reception. We disclose the labels 'ST' and 'SR' may be introduced for slot format. For a transmitter UE 202, the UE may use the symbols labeled by the SFI as 'ST' for sidelink transmission and may use the symbols labeled by the SFI as 'SR' for receiving the feedback, e.g., HARQ feedback. For a receiver UE 203, the UE may use the symbols labeled by the SFI as 'ST' for receiving the sidelink transmission and may use the symbols labeled by the SFI as 'SR' for sending the feedback, e.g., HARQ feedback.

Dynamic Resource Assignment for Unicast and Groupcast

Dynamic Resource Assignment for Unicast and Groupcast—General signaling design and UE behavior for unicast or groupcast use cases: The subject matter disclosed herein with regard to dynamic resource assignment (e.g., FIG. 10-FIG. 16 and associated description) may be for unicast or groupcast. In NR V2X mode 1, the gNB 201 may dynamically schedule the unicast or groupcast transmission on the sidelink through the scheduling grant. For unicast or groupcast, the Tx UE 202 or the Rx UE 203 should be aware of the resources used for transmission and reception. The transmission scheduling may be indicated by the scheduling DCI transmitted on the Uu interface with following examples.

Scheduling DCI transmitted on the Uu interface Example 1: the gNB 201 may send the scheduling DCIs to the Tx UE 202 or Rx UE 203. Shared resources may be used to transmit the scheduling DCIs for the Tx UE 202 or the Rx UE 203, e.g., SDM-ed. In this case, a UE may be configured with one CORESET for monitoring the scheduling DCI for Tx UE 202 or Rx UE 203. Or, dedicated resources may be used to transmit the scheduling DCIs for the Tx UE 202 and the Rx UE 203, e.g., TDM-ed or FDM-ed. In this case, a UE may be configured with one CORESET or two different CORESETs for monitoring the scheduling DCI for Tx UE 202 or the scheduling DCI for Rx UE 203.

Scheduling DCI transmitted on the Uu interface Example 2: the gNB 201 may send the scheduling DCI to the Tx UE 202 only. By decoding the scheduling DCI, the Tx UE 202 may determine the scheduled grant for feedback in the received DCI. Then, the Tx UE 202 may use SCI to indicate the received sidelink transmission scheduling to the Rx UE 203. For example, the resource assignment for PSSCH, e.g., for data transmission or for transmitting the reference signal for measurement, and the resource assignment feedback, e.g., HARQ feedback or CSI feedback. The Rx UE 203 may be configured with monitoring occasions to monitor the SCI. By decoding the SCI, the Rx UE 203 may determine the resources used for PSSCH and feedback.

Figure 10:
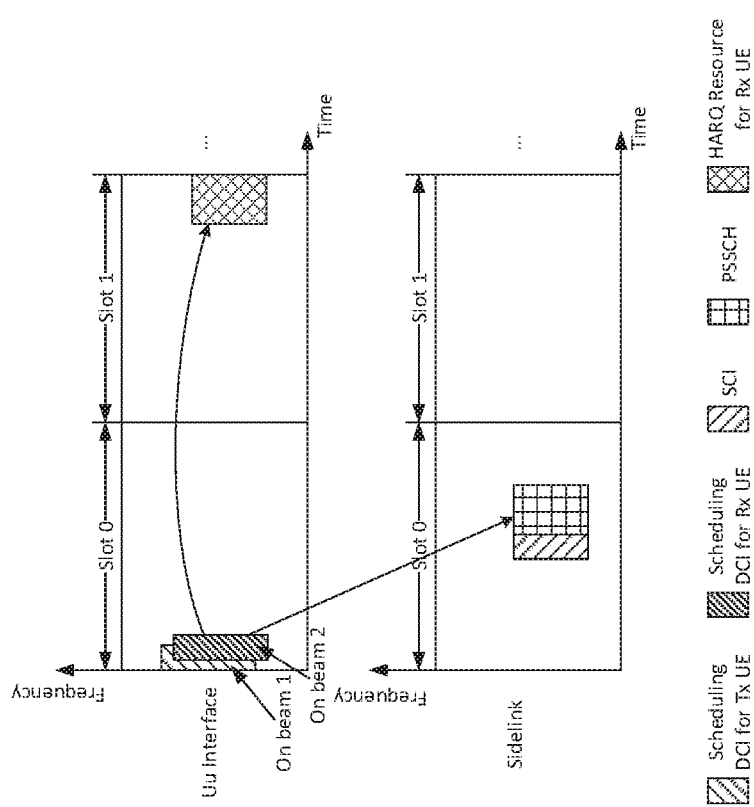
FIG. 10 illustrates an exemplary transmission for scheduling DCIs to both Tx UE and Rx UE with HARQ feedback transmitted from Rx UE to gNB.

When the gNB 201 sends the scheduling DCIs to the Tx UE 202 and Rx UE 203, the gNB 201 may schedule the sidelink communication through following examples:

Scheduling DCIs to both—Schedule the sidelink communication Example 1: the gNB 201 may transmit the scheduling DCIs to Tx UE 202 or Rx UE 203, where the HARQ feedback is transmitted from Rx UE 203 to gNB 201 through the Uu interface. FIG. 10 shows an example of unicast use case.

The scheduling DCI may carry the time and frequency resource assignment for the sidelink transmission, e.g., resource assignment for SCI and PSSCH, so both the Tx UE 202 or Rx UE 203 may know the resources used for transmitting or receiving the data on the sidelink.

The scheduling DCI may carry the information of the resources used for the HARQ feedback. The resources used for HARQ may be explicitly indicated by the scheduling DCI, e.g., indicated the time and frequency resource; or may be implicitly indicated by the scheduling DCI, e.g., index of the HARQ feedback resource configuration configured by the RRC. For a UE scheduled to transmit on the sidelink, the UE may ignore the resource assignment for the HARQ feedback. For a UE scheduled to receive on the sidelink, the UE may send the HARQ feedback to the gNB 201 using the assigned resources through the Uu interface.

Figure 11:
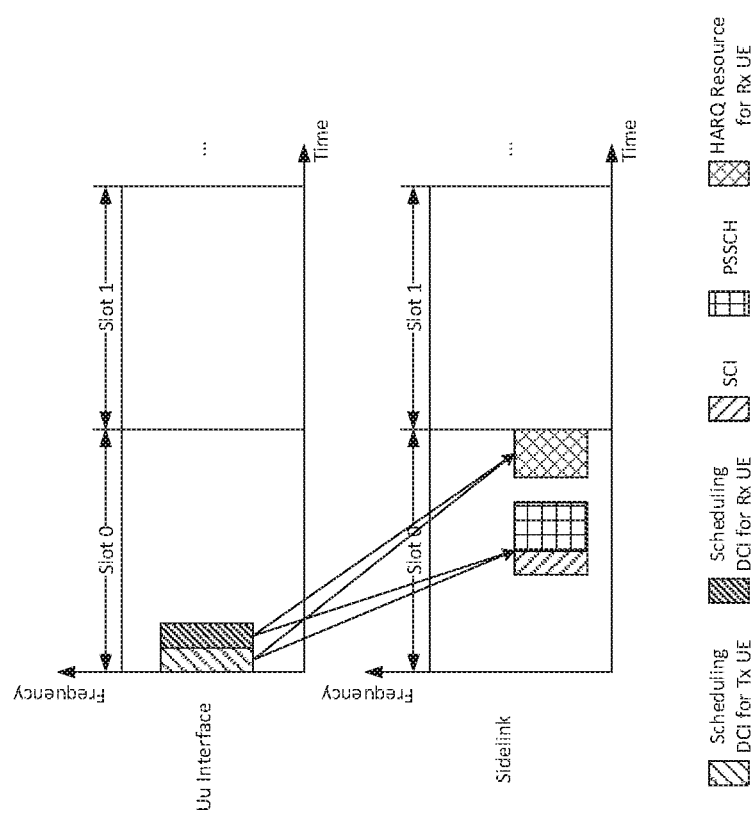
FIG. 11 illustrates an exemplary transmission for scheduling DCIs to both Tx UE and Rx UE with HARQ feedback transmitted from Rx UE to Tx UE.

Scheduling DCIs to both—Schedule the sidelink communication Example 2: the gNB 201 may transmit the scheduling DCIs to both Tx UE 202 and Rx UE 203, where the HARQ feedback is transmitted from Rx UE 203 to Tx UE 202 through the sidelink. FIG. 11 shows an example of unicast use case.

The scheduling DCI may carry the time and frequency resource assignment for the sidelink transmission, e.g., resource assignment for SCI and PSSCH, so the Tx UE 202 or Rx UE 203 may know the resources used for transmitting or receiving the data on the sidelink.

The scheduling DCI may carry the information of the resources used for the HARQ feedback. The resources used for HARQ may be explicitly indicated by the scheduling DCI, e.g., indicated the time and frequency resource; or may be implicitly indicated by the scheduling DCI, e.g., index of the HARQ feedback resource configuration configured by the RRC. For a UE scheduled to receive on the sidelink, the UE may send the HARQ feedback to the Tx UE 202 using the assigned resources on the sidelink. For a UE scheduled to transmit on the sidelink, the UE may monitor or receive the HARQ feedback in the assigned resources.

Figure 12:
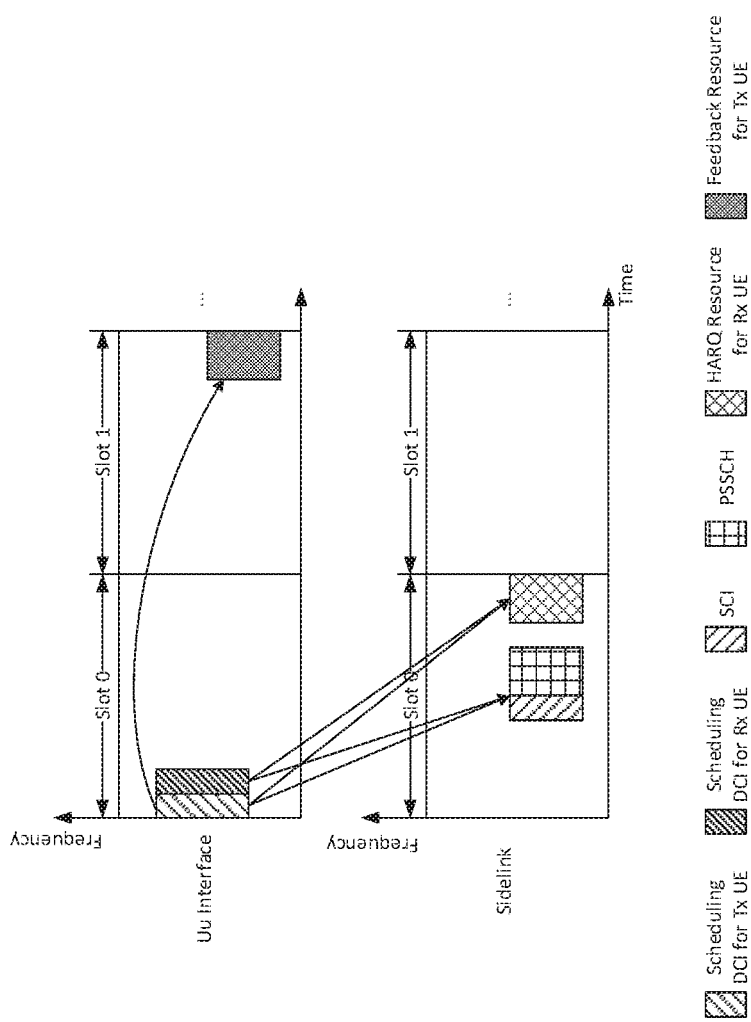
FIG. 12 illustrates an exemplary transmission for scheduling DCIs to both Tx UE and Rx UE with HARQ feedback transmitted from Rx UE to Tx UE and feedback from Tx UE to gNB.

Scheduling DCIs to both—Schedule the sidelink communication Example 3: the gNB 201 may transmit the scheduling DCIs to both Tx UE 202 and Rx UE 203, where the HARQ feedback is first transmitted from Rx UE 203 to Tx UE 202 on the sidelink, then the Tx UE 202 may feedback the received information to the gNB 201 through Uu interface. FIG. 12 shows an example of unicast use case.

The Tx UE 202 may forward all the received HARQ feedback to the gNB 201. Or to reduce the overhead, the Tx UE 202 may feedback compact information to the gNB 201.

The scheduling DCI may carry the time and frequency resource assignment for the sidelink transmission, e.g., resource assignment for SCI and PSSCH, so the Tx UE 202 or Rx UE 203 may know the resources used for transmitting or receiving the data on the sidelink.

The scheduling DCI may carry the information of the resources used for the HARQ feedback. The resources used for HARQ may be explicitly indicated by the scheduling DCI, e.g., indicated the time or frequency resource; or may be implicitly indicated by the scheduling DCI, e.g., index of the HARQ feedback resource configuration configured by the RRC. For a UE scheduled to receive on the sidelink, the UE may send the HARQ feedback to the Tx UE 202 using the assigned resources on the sidelink. For a UE scheduled to transmit on the sidelink, the UE may monitor or receive the HARQ feedback in the assigned resources.

The scheduling DCI may carry the time and frequency resource assignment for the feedback from Tx UE 202 to gNB 201. For a UE scheduled to receive on the sidelink, the UE may ignore the resource assignment for the feedback from Tx UE 202 to gNB 201. For a UE scheduled to transmit on the sidelink, the UE may send the feedback to the gNB 201 using the assigned resources through the Uu interface.

When the gNB 201 sends the scheduling DCIs to the Tx UE 202 and Rx UE 203, same DCI format may be used for the Tx UE 202 and the Rx UE 203, e.g., the scheduling DCIs for Tx UE 202 and Rx UE 203 may carry the same DCI fields. For example, the DCI for Tx UE 202 and Rx UE 203 may be scrambled with the same RNTI, e.g., SLUnicast-RNTI SLGroupcast-RNTL A UE may check the transmission/reception indicator field in the DCI to determine whether it is scheduled to be the Tx UE 202 or be the Rx UE 203.

Or the scheduling DCIs for Tx UE 202 or Rx UE 203 may be transmitted in different DCI formats, e.g., the scheduling DCIs for Tx UE 202 or Rx UE 203 may carry different DCI fields. For example, the DCI for Tx UE 202 or Rx UE 203 may be scrambled with different RNTIs. A UE may be configured with two RNTIs for unicast and groupcast respectively, e.g., SLUnicastTx-RNTI or SLUnicastRx-RNTI, or SLGroupcastTx-RNTI or SLGroupcastRx-RNTI. If a UE detects the DCI is scrambled with SLUnicastTx-RNTI or SLGroupcastTx-RNTI the UE may determine it is scheduled for transmission on the sidelink. If a UE detects the DCI is scrambled with SLUnicastRx-RNTI or SLGroupcastRx-RNTI the UE may determine it is scheduled for reception on the sidelink.

Figure 13:
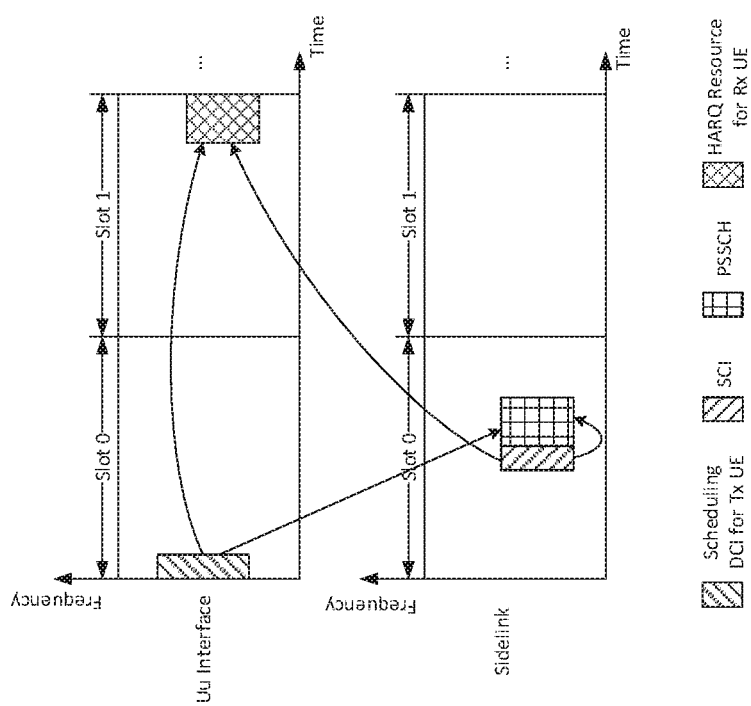
FIG. 13 illustrates an exemplary transmission for scheduling DCI to Tx UE with HARQ feedback transmitted from Rx UE to gNB.

When the gNB 201 sends the scheduling DCI only to the Tx UE 202, the gNB 201 may schedule the sidelink communication through following examples:

Scheduling DCI only—Schedule the sidelink communication Example 1: the gNB 201 may transmit the scheduling DCI only to the Tx UE 202, where the HARQ feedback is transmitted from Rx UE 203 to gNB 201 through the Uu interface. FIG. 13 shows an example of unicast use case.

The scheduling DCI may carry the time and frequency resource assignment for the sidelink transmission, e.g., resource assignment for SCI and PSSCH. The Tx UE 202 indicates the resource assignment to the Rx UE 203 through the SCI. So, both the Tx UE 202 and Rx UE 203 may know the resources used for transmitting and receiving the data on the sidelink.

The scheduling DCI may carry the information of the resources used for the HARQ feedback. The resources used for HARQ may be explicitly indicated by the scheduling DCI, e.g., indicated the time and frequency resource; or may be implicitly indicated by the scheduling DCI, e.g., index of the HARQ feedback resource configuration configured by the RRC. The Tx UE 202 may indicate the resource assignment to the Rx UE 203 through the SCI. For a UE scheduled to transmit on the sidelink, the UE may ignore the resource assignment for the HARQ feedback. For a UE scheduled to receive on the sidelink, the UE may send the HARQ feedback to the gNB 201 using the assigned resources through the Uu interface.

Figure 14:
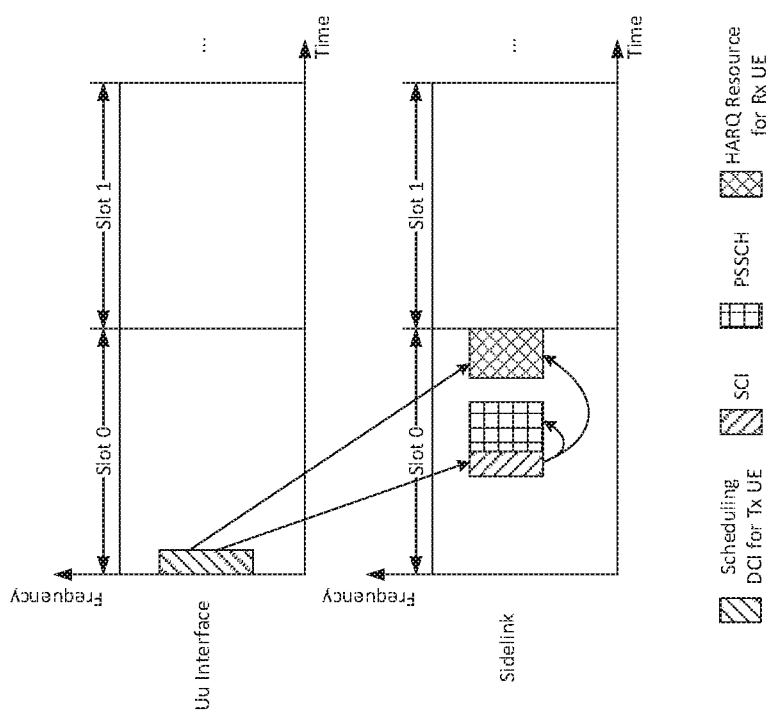
FIG. 14 illustrates an exemplary transmission for scheduling DCI to Tx UE with HARQ feedback transmitted from Rx UE to Tx UE.

Scheduling DCI only—Schedule the sidelink communication Example 2: the gNB 201 may transmit the scheduling DCI only to the Tx UE 202, where the HARQ feedback is transmitted from Rx UE 203 to Tx UE 202 on the sidelink. FIG. 14 shows an example of unicast use case.

The scheduling DCI may carry the time and frequency resource assignment for the sidelink transmission, e.g., resource assignment for SCI and PSSCH. The Tx UE 202 indicates the resource assignment to the Rx UE 203 through the SCI. So, both the Tx UE 202 and Rx UE 203 may know the resources used for transmitting and receiving the data on the sidelink.

The scheduling DCI may carry the information of the resources used for the HARQ feedback. The resources used for HARQ may be explicitly indicated by the scheduling DCI, e.g., indicated the time and frequency resource; or may be implicitly indicated by the scheduling DCI, e.g., index of the HARQ feedback resource configuration configured by the RRC. The Tx UE 202 indicates the resource assignment to the Rx UE 203 through the SCI. For a UE scheduled to receive on the sidelink, the UE may send the HARQ feedback to the Tx UE 202 using the assigned resources on the sidelink. For a UE scheduled to transmit on the sidelink, the UE may monitor or receive the HARQ feedback in the assigned resources.

Scheduling DCI only—Schedule the sidelink communication Example 3: the gNB 201 may transmit the scheduling DCI only to the Tx UE 202, where the HARQ feedback is first transmitted from Rx UE 203 to Tx UE 202 on the sidelink, then the Tx UE 202 feedbacks the received information to the gNB 201 through Uu interface.

Figure 15A:
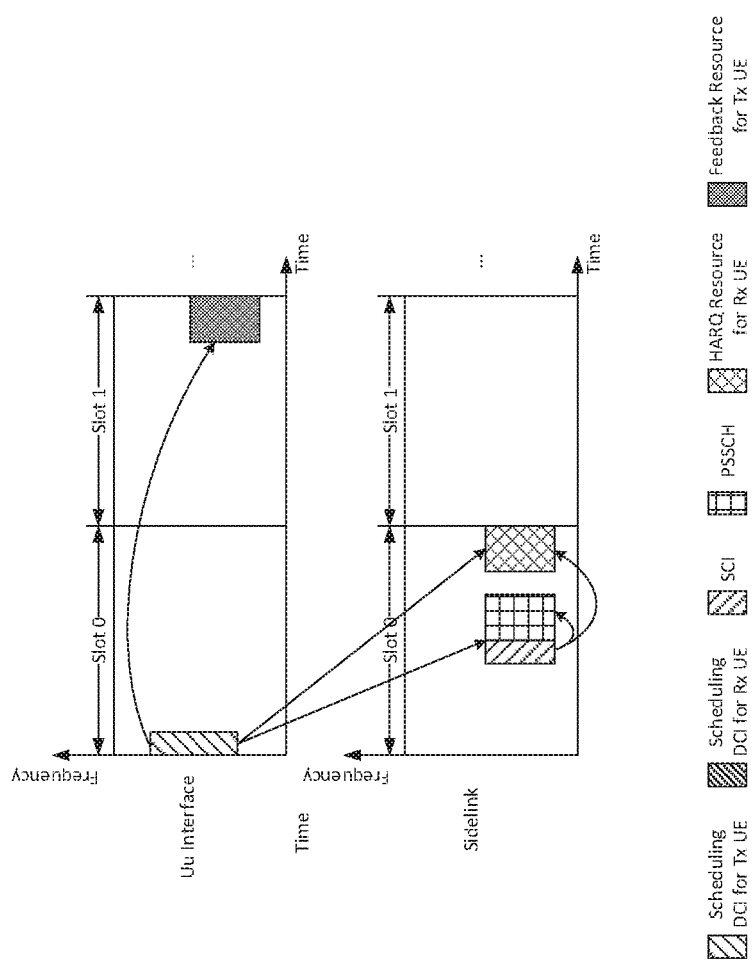
FIG. 15A illustrates an exemplary transmission for scheduling DCI to Tx UE with HARQ feedback transmitted from Rx UE to Tx UE and feedback from Tx UE to gNB.
Figure 15B:
FIG. 15B illustrates an exemplary method for scheduling DCI to Tx UE with HARQ feedback transmitted from Rx UE to Tx UE and feedback from Tx UE to gNB.

FIG. 15A shows an example of a use case. FIG. 15B illustrates an exemplary method flow. In summary, with further detail below, at step 251, the scheduling DCI may be obtained by Tx UE 202. At step 252, Tx UE 202 may send a transmission to Rx UE 203 via sidelink. At step 253, based on step 252, Tx UE 202 may receive feedback from Rx UE 203. As provided in more detail herein, with regard to FIG. 15 and other figures (e.g. FIG. 20-FIG. 22 or FIG. 6-FIG. 7, etc.) there may be different scheduling and other approaches associated with scheduling DCI.

The Tx UE 202 may send (e.g., forward) all the received HARQ feedback to the gNB 201. Or to reduce the overhead, the Tx UE 202 may feedback compact information. The scheduling DCI may carry the time and frequency resource assignment for the sidelink transmission, e.g., resource assignment for SCI and PSSCH. The Tx UE 202 indicates the resource assignment to the Rx UE 203 through the SCI. So, both the Tx UE 202 or Rx UE 203 may know the resources used for transmitting and receiving the data on the sidelink.

The scheduling DCI may carry the information of the resources used for the HARQ feedback transmitted from the Rx UE 203 to the Tx UE 202. The resources used for HARQ may be explicitly indicated by the scheduling DCI, e.g., indicated the time and frequency resource; or may be implicitly indicated by the scheduling DCI, e.g., index of the HARQ feedback resource configuration configured by the RRC. The Tx UE 202 indicates the resource assignment to the Rx UE 203 through the SCI. For a UE scheduled to receive on the sidelink, the UE may send the HARQ feedback to the Tx UE 202 using the assigned resources on the sidelink. For a UE scheduled to transmit on the sidelink, the UE may monitor or receive the HARQ feedback in the assigned resources. For example, the scheduling DCI may carry one DCI field indicating the resources used for transmitting the HARQ feedback from the Rx UE 203(s) to the Tx UE 202, e.g., PSFCH resource indicator field, where each value may be associated with an indexed PSFCH resource configured by the RRC configuration or pre-defined in the specification.

A UE may be configured with common PSFCH resource configuration or dedicated PSFCH resource configuration used for transmitting the HARQ feedback from the Rx UE 203(s) to the Tx UE 202 on the sidelink. For example, a UE may be configured with common RRC configuration psfch-ResourceCommon through the broadcast signaling, e.g., through RMSI or OSI; or a UE may be may configured with dedicated RRC configuration PSFCH-ResourceSet. A PSFCH-ResourceSet may include one or multiple of RRC configuration PSFCH-Resource, where an example of the RRC configuration PSFCH-Resource is shown in FIG. 19.

For the case that only one of the common configuration and the dedicated configuration is supported, when a UE receives the scheduling DCI and decodes the PSFCH resource indicator field, the UE may determine the corresponding PSFCH resource through the configured psfch-ResourceCommon or the configured PSFCH-ResourceSet.

For the case that both of the common configuration and the dedicated configuration are supported, when a UE receives the scheduling DCI and decodes the PSFCH resource indicator field, the UE may determine the corresponding PSFCH resource through dedicated RRC configuration PSFCH-ResourceSet; or through the common RRC configuration psfch-ResourceCommon if dedicated RRC configuration is not configured For another example, the scheduling DCI may carry one DCI field indicating the timing for transmitting the HARQ feedback from the Rx UE 203 to the Tx UE 202, e.g., SL HARQ timing indicator field.

In one approach, the indicated timing may be the time offset between the HARQ feedback (from the Rx UE 203 to the Tx UE 202) and the scheduled initial transmission on the sidelink. For example, a UE may be RRC configured with the candidate time offsets through RRC parameter sl-InitalDataToSL-ACK with the content of 'SEQUENCE (SIZE (8)) OF INTEGER (0 . . . 15)', where the time offset may be in slots, mini-slots, or symbols. When a UE receives the scheduling DCI and decodes the SL HARQ timing indicator field, the UE may determine the time offset by finding the corresponding entry in the configured RRC parameter sl-InitalDataToSL-ACK.

In another approach, the indicated timing may be the time offset between the HARQ feedback (from the Rx UE 203 to the Tx UE 202) and the scheduled last repetition/retransmission (in other words repetition or retransmission) for the transmission block (TB) on the sidelink. Assume k repetitions/retransmissions are scheduled by the scheduling DCI, the SL HARQ timing indicator field indicates the time offset between the HARQ feedback and the scheduled $k^{th}$ repetition/retransmission. If no repetition is scheduled, e.g., k=0, the SL HARQ timing indicator field indicates the time offset between the HARQ feedback and the scheduled initial transmission. For example, a UE may be RRC configured with the candidate time offsets through RRC parameter sl-LastDataToSL-ACK with the content of 'SEQUENCE (SIZE (8)) OF INTEGER (0 . . . 15)', where the time offset may be in slots, mini-slots, or symbols. When a UE receives the scheduling DCI or decodes the UL HARQ timing indicator field, the UE may determine the time offset by finding the corresponding entry in the configured RRC parameter sl-LastDataToSL-ACK.

The scheduling DCI may carry the time and frequency resource assignment for the feedback from Tx UE 202 to gNB 201. The Tx UE 202 may not indicate the resource assignment to the Rx UE 203 through the SCI. For a UE scheduled to transmit on the sidelink, the UE may send the feedback to the gNB 201 using the assigned resources through the Uu interface. For example, the scheduling DCI may carry one DCI field indicating the resources used for transmitting the HARQ feedback from the V2X UE (e.g., the Tx UE 202) to the gNB 201, e.g., PUCCH resource indicator field, where each value associated with an indexed PUCCH resource configured by the RRC configuration or pre-defined in the specification.

A UE may be configured with common PUCCH resource configuration or dedicated PUCCH resource configuration used for the transmission of HARQ information of the downlink transmission on the Uu interface. The UE may use the same set of common or dedicated configuration for the transmission of HARQ information on the Uu interface for the sidelink transmission on the sidelink. For example, when a UE receives the scheduling DCI or decodes the PUCCH resource indicator field, the UE may determine the corresponding PUCCH resource through dedicated RRC configuration PUCCH-ResourceSet in PUCCH-Config or through the common RRC configuration pucch-ResourceCommon in SIB1 if dedicated RRC configuration is not configured.

Or, the UE may be configured with a different set of common or dedicated configuration for the transmission of HARQ information on the Uu interface for the sidelink transmission on the sidelink. For example, a UE may be may configured with common RRC configuration pucch-sl-ResourceCommon through the broadcast signaling, e.g., through RMSI or OSI; or a UE may be may configured with dedicated RRC configuration SL-PUCCH-ResourceSet.

For the case that only one of the common configuration and the dedicated configuration is supported, when a UE receives the scheduling DCI and decodes the PUCCH resource indicator field, the UE may determine the corresponding PUCCH resource through the configured pucch-sl-ResourceCommon or the configured SL-PUCCH-ResourceSet.

For the case that both of the common configuration and the dedicated configuration are supported, when a UE receives the scheduling DCI or decodes the PUCCH resource indicator field, the UE may determine the corresponding PUCCH resource through dedicated RRC configuration SL-PUCCH-ResourceSet; or through the common RRC configuration pucch-sl-ResourceCommon if dedicated RRC configuration is not configured For another example, the scheduling DCI may carry one DCI field indicating the timing for transmitting the HARQ feedback from the V2X UE (e.g., the Tx UE 202) to the gNB 201, e.g., UL HARQ timing indicator field.

In one approach, the indicated timing may be the time offset between the HARQ feedback (from the V2X UE to the gNB 201) and the scheduled initial transmission on the sidelink. For example, a UE may be RRC configured with the candidate time offsets through RRC parameter sl-InitalDataToUL-ACK with the content of 'SEQUENCE (SIZE (8)) OF INTEGER (0 . . . 15)', where the time offset may be in slots, mini-slots, or symbols. When a UE receives the scheduling DCI and decodes the UL HARQ timing indicator field, the UE may determine the time offset by finding the corresponding entry in the configured RRC parameter sl-InitalDataToUL-ACK.

In a second approach, the indicated timing may be the time offset between the HARQ feedback (from the V2X UE to the gNB 201) and the scheduled HARQ feedback (from the Rx UE 203 to the Tx UE 202) transmitted on the sidelink. For example, a UE may be RRC configured with the candidate time offsets through RRC parameter sl-ACKToUL-ACK with the content of 'SEQUENCE (SIZE (8)) OF INTEGER (0 . . . 15)', where the time offset may be in slots, mini-slots, or symbols. When a UE receives the scheduling DCI or decodes the UL HARQ timing indicator field, the UE may determine the time offset by finding the corresponding entry in the configured RRC parameter sl-ACKToUL-ACK.

In a third approach, the indicated timing may be the time offset between the HARQ feedback (from the V2X UE to the gNB 201) and the scheduled last repetition/retransmission for the transmission of a TB on the sidelink. Assume k repetitions/retransmissions are scheduled by the scheduling DCI, the UL HARQ timing indicator field indicates the time offset between the HARQ feedback and the scheduled $k^{th}$ repetition/retransmission. If no repetition is scheduled, e.g., k=0, the UL HARQ timing indicator field indicates the time offset between the HARQ feedback and the scheduled initial transmission. For example, a UE may be RRC configured with the candidate time offsets through RRC parameter sl-LastDataToUL-ACK with the content of 'SEQUENCE (SIZE (8)) OF INTEGER (0 . . . 15)', where the time offset may be in slots, mini-slots, or symbols. When a UE receives the scheduling DCI and decodes the UL HARQ timing indicator field, the UE may determine the time offset by finding the corresponding entry in the configured RRC parameter sl-LastDataToUL-ACK.

When gNB schedule a sidelink transmission on using dynamic scheduling grant, the gNB 201 may schedule multiple retransmissions/repetition of a TB along with the scheduling of initial transmission of the TB in using one DCI.

When a gNB 201 dynamically schedule a sidelink transmission of a TB using DCI, the gNB 201 may schedule one or more retransmissions/repetitions of the TB using the same scheduling DCI. The retransmission or the HARQ feedback may be performed by the Tx UE 202 or the Rx UE 203 in the following manners: 1) DCI scheduled blind retransmission on the sidelink; 2) DCI scheduled HARQ feedback based retransmission on the sidelink; or 3) DCI scheduled HARQ feedback based retransmission with early termination transmitted on the Uu interface, among others.

DCI Scheduled Blind Retransmission on the Sidelink

Figure 20:
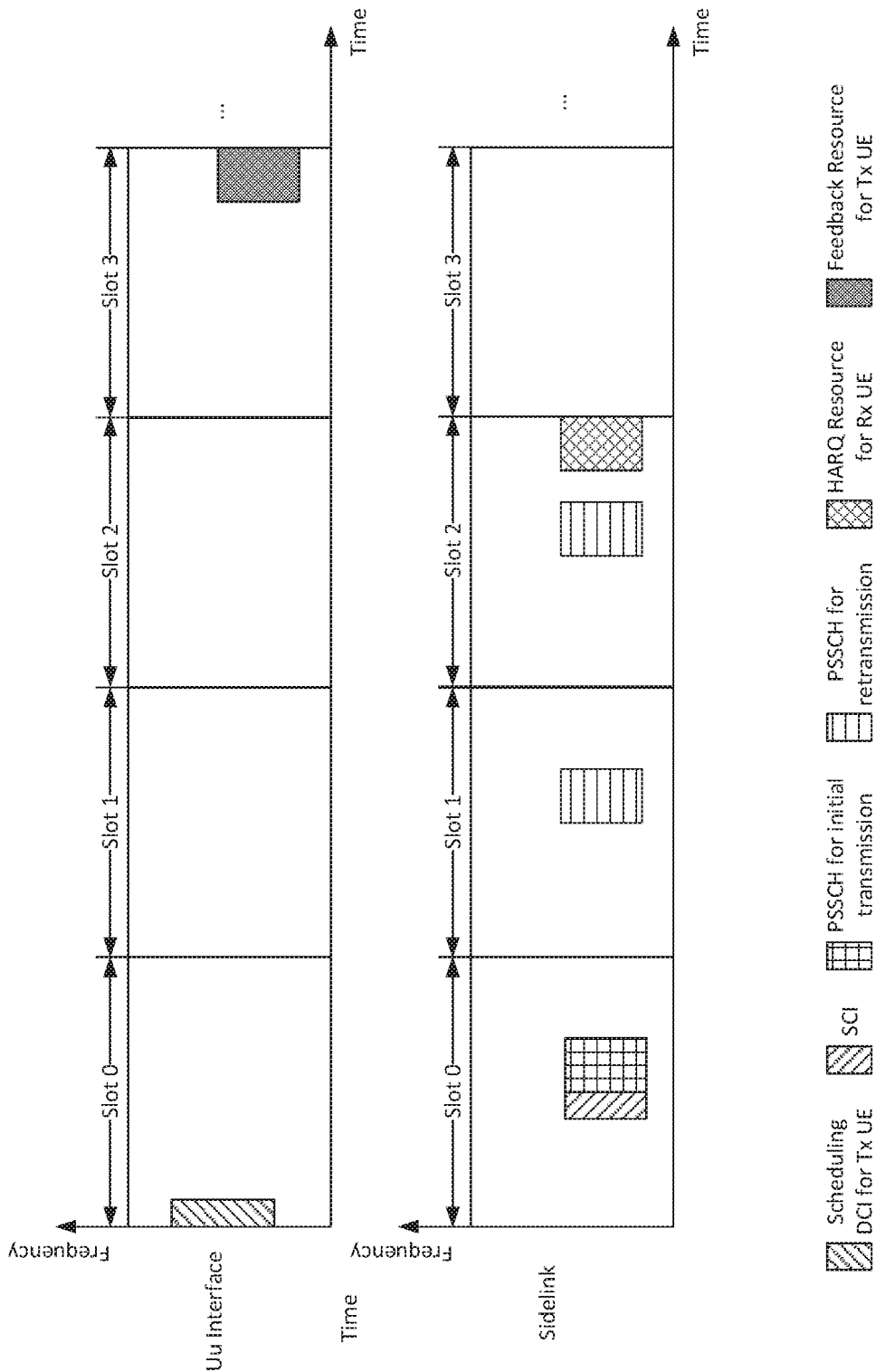
FIG. 20 illustrates an exemplary DCI dynamic scheduled sidelink transmission with blind retransmission.

DCI scheduled blind retransmission on the sidelink: In one case, after receiving the scheduling DCI, the Tx UE 202 may blindly transmit all the scheduled transmissions. For example, the Tx UE 202 may perform all the scheduled initial transmission and retransmissions/repetitions regardless of whether the Rx UE 203 successfully decode the data or not. In this case, one HARQ feedback resources allocation may be scheduled by the DCI on the sidelink for the Rx UE 203(s) transmitting HARQ feedback to the Tx UE 202; and one HARQ feedback resources allocation may be scheduled by the DCI on the Uu interface for the Tx UE 202 transmitting HARQ feedback to the gNB 201. An example is shown in FIG. 20 where the scheduling DCI schedules the initial transmission in slot 0 and two retransmissions in slot 1 and slot 2 respectively. The transmission of SCI is scheduled in slot 0; the transmission of HARQ feedback from Rx UE 203 to Tx UE 202 is scheduled in slot 2; the transmission of HARQ feedback from Tx UE 202 to gNB 201 is scheduled in slot 3.

In the example shown in the figure, the initial transmission and the retransmissions are scheduled in contiguous slots. In another example, the initial transmission and the retransmissions may be scheduled in non-contiguous slots, e.g., initial transmission may be scheduled in slot 0, and the two retransmissions may be scheduled in slot 2 and slot 4 respectively.

The Rx UE 203(s) may determine the scheduled initial transmission and retransmission by decoding the SCI. If the Rx UE 203 fails to receive the sidelink transmission after all the repetitions, the Rx UE 203 may send NACK to the Tx UE 202 using the scheduled HARQ feedback resources, e.g., the HARQ feedback resources in slot 2 in FIG. 20. If the Rx UE 203 successfully receives the sidelink transmission, the Rx UE 203 may send ACK to the Tx UE 202 using the scheduled HARQ feedback resources or the Rx UE 203 may not send anything to the Tx UE 202 on the scheduled HARQ feedback resources. If the Rx UE 203 successfully receives the sidelink transmission before all the scheduled retransmissions, e.g., the Rx UE 203 successfully receives the sidelink transmission after the initial transmission or after the $1^{st}$ retransmission, the Rx UE 203 may skip the rest scheduled retransmissions and not attempt to decode the PSSCH.

After the Tx UE 202 receives the HARQ feedback, e.g., ACK or NACK, from the Rx UE 203, the Tx UE 202 may send the HARQ feedback to the gNB 201 using the scheduled HARQ feedback resources on the Uu interface, e.g., the HARQ feedback resources in slot 3 in FIG. 20.

DCI Scheduled HARQ Feedback Based Retransmission on the Sidelink

Figure 21:
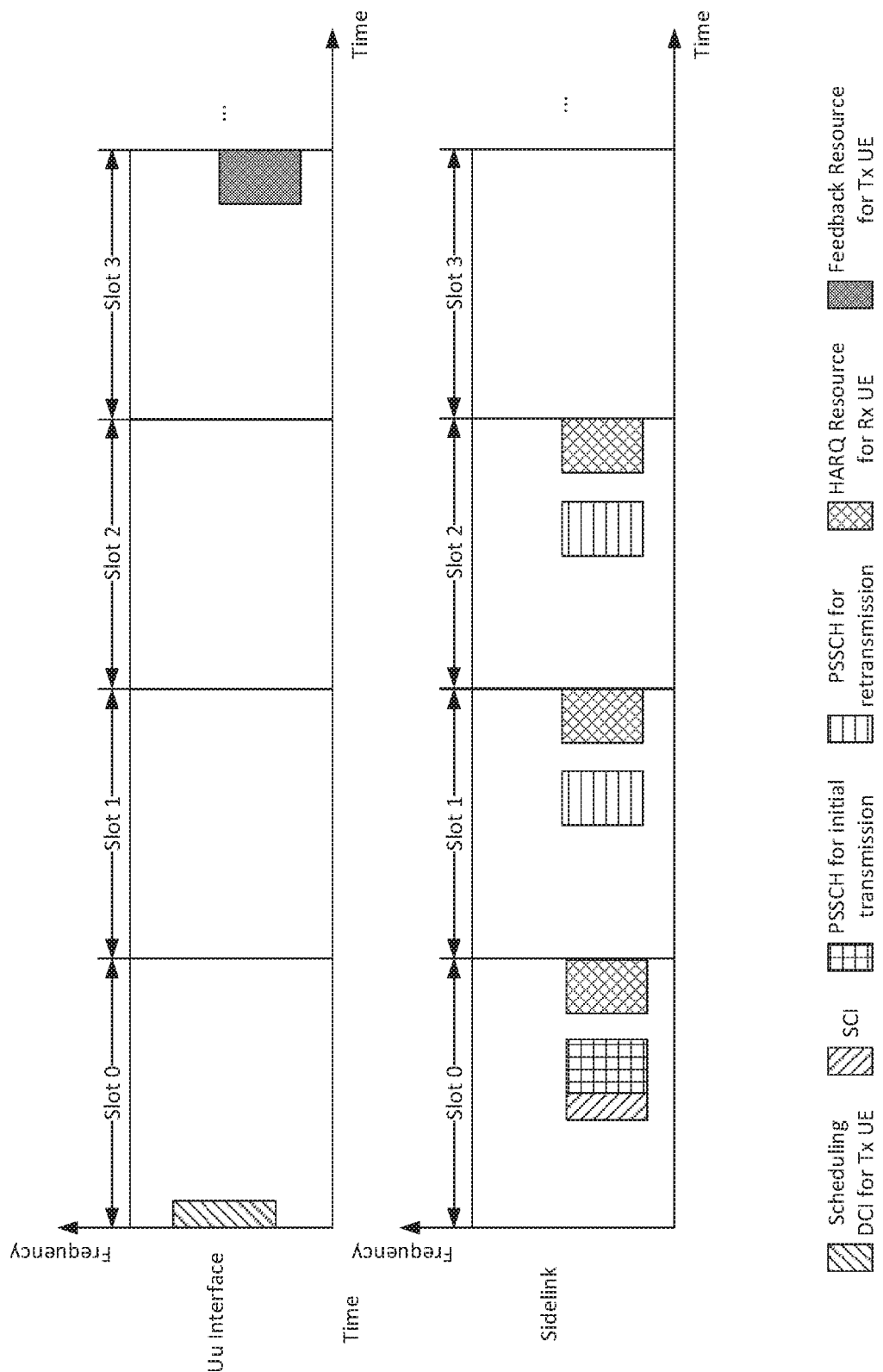
FIG. 21 illustrates an exemplary DCI dynamic scheduled sidelink transmission with HARQ feedback based retransmission.

DCI scheduled HARQ feedback based retransmission on the sidelink: In another case, the scheduling DCI may schedule HARQ feedback based retransmission on the sidelink. An example is shown in FIG. 21 where the scheduling DCI schedules the initial transmission in slot 0 and two retransmissions in slot 1 and slot 2 respectively. The scheduling DCI schedules the transmission of HARQ feedback from Rx UE 203 to Tx UE 202 associated with the initial transmission and the two retransmissions in slot 0, slot 1 and slot 2 respectively. The transmission of SCI is scheduled in slot 0; the transmission of HARQ feedback from Tx UE 202 to gNB 201 is scheduled in slot 3.

In the example shown in the figure, the sidelink transmission and the associated HARQ feedback on the sidelink are scheduled in the same slot. In another example, the sidelink transmission and the associated HARQ feedback may be scheduled in different slots, e.g., the transmission of HARQ feedback from Rx UE 203 to Tx UE 202 may be scheduled in slot 1, slot 2 and slot 3 respectively. The initial transmission and the retransmissions may be scheduled in contiguous slots as shown in FIG. 20, or may be scheduled in non-contiguous slots as well, e.g., the initial transmission and the associated HARQ feedback are scheduled in slot 0 and slot 1 respectively; the $1^{st}$ retransmission and the associated HARQ feedback are scheduled in slot 2 and slot 3 respectively; the $2^{nd}$ retransmission and the associated HARQ feedback are scheduled in slot 4 and slot 5 respectively and etc.

The Rx UE 203(s) may determine the scheduled initial transmission and retransmission by decoding the SCI. For each transmission, the Rx UE 203 may send HARQ feedback, e.g., ACK/NACK based feedback or NACK only based feedback, using the associated HARQ feedback resources to the Tx UE 202. The Tx UE 202 may perform the scheduled retransmissions for a TB until the Rx UE 203 successfully receives the TB. If the Tx UE 202 receives NACK on all the HARQ feedback on the sidelink, the sidelink transmission is failed. The Tx UE 202 may send NACK to the gNB 201 using the scheduled HARQ feedback resources on the Uu interface. If the scheduled sidelink transmission is succeeded, the Tx UE 202 may send ACK to the gNB 201 using the scheduled HARQ feedback resources.

If the scheduled sidelink transmission for a TB, e.g., TB 1, is succeeded before all the scheduled retransmissions are performed, the Tx UE 202 may transmit another TB, e.g., TB 2, using the resources for the rest retransmissions. With an example shown in FIG. 21, if the transmission of TB 1 is succeeded in slot 0, the Tx may transmit TB 2 using the scheduled resources in slot 1 and slot 2. For the Rx UE 203, after successfully receiving the scheduled TB, the Rx UE 203 may continue to monitor and decode the PSSCH transmitted on the resources for the remained retransmissions; and send feedback to the Tx UE 202 using the associated feedback resources. The Tx UE 202 may send the HARQ feedback to gNB 201 based on the transmission result for the scheduled TB. For example, if the transmission of TB 1 is succeeded in slot 0, and the transmission of TB 2 in slot 1 and slot 2 are failed, the Tx UE 202 may still send ACK to the gNB 201 using the resources in slot 3.

In another approach, if the scheduled sidelink transmission is succeeded before all the scheduled retransmissions are performed, the unused resources, e.g., the resources scheduled for retransmission and the associated HARQ feedback on the sidelink, may be released. The Tx UE 202 may not transmit data on the rest scheduled retransmissions. The Rx UE 203 may skip decoding the rest scheduled retransmissions and not send feedback on the associated resources. Once the resources are released, mode-2 V2X UE(s) may schedule sidelink transmission on them.

The scheduling DCI may use one PSFCH resource indicator field and one SL HARQ timing indicator field to indicate multiple HARQ feedback resources on the sidelink. For example, the SL HARQ timing indicator field may indicate the time offset between each initial transmission/retransmission and its associated HARQ feedback resources. For example, the Tx UE 202 may first determine the resources for initial transmission and retransmissions. Then the Tx UE 202 may apply the indicated time offset to them and determine the associated HARQ feedback resources on the sidelink. After the Tx UE 202 decode the PSFCH resource indicator field and the SL HARQ timing indicator field in the scheduling DCI, it may forward the information to the Rx UE 203(s), e.g., by transmitting the same fields with same values in the SCI to the Rx UE 203. Similar to the Tx UE 202, based on the scheduled retransmission is blind retransmission or HARQ feedback based retransmission, the Rx UE 203 may determine the scheduled HARQ feedback resources on the sidelink correspondingly. When two stage SCI is applied, the PSFCH resource indicator field and the SL HARQ timing indicator field may be carried by the $1^{st}$ stage SCI.

Figure 22:
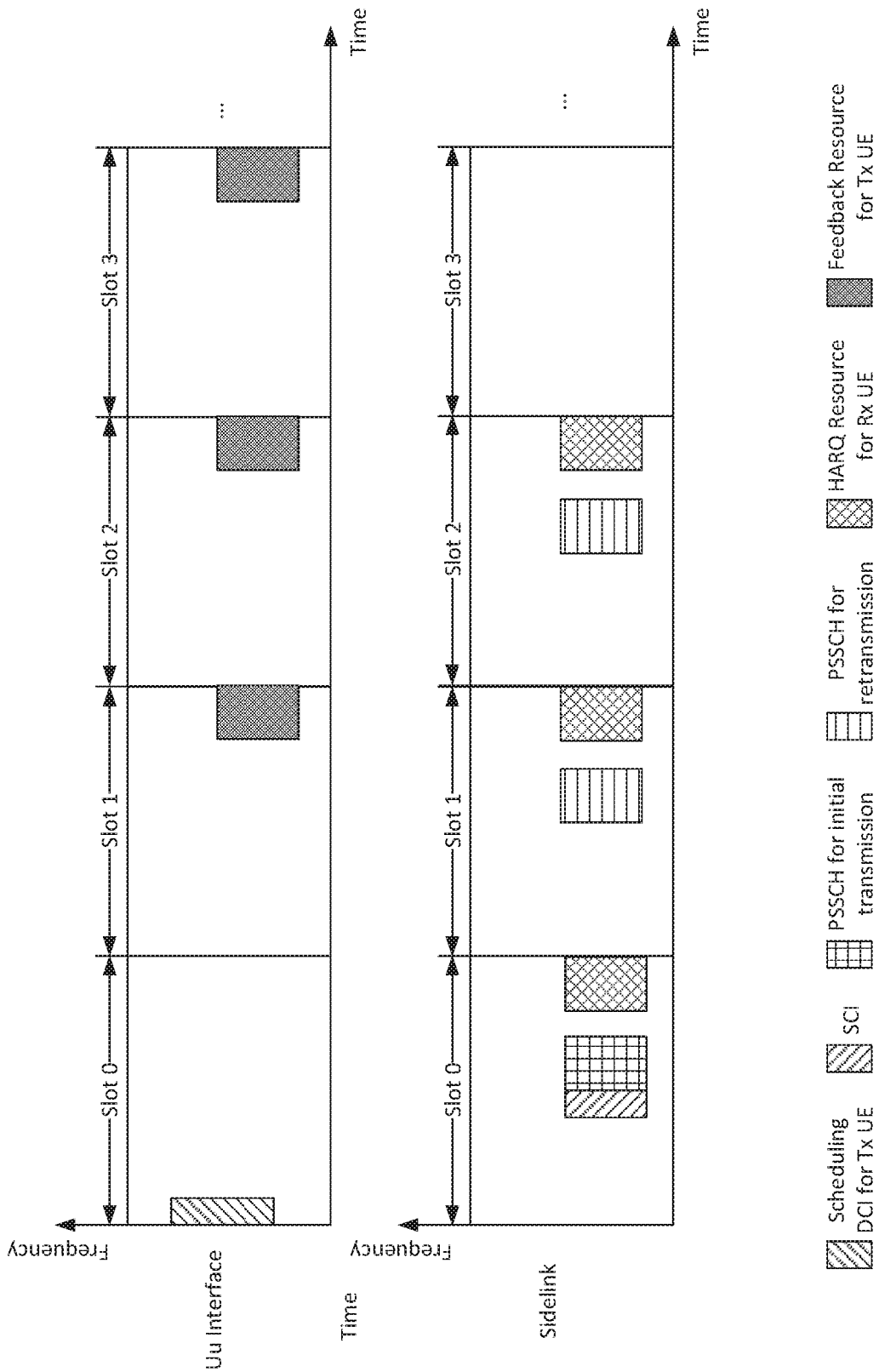
FIG. 22 illustrates an exemplary DCI dynamic scheduled sidelink transmission with HARQ feedback based retransmission and early termination transmitted on the Uu interface.

DCI Scheduled HARQ Feedback Based Retransmission with Early Termination Transmitted on the Uu Interface DCI scheduled HARQ feedback based retransmission with early termination transmitted on the Uu interface: In yet another case, the scheduling DCI may schedule HARQ feedback based retransmission with early termination transmitted on the Uu interface. An example is shown in FIG. 22 where the SCI is scheduled in slot 0; the initial transmission, the associated HARQ feedback resources (from Rx UE 203 to Tx UE 202) on the sidelink or the associated HARQ feedback resources (from Tx UE 202 to gNB 201) on the Uu interface are scheduled in slot 0, slot 0 and slot 1 respectively; the $1^{st}$ retransmission, the associated HARQ feedback resources on the sidelink and the associated HARQ feedback resources on the Uu interface are scheduled in slot 1, slot 1 and slot 2 respectively; the $2^{nd}$ retransmission, the associated HARQ feedback resources on the sidelink and the associated HARQ feedback resources on the Uu interface are scheduled in slot 2, slot 2 and slot 3 respectively.

In the example shown in the figure, the HARQ feedback resources on the Uu interface for the initial transmission and the HARQ feedback resources for the $1^{st}$ retransmission on the sidelink are scheduled in the same slot. In another example, they may be scheduled in different slots. For example, the initial transmission, the associated HARQ feedback resources on the sidelink and the associated HARQ feedback resources on the Uu interface are scheduled in slot 0, slot 0 and slot 1 respectively; the $1^{st}$ retransmission, the associated HARQ feedback resources on the sidelink and the associated HARQ feedback resources on the Uu interface are scheduled in slot 2, slot 2 and slot 3 respectively; the $2^{nd}$ retransmission, the associated HARQ feedback resources on the sidelink and the associated HARQ feedback resources on the Uu interface are scheduled in slot 4, slot 4 and slot 5 respectively. The sidelink transmission or the associated HARQ feedback on the sidelink may be scheduled in the same slot; or may be scheduled in different slots as well.

The Rx UE 203(s) may determine the scheduled initial transmission and retransmission by decoding the SCI. For each transmission, the Rx UE 203 may send HARQ feedback, e.g., ACK/NACK based feedback or NACK only based feedback to the Tx UE 202 using the scheduled HARQ feedback resources on the sidelink. The Tx UE 202 may be scheduled with dedicated HARQ feedback resources on the Uu interface for each initial transmission or retransmissions.

If the scheduled transmission is not succeeded after a transmission, where the transmission may be the initial transmission or a retransmission (not including the last retransmission), the Tx UE 202 may not transmit any feedback on the HARQ feedback resource on the Uu interface and may skip it.

If the scheduled transmission is succeeded before the last retransmission, the Tx UE 202 may send an early termination indication to the gNB 201 to release the reserved resources so that the gNB 201 may use them for other purpose. Using FIG. 21 as an example, if the transmission is succeeded after the $1^{st}$ retransmission, the Tx UE 202 may not transmit the remained scheduled retransmission(s), e.g., the $2^{nd}$ retransmission in the figure; and send ACK to gNB 201 using the associated HARQ feedback resources on the Uu interface e.g., the HARQ feedback resources on the Uu interface in slot 2 in the figure, to indicate the remaining reserved resources are released. The Rx UE 203 may skip decoding the rest scheduled retransmissions and not send feedback on the associated resources on the sidelink.

Once the gNB 201 reserved resources are released, in one approach, only the gNB 201 may schedule other sidelink transmission on the released resources. Or, in another approach, both the gNB 201 and mode-2 V2X UE(s) may schedule sidelink transmission on the released resources. In one case, one of the above two approaches may be supported. In another case, both of the above two approaches may be supported. In this case, a Tx UE 202 may be signaled by the gNB 201 with whether the released resources can be only reused by the gNB 201 or can be reused by both the gNB 201 and mode-2 V2X UE(s). The signaling may be done through DCI signaling, e.g., by the resource reuse indicator field in the scheduling DCI. For example, when the field is set to '0', it indicates the released resources can be only reused by the gNB 201; when the field is set to '1', it indicates the released resources can be reused by the gNB 201 and mode-2 V2X UE(s). The signaling may be also done by the RRC configuration, e.g., through RRC parameter Released-Resource-Reuse. For example, if a UE is configured with Released-Resource-Reuse to be 'gNB only', the released resources can be only reused by the gNB 201; if a UE is configured with Released-Resource-Reuse to be gNB and mode-2 V2X UE, the released resources can be reused by both the gNB 201 and mode-2 V2X UE(s).

If the scheduled transmission is not succeeded before the last retransmission, the Tx UE 202 may send the HARQ feedback to the gNB 201 based on the HARQ feedback result sent by the Rx UE 203 for the last retransmission.

The scheduling DCI may use one PUCCH resource indicator field and one UL HARQ timing indicator field to indicate multiple HARQ feedback resources on the Uu interface. For example, the UL HARQ timing indicator field may indicate the time offset between each initial transmission or retransmission and its associated HARQ feedback resources. For example, the Tx UE 202 may first determine the resources for initial transmission or retransmissions. Then the Tx UE 202 may apply the indicated time offset to them and determine the associated HARQ feedback resources on the Uu interface. After the Tx UE 202 decode the PUCCH resource indicator field or the UL HARQ timing indicator field in the scheduling DCI, it may forward the information to the Rx UE 203(s), e.g., by transmitting the same fields with same values in the SCI to the Rx UE 203. Similar to the Tx UE 202, based on the scheduled retransmission is blind retransmission or HARQ feedback based retransmission, the Rx UE 203 may determine the scheduled HARQ feedback resources on the sidelink correspondingly. When two stage SCI is applied, the PUCCH resource indicator field or the UL HARQ timing indicator field may be carried by the $1^{st}$ stage SCI.

As suggested herein, in some scenarios, both the blind retransmission and HARQ feedback based retransmission may be supported. In one approach, A field in the scheduling DCI may be used to indicate which retransmission mode it is scheduling. For example, a retransmission mode indicator field (1 bit) may be carried by the scheduling DCI. When the retransmission mode indicator is set to '0', the retransmission scheduled along with the initial transmission by the scheduling DCI is blind retransmission; when the retransmission mode indicator is set to '1', the retransmission scheduled along with the initial transmission by the scheduling DCI is HARQ feedback based retransmission.

In another approach, the information of the retransmission mode may be statically configured by the RRC. For example, an RRC parameter SL-Retransmission-Mode may be configured, where the value may be 'Blind' and 'HARQ based'. When a UE is configured with SL-Retransmission-Mode to be 'Blind', the retransmission scheduled along with the initial transmission by the scheduling DCI is blind retransmission; when a UE is configured with SL-Retransmission-Mode to be 'HARQ based', the retransmission scheduled along with the initial transmission by the scheduling DCI is HARQ feedback based retransmission.

After a Tx UE 202 figures out the retransmission mode, the Tx UE 202 may forward the information to the Rx UE 203(s) using SCI, e.g., by the retransmission mode indicator field (1 bits) in the SCI sent to the Rx UE 203. For example, if a Tx UE 202 is scheduled with blind retransmission, the Tx UE 202 may set the retransmission mode indicator in the SCI to '0'; if a Tx UE 202 is scheduled with HARQ feedback based retransmission, the Tx UE 202 may set the retransmission mode indicator in the SCI to '1'. For the Rx UE 203, it may determine retransmission mode by decoding the retransmission mode indicator field in the scheduling SCI correspondingly.

For a V2X UE working in mode 2, the V2X UE may monitor the SCIs from other V2X UEs before scheduling a sidelink transmission. Once the V2X UE detects and decodes a SCI which schedules sidelink transmission for another UE, it may determine whether the resource allocation for the data transmission and HARQ feedback on the sidelink can be released and reused or not, e.g., by decoding the resource reuse indicator field (1 bit) in the SCI. When two stage SCI is applied, the resource reuse indicator field may be carried by the $1^{st}$ stage SCI.

For example, if the detected resource reuse indicator field is set to '0', the V2X UE may determine the resource allocation in the SCI are pre-reserved and will not be released. The V2X UE may ignore the resources reserved in the SCI and search for other available resources.

If the detected resource reuse indicator field is set to '1', the V2X UE may determine the resource allocation in the SCI may be released. The V2X UE may monitor the release signaling and reuse the reserved resources if a release signaling is detected. For example, the V2X UE may monitor the HARQ feedback on the resources scheduled by the SCI. If the V2X UE detects the scheduled transmission is succeeded before all the scheduled transmission is performed, e.g., by detecting ACK feedback in one of the scheduled HARQ feedback resources; or by detecting no signaling is transmitted in one of the scheduled HARQ feedback resources, the V2X UE may treat the remaining resources for the PSSCH transmission and the HARQ feedback, which are originally reserved by the SCI, as available resources where the V2X UE may schedule sidelink transmission on them.

For a Tx UE 202, if the resources in the SCI may be released and reused by the mode-2 V2X UEs, the Tx UE 202 may set the resource reuse indicator field in the SCI to be '1'; if the resources in the SCI will not be released or if the resources in the SCI may be released but can't be reused by the mode-2 V2X UEs, the Tx UE 202 may set the resource reuse indicator field in the SCI to be '0'.

In one case, the retransmission mode indicator field and the resource reuse indicator field may be two different fields transmitted in the SCI. In some other cases, the value of the retransmission mode indicator field and the value of the resource reuse indicator field may have one to one mapping, e.g., both of the two fields may be '0' or '1' in the same time. In these cases, only one of the retransmission mode indicator field and the reuse indicator field may be carried by the SCI.

For example, only the retransmission mode indicator field may be carried by the SCI. Then mode-2 V2X UEs may read the retransmission mode indicator field and determine the information following the same manner as reading the resource reuse indicator field disclosed herein, and vice versa.

In the SCI, a field may be used to indicate whether the transmission scheduled by the SCI is scheduled by the gNB 201 or scheduled by the Tx UE 202. For example, a resource allocation mode indicator field (1 bit) may be carried by the scheduling SCI. When the retransmission mode indicator is set to '0', it indicates the sidelink transmission is scheduled by the gNB 201, e.g., mode 1 resource allocation; when the retransmission mode indicator is set to '1', it indicates the sidelink transmission is scheduled by a V2X UE, e.g., mode 2 resource allocation. When two stage SCI is applied, the resource allocation mode indicator field may be carried by the 1st stage SCI.

For example, when mode-2 V2X UEs detects a sidelink transmission is scheduled by the gNB 201, the mode-2 V2X UEs may assume the reserved resources can't be reused and may ignore the resource reuse indicator field in the SCI. The mode-2 V2X UEs may not monitor the signals transmitted on the feedback resources scheduled by the SCI. When mode-2 V2X UEs detects a sidelink transmission is scheduled by another mode-2 V2X UE, the mode-2 V2X UEs may read the resource reuse indicator field in the SCI and determine if the reserved resources can be reused or not. If the reserved resources can be reused, the mode-2 V2X UEs may monitor the signals transmitted on the feedback resources scheduled by the SCI. Furthermore, in this example, the resource reuse indicator field may not be transmitted in the scheduling SCI. For example, mode-2 V2X UEs may decode the retransmission mode indicator field in the SCI to determine if the reserved resources can be reused or not when the sidelink transmission is scheduled by another mode-2 V2X UE. When the retransmission mode indicator field is set to be '0', the reserved resources can't be reused; when the retransmission mode indicator field is set to be '1', the reserved resources may be reused. In this example, the resource allocation mode indicator field, and the retransmission mode indicator field may be two different fields in the SCI; or the resource allocation mode indicator and the retransmission mode indicator may be two different bits in one SCI field, e.g., the resource allocation mode indicator may be the most significant bit and the retransmission mode indicator may be the least significant bit.

The subject matter disclosed above may apply to the case where the gNB 201 schedules the CSI feedback on the sidelink, e.g., CSI reporting, mobility measurement, beam management measurement, etc. For example, the gNB 201 may send the scheduling of the measurement and reporting to both the Tx UE 202 and Rx UE 203; or the gNB 201 may send the scheduling of the measurement and reporting to Tx UE 202 only, then the Tx UE 202 indicate it to the Rx UE 203 through the SCI. Also, the Rx UE 203 may send the reporting to the gNB 201 through the Uu interface; or the Rx UE 203 may send the reporting to the Tx UE 202 on the sidelink; or the Rx UE 203 may first send the reporting to the Tx UE 202, then the Tx UE 202 may forward the reporting to the gNB 201 through Uu interface.

Figure 16:
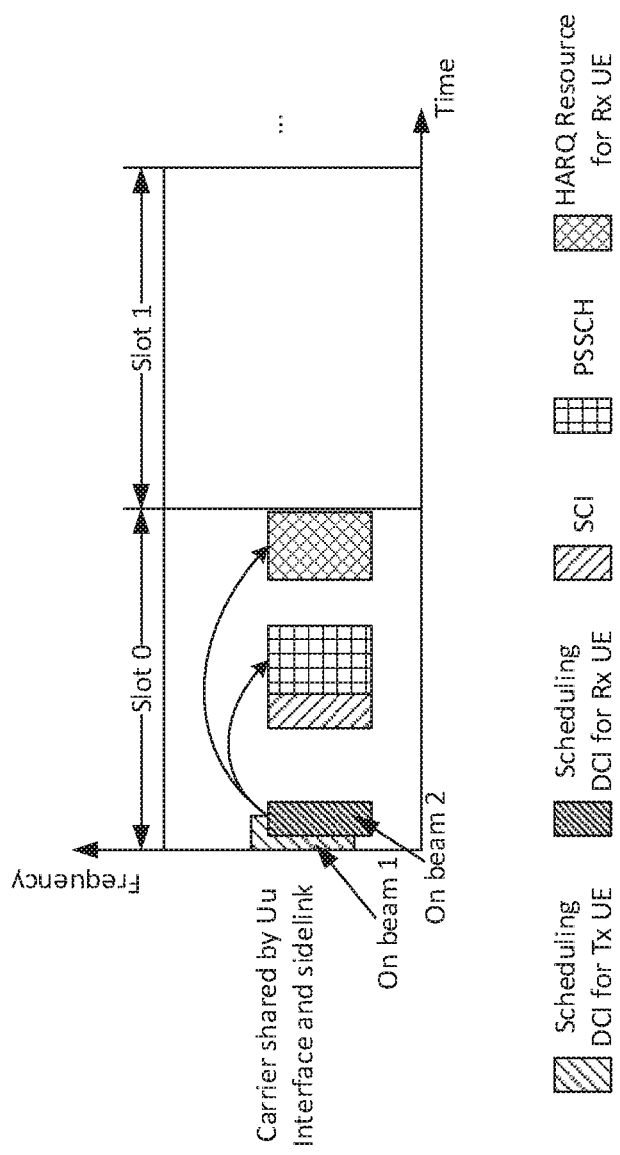
FIG. 16 illustrates an exemplary transmission for scheduling DCI to both Tx UE and Rx UE using shared carrier for Uu interface and sidelink.

The subject matter disclosed above may apply to the shared carrier scenario where Uu interface and sidelink share the carrier. An example is shown in FIG. 16. In the example, the scheduling is self-contained, which may reduce the latency however requesting the UE to have enough capability for it. The scheduling may also be cross-slots. For example, the scheduling DCI may occur in slot 0 and the scheduled sidelink transmission may occur in slot k, where k=1, 2, 3, etc.

Some special considerations for groupcast use case: In groupcast scenario, the gNB 201 may send the scheduling DCIs to multiple Rx UE 203s. Dedicated resources may be used for the scheduling DCIs for different Rx UE 203s. Or, to reduce the overhead, shared resources may be used for the scheduling DCIs for different Rx UE 203s with following examples. When shared resources are used, a common search space with the same CORESET may be configured to all the UEs in the group.

Shared resources may be used for the scheduling DCIs for different Rx UE Example 1: the scheduling DCIs may be SDM-ed. The gNB 201 may form multiple beams to transmit the scheduling DCIs to different Rx UE 203s using the same time and frequency resources. When multiple Rx UE 203s are QCL-ed to the same beam, the scheduling DCIs among the Rx UE 203 QCL-ed to the same beam may be TDM-ed or FDM-ed, while the scheduling DCIs for the Rx UE 203s on the different beams are SDM-ed.

Shared resources may be used for the scheduling DCIs for different Rx UE Example 2: the gNB 201 may send the same scheduling DCI to multiple Rx UE 203s, e.g., to all the UEs in the proximity group when omni-direction antenna is used, or to the Rx UE 203s QCL-ed to the same beam within the proximity group, e.g., when the scheduling DCIs for different beams are SDM-ed, TDM-ed or FDM-ed. The scheduling DCI may carry both group/beam common DCI field (in other words group common DCI field or beam common DCI) and UE dedicated DCI fields. The group/beam common DCI field carries the DCI shared by the Rx UE 203s in a proximity group or by the Rx UE 203s QCL-ed to the same beam in a proximity group. For example, the group/beam common DCI field may carry the time and frequency resource assignment for the transmission/retransmission, BWP indicator field, Resource indicator field, transmission/reception indicator field, Slot format indicator field, etc. The UE dedicated DCI fields carry the DCI dedicated to each Rx UE 203, e.g., dedicated DCI field for Rx UE 203 1, dedicated DCI field for Rx UE 203 2, . . . , dedicated DCI field for Rx UE 203 n. For example, the UE dedicated DCI field may carry time and frequency resource assignment for the HARQ feedback, CSI feedback, etc. Each UE may be configured with a temporary ID within the proximity group or a temporary ID within a beam. The UE may achieve the full DCI signaled by the gNB 201 by checking the group/beam common DCI field and UE dedicated DCI field associated with the configured temporary ID. For example, for a UE configured with UE 1 as temporary ID, the UE may read the common DCI field or the dedicated DCI field for Rx UE 203 (with ID UE 1) to achieve its full DCI information.

Shared resources may be used for the scheduling DCIs for different Rx UE Example 3: while the gNB 201 may send the same scheduling DCI to all the Rx UE 203s, the scheduling DCI may not carry UE dedicated DCI fields. The scheduling DCI may only carry the group/beam common DCI field, each UE may derive the assigned UE specific resources form the signaled scheduling DCI. For example, with one option, the DCI may carry one assignment of the time and frequency resources for the HARQ feedback or CSI feedback for all the UEs. The UE may autonomously divide the assigned resources into n parts and use the part associated with it, e.g., associated with the configured temporary ID, to send HARQ feedback, CSI reporting, mobility measurement, beam management measurement, etc. With another option, the DCI may carry the time and frequency resource assignment for the HARQ feedback or CSI feedback for one UE, e.g., the UE configured with Rx UE 203 (with ID UE 1) as the temporary ID. The UEs configured with other temporary IDs may autonomously derive the resources it will use from the resource assignment for Rx UE 203 (with ID UE 1). For example, the scheduling DCI may indicate RB 0 to RB k−1 is assigned to Rx UE 203 (with ID UE 1). The Rx UE 203 (another with ID UE 2) may autonomously determine it should use RB k to RB 2k−1 in the same symbols as the assigned resources, etc.

In groupcast scenario, when a Tx UE 202 is scheduled by the gNB 201 to send feedback through the Uu interface, the Tx UE 202 may send the compact feedback information which is derived from the received Rx UE 203s' feedbacks to reduce the overhead. For HARQ feedback, the Tx UE 202 may send one HARQ feedback to gNB 201 to indicate if a retransmission of the whole groupcast transmission is needed; or the Tx UE 202 may send the HARQ feedback of each beam to the gNB 201 to indicate retransmission need to be performed on which beam(s), where a bitmap may be used, e.g., with $\{b_{k-1}, \ldots, b_1, b_0\}$ is mapped with $b_{k-1}$ to the $1^{st}$ beam and $b_0$ to the $k^{th}$ beam; or the Tx UE 202 may indicate the number of beams that need to perform retransmission to gNB 201. For measurement and reporting, the Tx UE 202 may send the suggested MCS level, which is derived from the CSI reporting from the Rx UE 203, to assist the gNB 201 to determine the MCS level to be used for sidelink transmission In groupcast scenario, different Rx UE 203s may have different QoS requirements. Based on the QoS requirement, an Rx UE 203 may be indicated whether the UE will send HARQ feedback to the gNB 201/Tx UE 202 or not. An Rx UE 203 may be statically configured by the RRC configuration, or semi-persistently activated and deactivated by the activation DCI, or dynamically signaled by the scheduling DCI with such information. For example, a UE may be configured by the gNB 201 with RRC parameter SL-HARQ, where 'on' indicating the HARQ feedback is enabled and 'OFF' indicating the HARQ feedback is disabled. Or one bit HARQ feedback enable field may be carried by the activation DCI, deactivation DCI, or scheduling DCI sent by the gNB 201, where '1' indicating the HARQ feedback is enabled and '0' indicating the HARQ feedback is disabled. Similar idea may apply to CSI feedback, e.g., CSI reporting, beam management measurement reporting, mobility RSRP, or RSRQ measurement reporting. For example, a UE may be statically configured by the RRC configuration, or semi-persistently activated and deactivated by the activation DCI, or dynamically signaled by the scheduling DCI with if the UE need to report the channel state information or not by the gNB 201.

In groupcast scenario, for a UE that is enabled to send HARQ feedback, the UE may feedback ACK when the UE successfully decodes the data and may feedback NACK when the UE fails to decode the data. Or, with another option, the UE may only feedback NACK when the UE fails to decode the data. When a UE successfully decodes the data, the UE should not send HARQ feedback on the assigned HARQ feedback resources. In this case, the Tx UE 202 or gNB 201 may assume the data is successfully received by the Rx UE 203 if no feedback is received on the assigned HARQ feedback resources.

In groupcast scenario, the retransmission may be triggered based on the QoS requirement of the transmitter or the QoS requirement of the data, e.g., high reliability data may request the Tx UE 202 to receive the ACK from all the Rx UE 203s or to receive no NACK from any Rx UE 203. Therefore, retransmission may be triggered if the Tx UE 202 doesn't receive all the ACK feedback or receives a NACK from any Rx UE 203; low reliability data may request the Tx UE 202 receiving NACK from the Rx UE 203s lower than a percentage of the total Rx UE 203s. An Tx UE 202 may be statically configured by the RRC configuration, or semi-persistently activated and deactivated by the activation DCI, or dynamically signaled by the scheduling DCI with such information by the gNB 201. For example, a Tx UE 202 may be configured by the gNB 201 with RRC parameter Reliability-Type to indicate the QoS requirement of the data and with RRC parameter Reliability-Percentage to indicate threshold used to trigger the retransmission. Or, with another example, a Tx UE 202 may be configured by the gNB 201 with RRC parameter Reliability-Percentage to indicate threshold used to trigger the retransmission. A DCI field may be signaled by the gNB 201 in the activation/deactivation DCI or the scheduling DCI to indicate the reliability requirement of the data for each scheduling grant, e.g., one bit field may be used with '1' indicating high reliability data and '0' indicating high reliability data.

In groupcast scenario, once a retransmission is triggered, the Tx UE 202 may groupcast the retransmission to all the Rx UE 203s in the proximity group as it is in the initial transmission. Or the Tx UE 202 may only send the retransmission to the NACK-ed Rx UE 203s or the NACK-ed beams. A Tx UE 202 may be statically configured by the RRC configuration, or semi-persistently activated and deactivated by the activation DCI, or dynamically signaled by the scheduling DCI with such information by the gNB 201. For example, a Tx UE 202 may be configured by the gNB 201 with RRC parameter SL-Retransmission-Type. Or a DCI field may be signaled by the gNB 201 in the activation/deactivation DCI or the scheduling DCI to indicate the how the retransmission is performed for each scheduling grant, e.g., one bit field may be used with '1' indicating groupcasting the retransmission to all the Rx UE 203s and '0' indicating retransmitting to the NACK-ed UEs/beams. For the Rx UE 203s, when receiving the retransmission, the Rx UE 203 ACK-ed the initial transmission may ignore the retransmission; the Rx UE 203 NACK-ed the initial transmission may decode the data by decoding the retransmission or chase combining the retransmission and the initial transmission.

Measuring and reporting on the sidelink: Disclosed herein is support CSI feedback on the sidelink. The Rx UE 203 may report the channel state information, beam management measurement result or mobility measurement result to the gNB 201 or to the Tx UE 202. Periodic, semi-persistent, and aperiodic measuring or reporting may be supported in the NR V2X.

For periodic measuring or reporting, both Tx UE 202 and Rx UE 203 may be configured with the RRC configuration SL-CSI-ReportConfig. A UE may be configured with multiple configurations of SL-CSI-ReportConfig, where each configuration is associated with one ID, e.g., config-ID. Each configuration may carry the information such as the parameter need to be reported; the information of the reference signal used for doing the measurement; and the resources used for reporting.

A UE may be configured to report one parameter or one set of parameters by the RRC configuration SL-CSI-ReportConfig, where the parameter may be type I channel state information, e.g., CQI, RI, PMI; type II channel state information, e.g., interference condition, eigen value and eigen vector of the channel matrix, etc.; RSRP, RSRQ measurement for the beam management; RSRP, RSRQ measurement for the mobility. A UE may be configured with SSB index, DMRS ports, CSI-RS configuration or SRS configuration by the RRC configuration SL-CSI-ReportConfig to indicate the reference signal used for doing the measurement. A UE may be configured with time and frequency resources, e.g., slot index, staring and length of the symbol, time offset value, starting RB index, bitmap of the used RB, number of continuous RB used, by the RRC configuration SL-CSI-ReportConfig to indicate the resource used for reporting.

For semi-persistent measuring and reporting, both the Tx UE 202 and Rx UE 203 may be configured with the multiple of RRC configuration SL-CSI-ReportConfig. The gNB 201 may trigger semi-persistent measuring and reporting using the CSI acquisition and report field in the activation DCI, e.g., 0 indicating not triggering measuring and reporting; other value indicating the index of the triggered SL-CSI-ReportConfig. The gNB 201 may trigger semi-persistent measuring and reporting by sending the activation DCI to both the Tx UE 202 and Rx UE 203. Or the gNB 201 may trigger semi-persistent measuring and reporting by sending the activation DCI to the Tx UE 202 and the Tx UE 202 indicate the triggered semi-persistent measuring to the Rx UR through the SCI.

For aperiodic measuring and reporting, both the Tx UE 202 and Rx UE 203 may be configured with the multiple of RRC configuration SL-CSI-ReportConfig. The gNB 201 may schedule aperiodic measuring and reporting using the CSI acquisition and report field in the scheduling DCI, e.g., 0 indicating not scheduling measuring and reporting and other value indicating the index of the scheduled SL-CSI-ReportConfig. The gNB 201 may schedule aperiodic measuring and reporting by sending the scheduling DCI to the Tx UE 202 or Rx UE 203. Or the gNB 201 may schedule aperiodic measuring and reporting by sending the scheduling DCI to the Tx UE 202 and the Tx UE 202 indicate the scheduled aperiodic measuring and reporting to the Rx UR through the SCI.

RRC Configuration based Resource Allocation on Sidelink Broadcast Sidelink Transmission Broadcast Sidelink Transmission: In NR V2X, the gNB 201 or gNB like node may statically configure the resources used by the UE for broadcast sidelink transmission. A UE may be statically configured with the resources for broadcast sidelink transmission through the RRC configuration. When a UE has data to transmit on the sidelink, the UE may broadcast the control and data using the configured resources without dynamic grant.

A UE may be statically configured by the RRC with broadcast occasions. A Broadcast Occasion (BO) may be defined as a sidelink resource allocation in time, frequency, and space (e.g., directional antenna or panel or directional beam) for broadcasting. The RRC configurations may be configured through the broadcasted signal, e.g., OSI; or through the common or dedicated RRC configuration on the Uu interface.

To support statically configure the occasions for broadcast, groupcast, or unicast sidelink transmission in NR V2X, different IEs, e.g., SL-ConfigureGrantConfig-Broadcast, SL-ConfigureGrantConfig-Groupcast and SL-ConfigureGrantConfig-Unicast may be used; or the same IE, e.g., SL-ConfigureGrantConfig, may be used where the type of sidelink transmission, e.g., broadcast, groupcast, or unicast, is specified in the IE. The IE SL-ConfigureGrantConfig or SL-ConfigureGrantConfig-Broadcast may carry the following RRC configurations: 1) type of sidelink transmission; 2) type of carrier; 3) numerology of the resource; 4) broadcast transmitting UE sidelink ID on the sidelink; 5) periodicity of the BO; 6) frequency domain resource allocation; or 7) beam sweeping information, among others.

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz etc.

RRC configuration to indicate the broadcast transmitting UE sidelink ID on the sidelink. For broadcast sidelink transmission, a UE may be configured with UE ID on the sidelink as the source ID, or destination ID. For example, a UE may be configured with Sidelink Broadcast Transmission RNTI (SL-BT-RNTI) to be used as the source ID. A UE may be configured with Sidelink Broadcast Reception RNTI (SL-BR-RNTI) to be used as the destination ID where each destination ID may be associated with a different service.

When generating the SCI for broadcast sidelink transmission, the scrambling sequence for SCI may be jointly initialized by the source ID and the destination ID. Or the scrambling sequence for SCI may be initialized by one of the source ID or the destination ID with the other one is indicated in the SCI payload. For example, the destination ID is used to scramble the SCI and the source ID is carried by the SCI payload.

RRC configuration to indicate the periodicity of the BO.

RRC configuration to indicate the time domain resource allocation. We disclose the time domain resources for the BO may be configured with the following alternatives:

Alternative 1: A UE may be configured with one or multiple bitmaps to indicate the time domain resources for the BO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the BO. A UE may be configured with the slot/subframe offset of the BO with respect to SFN=0. A UE may be configured with the starting index to indicate the starting point of the BO, where the starting index may be symbol index or mini-slot index within a slot. A UE may be configured with the number of symbols or the number of mini-slots to indicate the duration of the BO. The above-mentioned parameters may be configured with separate configurations or some of the parameters may be configured jointly. For example, a predefined table may include the combinations of the starting and the duration of time domain resource with each combination associated with an index. A UE may be configured with an index of the table to indicate the value of the starting or the duration.

For broadcast sidelink transmission, a UE may send the same information to multiple directions. The UE may be configured with one time domain resource and determine the time domain resources for all the direction by some predefined rules. Or the UE may be configured with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For broadcast sidelink transmission, the configured grant may configure the time domain resources for PSCCH or PSSCH. The time domain resource for PSCCH and PSSCH may be jointly configured, e.g., one time domain resource allocation may be used for both PSCCH or PSSCH. Or the time domain resource for PSCCH or PSSCH may be configured separately, the configured grant may configure two time domain resources for PSCCH or PSSCH respectively.

RRC configuration to indicate the frequency domain resource allocation. A UE may be configured with contiguous frequency resources for the BO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For broadcast sidelink transmission, the configured grant may configure the frequency domain resources for both PSCCH or PSSCH. The frequency domain resource for PSCCH and PSSCH may be jointly configured, e.g., one frequency domain resource allocation may be used for both PSCCH and PSSCH if PSCCH and PSSCH are TDM-ed and using the same number of RBs. Or the frequency domain resource for PSCCH and PSSCH may be configured separately, the configured grant may configure two frequency domain resources for PSCCH and PSSCH respectively, e.g., StartRBG-PSCCH, LengthRBG-PSCCH and StartRBG-PSSCH, LengthRBG-PSSCH.

RRC configuration to indicate the beam sweeping information. For Broadcast sidelink transmission, the transmitter UE 202 may broadcast the information to multiple directions using multiple beams.

Alternative 1: The gNB 201 may determine the number of the beam sweeping a UE need to perform and may configure the determined value to the UE in the configured grant. The UE may provide assistance information to the NB to assists the NB in determining the beam sweeping configuration. Such assistance information may include one or more of the following: the V2X service of interest, the UE capability for example in terms of the number of simultaneous beam sweeping direction the UE can cover, the UE scheduling preferences including power saving mode preference, etc.

Assume a UE is configured to broadcast the information through k directions/beams, the UE may be configured with k BOs for each beam respectively. Or the UE may be configured with one BO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. The UE may be configured by the RRC with one BO containing multiple symbols or mini-slots. The UE may autonomously use the configured symbols and mini-slots within the BO for beam sweeping. The beams used for beam sweeping may be autonomously determined by the transmitter UE 202 based on the sensing or discovering.

A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the RRC configured BOs and the DCI signaled SFI, the DCI may overwrite the RRC configuration. The UE may skip the conflict symbols and not perform sidelink transmission on them. If the BO is configured in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Unicast Sidelink Transmission

In NR V2X, the gNB 201 or gNB like node may statically configure the resources used by the UE for unicast sidelink transmission. We disclose a UE may be statically configured with the resources for unicast sidelink transmission/reception through the RRC configuration. When a UE has data to transmit on the sidelink, the UE may unicast the control and data to the paired UE using the configured resources without dynamic grant.

We disclose a UE may be statically configured by the RRC with unicast occasions. A Unicast Occasion (UO) may be defined as a sidelink resource allocation in time, frequency, and space (e.g., directional antenna or panel or directional beam) for unicasting. The RRC configurations may be configured through the broadcasted signal, e.g., OSI; or through the common or dedicated RRC configuration on the Uu interface. We disclose the IE SL-ConfigureGrant-Config or SL-ConfigureGrantConfig-Unicast may carry the following RRC configurations: 1) type of sidelink transmission; 2) type of carrier; 3) numerology of the resource; 4) unicast UE ID on the sidelink; 5) unicast paired UE ID; 6) periodicity of the UO; 7) time domain resources; 8) number of the repetition and redundancy version; 9) frequency domain resources; 10) HARQ feedback information; or 11) retransmission related information, among others.

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz etc.

RRC configuration to indicate the unicast UE ID on the sidelink. For unicast sidelink communication, a UE may be configured with a UE ID, e.g., SL-U-RNTI. For a transmitter UE 202, the UE may use SL-U-RNTI as the source ID. For a receiver UE 203, the UE may use SL-U-RNTI as the destination ID.

RRC configuration to indicate the unicast paired UE ID. To perform the unicast sidelink communication, a UE need to know the information of the paired UE. A UE may be configured with the ID of the paired UE, e.g., SL-UP-RNTI, through the RRC in the configured grant. For a transmitter UE 202, the ID of the paired UE may be used as the destination ID. For a receiver UE 203, the ID of the paired UE may be used as the source ID.

When generating the SCI for unicast sidelink transmission, the scrambling sequence for SCI may be jointly initialized by the source ID and the destination ID. Or the scrambling sequence for SCI may be initialized by one of the source ID and the destination ID with the other one is indicated in the SCI payload. For example, the destination ID is used to scramble the SCI and the source ID is carried by the SCI payload.

RRC configuration to indicate the periodicity of the UO.

RRC configuration to indicate the time domain resource allocation. We disclose the time domain resources for the UO may be configured with the following alternatives:

Alternative 1: A UE may be configured with one or multiple bitmaps to indicate the time domain resources for the UO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the UO. A UE may be configured with the slot/subframe offset of the UO with respect to SFN=0. A UE may be configured with the starting index to indicate the starting point of the UO, where the starting index may be symbol index or mini-slot index within a slot. A UE may be configured with the number of symbols or the number of mini-slots to indicate the duration of the UO. The above-mentioned parameters may be configured with separate configurations or some of the parameters may be configured jointly. For example, a predefined table may contain the combinations of the starting and the duration of time domain resource with each combination associated with an index. A UE may be configured with an index of the table to indicate the value of the starting and the duration.

For unicast sidelink transmission, the configured grant may configure the time domain resources for PSCCH or PSSCH. The time domain resource for PSCCH and PSSCH may be jointly configured, e.g., one time domain resource allocation may be used for both PSCCH and PSSCH. Or the time domain resource for PSCCH or PSSCH may be configured separately, the configured grant may configure two time domain resources for PSCCH or PSSCH respectively.

RRC configuration to indicate the number of the repetition and redundancy version (RV). To improve the reliability, a UE may repeat the unicast sidelink transmission. The UE may be configured with the number of the repetition and RVs by the gNB 201 through the RRC configuration. Similar idea may be applied to the groupcast sidelink transmission. When a UE repeats the initial transmission, inter-slot repetition or intra-slot repetition may be performed.

The UE may use the same symbols or mini-slot in the following slots for repetition. Or the UE may use the symbols or mini-slots in the same slot for the repetition.

RRC configuration to indicate the HARQ feedback related information. A UE may be configured with the number of HARQ process. A UE may be configured with one UO for both transmission and feedback. The resources used for the feedback, e.g., time offset between the transmission and feedback, may be indicated in the SCI in the transmission. Or a UE may be configured with dedicated UOs for transmission and feedback respectively. The UO for transmission and the UO for feedback may be configured with one to one mapping. The receiver UE 203 may send the feedback using the associated feedback UO when a transmission is received.

RRC configuration to indicate the retransmission related information. When NACK is received by the transmitter UE 202, it may perform retransmission. A UE may be configured with dedicated UOs for retransmission. The UO for transmission and the UO for feedback may be configured with one to one mapping. The transmitter UE 202 may send the retransmission using the associated retransmission UO when NACK is received. Or no dedicated retransmission UO may be configured. The UE may use the resources in the configured UO for transmission and retransmission. The resources used for the retransmission, e.g., time offset between the transmission and retransmission, may be indicated in the SCI in the transmission or in the feedback sent by the receiver UE 203.

RRC configuration to indicate the frequency domain resource allocation. A UE may be configured with contiguous frequency resources for the UO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For unicast sidelink transmission, the configured grant may configure the frequency domain resources for PSCCH or PSSCH. The frequency domain resource for PSCCH and PSSCH may be jointly configured, e.g., one frequency domain resource allocation may be used for both PSCCH and PSSCH if PSCCH or PSSCH are TDM-ed and using the same number of RBs. Or the frequency domain resource for PSCCH and PSSCH may be configured separately, the configured grant may configure two frequency domain resources for PSCCH and PSSCH respectively, e.g., StartRBG-PSCCH, LengthRBG-PSCCH and StartRBG-PSSCH, LengthRBG-PSSCH.

A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the RRC configured UOs and the DCI signaled SFI, the DCI may overwrite the RRC configuration. The UE may skip the conflict symbols and not perform sidelink transmission on them. If the UO is configured in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Groupcast Sidelink Transmission

Groupcast Sidelink Transmission: In NR V2X, the gNB 201 or gNB like node may statically configure the resources used by the UE for groupcast sidelink transmission. We disclose a UE may be statically configured with the resources for groupcast sidelink transmission/repetition through the RRC configuration. When a UE has data to transmit on the sidelink, the UE may groupcast the control and data to a group of UEs using the configured resources without dynamic grant.

We disclose a UE may be statically configured by the RRC with groupcast occasions. A Groupcast Occasion (GO) may be defined as a sidelink resource allocation in time, frequency, and space (e.g., directional antenna or panel or directional beam) for groupcasting. The RRC configurations may be configured through the broadcasted signal, e.g., OSI; or through the common or dedicated RRC configuration on the Uu interface. We disclose the IE SL-ConfigureGrantConfig or SL-ConfigureGrantConfig-Groupcast may carry the following RRC configurations:

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the numerology of the resource for sidelink transmission. For example, RRC configuration NR-SL-Numerology which may be 15, 30, 60 KHz etc.

RRC configuration to indicate the group transmitting ID on the sidelink. For groupcast sidelink transmission, a UE may be configured with a UE ID on the sidelink. For example, a UE may be configured with a UE ID, e.g., SL-G-RNTI. If a UE need to groupcast on the sidelink, the UE may use SL-G-RNTI as the source ID in the formed group.

RRC configuration to indicate the group ID on the sidelink. A UE may be configured with a group ID, e.g., SL-GD-RNTI. The UE may use the configured group ID as the destination group ID.

When generating the SCI, the scrambling sequence for SCI may be jointly initialized by the destination group ID and the source ID. Or the scrambling sequence for SCI may be initialized by one of the destination group ID and source ID with the other one is indicated in the SCI payload. For example, the destination group ID is used to scramble the SCI and source ID is carried by the SCI payload.

RRC configuration to indicate the periodicity of the GO.

RRC configuration to indicate the time domain resource allocation. We disclose the time domain resources for the GO may be configured with the following alternatives:

Alternative 1: A UE may be configured with one or multiple bitmaps to indicate the time domain resources for the GO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the GO. A UE may be configured with the slot/subframe offset of the GO with respect to SFN=0. A UE may be configured with the starting index to indicate the starting point of the GO, where the starting index may be symbol index or mini-slot index within a slot. A UE may be configured with the number of symbols or the number of mini-slots to indicate the duration of the GO. The above-mentioned parameters may be configured with separate configurations or some of the parameters may be configured jointly. For example, a predefined table may contain the combinations of the starting and the duration of time domain resource with each combination associated with an index. A UE may be configured with an index of the table to indicate the value of the starting and the duration.

For groupcast sidelink transmission, a UE may send the same information to multiple directions. The UE may be configured with one time domain resource and determine the time domain resources for all the direction by some predefined rules. Or the UE may be configured with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For groupcast sidelink transmission, the configured grant may configure the time domain resources for PSCCH or PSSCH. The time domain resource for PSCCH and PSSCH may be jointly configured, e.g., one time domain resource allocation may be used for both PSCCH and PSSCH. Or the time domain resource for PSCCH and PSSCH may be configured separately, the configured grant may configure two time domain resources for PSCCH and PSSCH respectively.

RRC configuration to indicate the number of the repetition and redundancy version (RV). To improve the reliability, a UE may repeat the groupcast sidelink transmission. The UE may be configured with the number of the repetition and RVs by the gNB 201 through the RRC configuration. When a UE repeats the initial transmission, inter-slot repetition or intra-slot repetition may be performed. The UE may use the same symbols or mini-slot in the following slots for repetition. Or the UE may use the symbols or mini-slots in the same slot for the repetition. If beam sweeping is applied in the groupcast, the transmitter UE 202 may repeat the whole beam sweeping, e.g., beam 1, beam 2, . . . , beam k, beam 1, beam 2, . . . , beam k, . . . , beam 1, beam 2, . . . , beam k. Or the UE may repeat for each beam and then do the beam sweeping, e.g., beam 1, beam 1, . . . , beam 1, beam 2, beam 2, . . . , beam 2, . . . , beam k, beam k, . . . , beam k.

RRC configuration to indicate the HARQ feedback related information. A UE may be configured with the number of HARQ process. A UE may be configured with one GO for both transmission and feedback. The resources used for the feedback, e.g., time offset between the transmission and feedback, may be indicated in the SCI in the transmission. Or a UE may be configured with dedicated GOs for transmission and feedback respectively. The GO for transmission and the GO for feedback may be configured with one to one mapping. The receiver UE 203 may send the feedback using the associated feedback GO when a transmission is received.

RRC configuration to indicate the retransmission related information. When NACK is received by the transmitter UE 202, it may perform retransmission. A UE may be configured with dedicated GOs for retransmission. The GO for transmission and the GO for feedback may be configured with one to one mapping. The transmitter UE 202 may send the retransmission using the associated retransmission GO when NACK is received. Or no dedicated retransmission GO may be configured. The UE may use the resources in the configured GO for transmission and retransmission. The resources used for the retransmission, e.g., time offset between the transmission and retransmission, may be indicated in the SCI in the transmission or in the feedback sent by the receiver UE 203.

RRC configuration to indicate the frequency domain resource allocation. A UE may be configured with contiguous frequency resources for the GO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For groupcast sidelink transmission, the configured grant may configure the frequency domain resources for PSCCH or PSSCH. The frequency domain resource for PSCCH and PSSCH may be jointly configured, e.g., one frequency domain resource allocation may be used for both PSCCH and PSSCH if PSCCH and PSSCH are TDM-ed and using the same number of RBs. Or the frequency domain resource for PSCCH and PSSCH may be configured separately, the configured grant may configure two frequency domain resources for PSCCH or PSSCH respectively, e.g., StartRBG-PSCCH, LengthRBG-PSCCH and StartRBG-PSSCH, LengthRBG-PSSCH.

RRC configuration to indicate the beam sweeping information. For groupcast sidelink transmission, the transmitter UE 202 may groupcast the information to multiple directions using multiple beams.

Alternative 1: The gNB 201 may determine the number of the beam sweeping a UE need to perform and may configure the determined value to the UE in the configured grant. Assume a UE is configured to groupcast the information through k directions/beams, the UE may be configured with k GOs for each beam respectively. Or the UE may be configured with one GO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. the UE may be configured by the RRC with one GO containing multiple symbols or mini-slots. The UE may autonomously use the configured symbols and mini-slots within the GO for beam sweeping. The beams used for beam sweeping may be autonomously determined by the transmitter UE 202 based on the sensing or discovering.

A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the RRC configured GOs and the DCI signaled SFI, the DCI may overwrite the RRC configuration. The UE may skip the conflict symbols and not perform sidelink transmission on them. If the GO is configured in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Activation/Deactivation Based Resource Allocation on Sidelink Broadcast Sidelink Transmission Broadcast Sidelink Transmission: In NR V2X, the gNB 201 or gNB like node may semi-persistently allocate the resources used by the UE for broadcast sidelink transmission. We disclose a UE may be semi-persistently signaled with the resources for broadcast sidelink transmission through the RRC configuration and the activation DCI. When a UE has data to transmit on the sidelink, the UE may broadcast the control and data using the activated resources without dynamic grant. The gNB 201 may deactivate the activated resource using the deactivation DCI.

We disclose a UE may be semi-persistently allocated by the RRC and the activation DCI with broadcast occasions. A Broadcast Occasion (BO) may be defined as a sidelink resource allocation in time, frequency, and space (e.g., directional antenna or panel or directional beam) for broadcasting. The RRC configurations may be configured through the broadcasted signal, e.g., OSI; or through the common or dedicated RRC configuration on the Uu interface.

Detail design for RRC configuration: To semi-persistently allocate the occasions for broadcast, groupcast, or unicast sidelink transmission in NR V2X, we disclose different IEs, e.g., SL-ConfigureGrantConfig-Broadcast, SL-ConfigureGrantConfig-Groupcast and SL-ConfigureGrantConfig-Unicast may be used; or the same IE, e.g., SL-ConfigureGrantConfig, may be used where the type of sidelink transmission, e.g., broadcast, groupcast, or unicast, is specified in the IE. We disclose the IE SL-ConfigureGrantConfig or SL-ConfigureGrantConfig-Broadcast may carry the following RRC configurations to convey the information of the BO to be activated:

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the index of the candidate resource. A UE may be configured with multiple BOs to be activated. Each BO may be associated with one dedicated resource index. For example, RRC configuration NR-BO-Index. The UE may determine which BO is activated/deactivated through the activated/deactivated DCI.

RRC configuration to indicate the numerology of the resource for sidelink transmission. For example, RRC configuration NR-SL-Numerology which may be 15, 30, 60 KHz etc.

RRC configuration to indicate the broadcast transmitting UE sidelink ID on the sidelink. For broadcast sidelink transmission, a UE may be configured with UE ID on the sidelink as the source ID, or destination ID. For example, a UE may be configured with Sidelink Broadcast Transmission RNTI (SL-BT-RNTI) to be used as the source ID. A UE may be configured with Sidelink Broadcast Reception RNTI (SL-BR-RNTI) to be used as the destination ID where each destination ID may be associated with a different service.

When generating the SCI for broadcast sidelink transmission, the scrambling sequence for SCI may be jointly initialized by the source ID and the destination ID. Or the scrambling sequence for SCI may be initialized by one of the source ID and the destination ID with the other one is indicated in the SCI payload. For example, the destination ID is used to scramble the SCI and the source ID is carried by the SCI payload.

RRC configuration to indicate the periodicity of the BO.

RRC configuration to indicate the time domain resource allocation. We disclose the time domain resources for the BO may be configured with the following alternatives:

Alternative 1: A UE may be configured with one or multiple bitmaps to indicate the time domain resources for the BO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the BO. A UE may be configured with the slot/subframe offset of the BO with respect to SFN=0. A UE may be configured with the starting index to indicate the starting point of the BO, where the starting index may be symbol index or mini-slot index within a slot. A UE may be configured with the number of symbols or the number of mini-slots to indicate the duration of the BO. The above-mentioned parameters may be configured with separate configurations or some of the parameters may be configured jointly. For example, a predefined table may contain the combinations of the starting and the duration of time domain resource with each combination associated with an index. A UE may be configured with an index of the table to indicate the value of the starting and the duration.

For broadcast sidelink transmission, a UE may send the same information to multiple directions. The UE may be configured with one time domain resource and determine the time domain resources for all the direction by some pre-defined rules. Or the UE may be configured with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For broadcast sidelink transmission, the configured grant may configure the time domain resources for PSCCH or PSSCH. The time domain resource for PSCCH and PSSCH may be jointly configured, e.g., one time domain resource allocation may be used for both PSCCH and PSSCH. Or the time domain resource for PSCCH and PSSCH may be configured separately, the configured grant may configure two time domain resources for PSCCH and PSSCH respectively.

RRC configuration to indicate the frequency domain resource allocation. A UE may be configured with contiguous frequency resources for the BO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For broadcast sidelink transmission, the configured grant may configure the frequency domain resources for PSCCH or PSSCH. The frequency domain resource for PSCCH and PSSCH may be jointly configured, e.g., one frequency domain resource allocation may be used for both PSCCH and PSSCH if PSCCH and PSSCH are TDM-ed and using the same number of RBs. Or the frequency domain resource for PSCCH and PSSCH may be configured separately, the configured grant may configure two frequency domain resources for PSCCH and PSSCH respectively, e.g., StartRBG-PSCCH, LengthRBG-PSCCH and StartRBG-PSSCH, LengthRBG-PSSCH.

RRC configuration to indicate the beam sweeping information. For Broadcast sidelink transmission, the transmitter UE 202 may broadcast the information to multiple directions using multiple beams.

Alternative 1: The gNB 201 may determine the number of the beam sweeping a UE need to perform and may configure the determined value to the UE in the configured grant. Assume a UE is configured to broadcast the information through k directions/beams, the UE may be configured with k BOs for each beam respectively. Or the UE may be configured with one BO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. the UE may be configured by the RRC with one BO containing multiple symbols or mini-slots. The UE may autonomously use the configured symbols and mini-slots within the BO for beam sweeping. The beams used for beam sweeping may be autonomously determined by the transmitter UE 202 based on the sensing or discovering.

Detail design for activation/deactivation DCI: An activation/deactivation DCI may be used to semi-persistently activate/deactivate the BO. To distinguish the activation/deactivation DCI from other DCIs, a new RNTI, e.g., SL-CS-RNTI, may be used to scramble the CRC of the activation/deactivation DCI. To distinguish the activation/deactivation DCI for BO, GO and UO, the activation/deactivation DCI payload may carry a field to indicate the type of sidelink communication that is activated/deactivated. Or different RNTIs may be used, e.g., SL-BO-CS-RNTI, SL-GO-CS-RNTI, SL-UO-CS-RNTI, to scramble the CRC of the activation/deactivation DCI for BO, GO and UO respectively. A UE may be configured by the RRC with the RNTI for the activation DCI.

The activation/deactivation DCI may also carry the information of the BO to be activated/deactivated. We disclose the activation/deactivation DCI for BO may carry the following information:

Activation/deactivation flag field. One bit may be used in the activation/deactivation DCI to indicate whether the DCI is used for activation or deactivation, e.g., '0' indicating the DCI is used for activation and '1' indicating the DCI is used for deactivation.

Resource indicator field. A UE may be configured with multiple BOs through the RRC to be activated/deactivated. The activation/deactivation DCI may indicate the index of the BO to be activated/deactivated for broadcast sidelink transmission. Assume a UE is configured with 8 BOs, e.g., BO 0 to BO 7, 3 bits resource indicator field may be used with '000' indicating BO 0, '001' indicating BO 1, etc.

Sidelink type indicator field. The activation DCI may indicate the type of sidelink transmission. For example, 2 bits sidelink type indicator field may be used with '00' indicating the DCI is activating broadcast sidelink transmission, '01' indicating the DCI is activating groupcast sidelink transmission, '10' indicating the DCI is activating unicast sidelink transmission etc., '11' indicating the DCI is activating the resource for all types of sidelink transmission.

Carrier type indicator field. A UE may be semi-persistently indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Time domain resource allocation field. The Time domain resource allocation field may carry the time domain resource allocation for the BO with the following alternatives:

Alternative 1: A UE may be signaled with one or multiple bitmaps to indicate the time domain resources for the BO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be signaled by the activation DCI, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be signaled with the time offset, starting point and duration to indicate the time domain resources for the BO. A UE may be signaled with the slot/subframe offset of the BO. The time offset may be with respect to the slot/subframe carrying the activation DCI. A UE may be signaled with the starting index to indicate the starting point of the BO, where the starting index may be symbol index or mini-slot index within a slot. A UE may be signaled with the number of symbols or the number of mini-slots to indicate the duration of the BO. The above-mentioned parameters may be signaled with separate fields or some of the parameters may be signaled jointly. For example, a predefined table may contain the combinations of the starting and the duration of time domain resource with each combination associated with an index. A UE may be signaled with an index of the table to indicate the value of the starting and the duration.

For broadcast sidelink transmission, a UE may send the same information to multiple directions. The UE may be signaled with one time domain resource and determine the time domain resources for all the direction by some predefined rules. Or the UE may be signaled with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For broadcast sidelink transmission, the activation DCI may signal the time domain resources for PSCCH or PSSCH. The time domain resource for PSCCH and PSSCH may be jointly signaled, e.g., one time domain resource allocation may be used for both PSCCH and PSSCH. Or the time domain resource for PSCCH and PSSCH may be signaled separately, the activation DCI may signal two time domain resources for PSCCH and PSSCH respectively.

Frequency domain resource allocation field. The Frequency domain resource allocation field may carry the Frequency domain resource allocation for the BO. A UE may be signaled with contiguous frequency resources for the BO. The frequency resources may be signaled in RBs or may be signaled in subchannels, e.g., in RBGs. With one alternative, the UE may be signaled with the index of lowest RB and the number of the RBs allocated, or the UE may be signaled with the index of lowest RBG and the number of the RBGs allocated. With another alternative, the frequency resources allocation may be signaled by a bitmap. Each bit in the bitmap may indicate one RB, one RBG or one subchannel. The UE may be signaled with an index to indicate the starting RB, RBG or subchannel associated with the bitmap.

For broadcast sidelink transmission, the activation DCI may signal the frequency domain resources for PSCCH or PSSCH. The frequency domain resource for PSCCH and PSSCH may be jointly signaled, e.g., one frequency domain resource allocation may be used for both PSCCH and PSSCH if PSCCH and PSSCH are TDM-ed and using the same number of RBs. Or the frequency domain resource for PSCCH and PSSCH may be signaled separately, the activation DCI may signal two frequency domain resources for PSCCH and PSSCH respectively.

Beam sweeping information field. For groupcast sidelink transmission, the transmitter UE 202 may groupcast the information to multiple directions using multiple beams with following alternatives:

Alternative 1: The gNB 201 may determine the number of the beam sweeping a UE need to perform and signal it to the UE through the activation DCI. Assume a UE is signaled to groupcast the information through k directions/beams, the UE may be signaled with one BO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. the UE may be signaled by the activation DCI with one BO containing multiple symbols or mini-slots. The UE may autonomously use the signaled symbols and mini-slots within the BO for beam sweeping.

The beams used for beam sweeping may be autonomously determined by the transmitter UE 202 based on the sensing or discovering.

If some of the information of the BO is indicated by the activation DCI, e.g., time domain resource allocation; frequency domain resource allocation; etc., the gNB 201 not configure the same information in the RRC configuration A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the semi-persistently allocated BOs and the DCI signaled SFI, the DCI may overwrite the allocation. The UE may skip the conflict symbols and not perform sidelink transmission on them. If the BO is allocated in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Unicast Sidelink Transmission

Unicast Sidelink Transmission: In NR V2X, the gNB 201 or gNB like node may semi-persistently allocate the resources used by the UE for unicast sidelink transmission. We disclose a UE may be semi-persistently signaled with the resources for unicast sidelink transmission/reception through the RRC configuration and the activation DCI. When a UE has data to transmit on the sidelink, the UE may unicast the control and data using the activated resources without dynamic grant. The gNB 201 may deactivate the activated resource using the deactivation DCI.

We disclose a UE may be semi-persistently allocated by the RRC and the activation DCI with unicast occasions. A Unicast Occasion (UO) may be defined as a sidelink resource allocation in time, frequency, and space (e.g., directional antenna or panel or directional beam) for unicasting. The RRC configurations may be configured through the broadcasted signal, e.g., OSI; or through the common or dedicated RRC configuration on the Uu interface.

Detail design for RRC configuration: We disclose the IE SL-ConfigureGrantConfig or SL-ConfigureGrantConfig-Unicast may carry the following RRC configurations to convey the information of the UO to be activated:

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the index of the candidate resource. A UE may be configured with multiple UOs to be activated. Each UO may be associated with one dedicated resource index. For example, RRC configuration NR-UO-Index. The UE may determine which UO is activated/deactivated through the activated/deactivated DCI.

RRC configuration to indicate the numerology of the resource for sidelink transmission. For example, RRC configuration NR-SL-Numerology which may be 15, 30, 60 KHz etc.

RRC configuration to indicate the unicast UE ID on the sidelink. For unicast sidelink communication, a UE may be configured with a UE ID, e.g., SL-U-RNTI. For a transmitter UE 202, the UE may use SL-U-RNTI as the source ID. For a receiver UE 203, the UE may use SL-U-RNTI as the destination ID.

RRC configuration to indicate the unicast paired UE ID. To perform the unicast sidelink communication, a UE need to know the information of the paired UE. A UE may be configured with the ID of the paired UE, e.g., SL-UP-RNTI, through the RRC in the configured grant. For a transmitter UE 202, the ID of the paired UE may be used as the destination ID. For a receiver UE 203, the ID of the paired UE may be used as the source ID.

When generating the SCI for unicast sidelink transmission, the scrambling sequence for SCI may be jointly initialized by the source ID and the destination ID. Or the scrambling sequence for SCI may be initialized by one of the source ID and the destination ID with the other one is indicated in the SCI payload. For example, the destination ID is used to scramble the SCI and the source ID is carried by the SCI payload.

RRC configuration to indicate the periodicity of the UO.

RRC configuration to indicate the time domain resource allocation. We disclose the time domain resources for the UO may be configured with the following alternatives:

Alternative 1: A UE may be configured with one or multiple bitmaps to indicate the time domain resources for the UO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the UO. A UE may be configured with the slot/subframe offset of the UO with respect to SFN=0. A UE may be configured with the starting index to indicate the starting point of the UO, where the starting index may be symbol index or mini-slot index within a slot. A UE may be configured with the number of symbols or the number of mini-slots to indicate the duration of the UO. The above-mentioned parameters may be configured with separate configurations or some of the parameters may be configured jointly. For example, a predefined table may contain the combinations of the starting and the duration of time domain resource with each combination associated with an index. A UE may be configured with an index of the table to indicate the value of the starting and the duration.

For unicast sidelink transmission, the configured grant may configure the time domain resources for PSCCH or PSSCH. The time domain resource for PSCCH and PSSCH may be jointly configured, e.g., one time domain resource allocation may be used for both PSCCH and PSSCH. Or the time domain resource for PSCCH and PSSCH may be configured separately, the configured grant may configure two time domain resources for PSCCH and PSSCH respectively.

RRC configuration to indicate the number of the repetition and redundancy version (RV). To improve the reliability, a UE may repeat the unicast sidelink transmission. The UE may be configured with the number of the repetition and RVs by the gNB 201 through the RRC configuration. Similar idea may be applied to the groupcast sidelink transmission. When a UE repeats the initial transmission, inter-slot repetition or intra-slot repetition may be performed. The UE may use the same symbols or mini-slot in the following slots for repetition. Or the UE may use the symbols or mini-slots in the same slot for the repetition.

RRC configuration to indicate the HARQ feedback related information. A UE may be configured with the number of HARQ process. A UE may be configured with one UO for both transmission and feedback. The resources used for the feedback, e.g., time offset between the transmission and feedback, may be indicated in the SCI in the transmission. Or a UE may be configured with dedicated UOs for transmission and feedback respectively. The UO for transmission and the UO for feedback may be configured with one to one mapping. The receiver UE 203 may send the feedback using the associated feedback UO when a transmission is received.

RRC configuration to indicate the retransmission related information. When NACK is received by the transmitter UE 202, it may perform retransmission. A UE may be configured with dedicated UOs for retransmission. The UO for transmission and the UO for feedback may be configured with one to one mapping. The transmitter UE 202 may send the retransmission using the associated retransmission UO when NACK is received. Or no dedicated retransmission UO may be configured. The UE may use the resources in the configured UO for transmission and retransmission. The resources used for the retransmission, e.g., time offset between the transmission and retransmission, may be indicated in the SCI in the transmission or in the feedback sent by the receiver UE 203.

RRC configuration to indicate the frequency domain resource allocation. A UE may be configured with contiguous frequency resources for the UO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For unicast sidelink transmission, the configured grant may configure the frequency domain resources for PSCCH or PSSCH. The frequency domain resource for PSCCH and PSSCH may be jointly configured, e.g., one frequency domain resource allocation may be used for both PSCCH and PSSCH if PSCCH and PSSCH are TDM-ed and using the same number of RBs. Or the frequency domain resource for PSCCH and PSSCH may be configured separately, the configured grant may configure two frequency domain resources for PSCCH and PSSCH respectively, e.g., StartRBG-PSCCH, LengthRBG-PSCCH and StartRBG-PSSCH, LengthRBG-PSSCH.

Detail design for activation/deactivation DCI: An activation/deactivation DCI may be used to semi-persistently activate/deactivate the UO. To distinguish the activation/deactivation DCI from other DCIs, a new RNTI, e.g., SL-CS-RNTI, may be used to scramble the CRC of the activation/deactivation DCI. To distinguish the activation/deactivation DCI for BO, GO and UO, the activation/deactivation DCI payload may carry a field to indicate the type of sidelink communication that is activated/deactivated. Or different RNTIs may be used, e.g., SL-BO-CS-RNTI, SL-GO-CS-RNTI, SL-UO-CS-RNTI, to scramble the CRC of the activation/deactivation DCI for BO, GO and UO respectively. A UE may be configured by the RRC with the RNTI for the activation DCI.

The activation/deactivation DCI may also carry the information of the UO to be activated/deactivated. We disclose the activation/deactivation DCI for UO may carry the following information:

Activation/deactivation flag field. One bit may be used in the activation/deactivation DCI to indicate whether the DCI is used for activation or deactivation, e.g., '0' indicating the DCI is used for activation and '1' indicating the DCI is used for deactivation.

Resource indicator field. A UE may be configured with multiple UOs through the RRC to be activated/deactivated. The activation/deactivation DCI may indicate the index of the UO to be activated/deactivated for unicast sidelink transmission. Assume a UE is configured with 8 UOs, e.g., UO 0 to UO 7, 3 bits resource indicator field may be used with '000' indicating UO 0, '001' indicating UO 1, etc.

Sidelink type indicator field. The activation DCI may indicate the type of sidelink transmission. For example, 2 bits sidelink type indicator field may be used with '00' indicating the DCI is activating broadcast sidelink transmission, '01' indicating the DCI is activating groupcast sidelink transmission, '10' indicating the DCI is activating unicast sidelink transmission etc., '11' indicating the DCI is activating the resource for all types of sidelink transmission.

Carrier type indicator field. A UE may be semi-persistently indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Unicast sidelink UE ID field. For unicast sidelink communication, a UE may be semi-persistently signaled with a sidelink UE ID, e.g., SL-U-RNTI. For a transmitter UE 202, the UE may use SL-U-RNTI as the source ID. For a receiver UE 203, the UE may use SL-U-RNTI as the destination ID. The activation DCI may explicitly indicate the UE ID, e.g., SL-U-RNTI. Or a UE may be configured with $2^n$ UE IDs by the RRC where each UE ID associated with an index. The activation DCI may use an n bits field to indicate the index for the UE to determine the UE ID.

Unicast paired UE ID field. A UE may be semi-persistently signaled with the ID of the paired UE. When a UE need to transmit on the unicast sidelink, the paired UE ID field indicates the ID of the receiver UE 203. When a UE is in receiving mode, the paired UE ID field indicates the ID of the transmitter UE 202. The activation DCI may explicitly indicate the paired UE ID, e.g., SL-UP-RNTI. Or a UE may be configured with $2^n$ paired UE IDs by the RRC where each paired UE ID associated with an index. The activation DCI may use an n bits field to indicate the index for the UE to determine the paired UE ID.

Time domain resource allocation field. The Time domain resource allocation field may carry the time domain resource allocation for the UO with the following alternatives:

Alternative 1: A UE may be signaled with one or multiple bitmaps to indicate the time domain resources for the UO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be signaled by the activation DCI, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be signaled with the time offset, starting point and duration to indicate the time domain resources for the UO. A UE may be signaled with the slot/subframe offset of the UO. The time offset may be with respect to the slot/subframe carrying the activation DCI. A UE may be signaled with the starting index to indicate the starting point of the UO, where the starting index may be symbol index or mini-slot index within a slot. A UE may be signaled with the number of symbols or the number of mini-slots to indicate the duration of the UO. The above-mentioned parameters may be signaled with separate fields or some of the parameters may be signaled jointly. For example, a predefined table may contain the combinations of the starting and the duration of time domain resource with each combination associated with an index. A UE may be signaled with an index of the table to indicate the value of the starting and the duration.

For unicast sidelink transmission, the activation DCI may signal the time domain resources for PSCCH or PSSCH. The time domain resource for PSCCH and PSSCH may be jointly signaled, e.g., one time domain resource allocation may be used for both PSCCH and PSSCH. Or the time domain resource for PSCCH and PSSCH may be signaled separately, the activation DCI may signal two time domain resources for PSCCH and PSSCH respectively.

Repetition indicator field. To improve the reliability, a UE may repeat the unicast sidelink transmission. A UE may be signaled with the number of the repetition by the activation DCI. The UE may also be signaled with the pattern of RVs. For example, the RRC configuration may configure the UE with multiple candidate patterns of the RVs with each pattern associated with one index. The UE may be signaled with an index to indicate which pattern is used for repetition. When a UE repeats the initial transmission, inter-slot repetition or intra-slot repetition may be performed. The UE may use the same symbols or mini-slot in the following slots for repetition. Or the UE may use the symbols or mini-slots in the same slot for the repetition.

HARQ process field. A UE may be signaled with the number of HARQ process by the activation DCI.

Frequency domain resource allocation field. The Frequency domain resource allocation field may carry the Frequency domain resource allocation for the UO. A UE may be signaled with contiguous frequency resources for the UO. The frequency resources may be signaled in RBs or may be signaled in subchannels, e.g., in RBGs. With one alternative, the UE may be signaled with the index of lowest RB and the number of the RBs allocated, or the UE may be signaled with the index of lowest RBG and the number of the RBGs allocated. With another alternative, the frequency resources allocation may be signaled by a bitmap. Each bit in the bitmap may indicate one RB, one RBG or one subchannel. The UE may be signaled with an index to indicate the starting RB, RBG or subchannel associated with the bitmap.

For unicast sidelink transmission, the activation DCI may signal the frequency domain resources for PSCCH or PSSCH. The frequency domain resource for PSCCH and PSSCH may be jointly signaled, e.g., one frequency domain resource allocation may be used for both PSCCH and PSSCH if PSCCH and PSSCH are TDM-ed and using the same number of RBs. Or the frequency domain resource for PSCCH and PSSCH may be signaled separately, the activation DCI may signal two frequency domain resources for PSCCH and PSSCH respectively.

If some of the information of the UO is indicated by the activation DCI, e.g., time domain resource allocation; frequency domain resource allocation; etc., the gNB 201 not configure the same information in the RRC configuration A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the semi-persistently allocated UOs and the DCI signaled SFI, the DCI may overwrite the allocation. The UE may skip the conflict symbols and not perform sidelink transmission on them. If the UO is allocated in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

Groupcast Sidelink Transmission

Groupcast Sidelink Transmission: In NR V2X, the gNB 201 or gNB like node may semi-persistently allocate the resources used by the UE for groupcast sidelink transmission. We disclose a UE may be semi-persistently signaled with the resources for groupcast sidelink transmission/reception through the RRC configuration and the activation DCI. When a UE has data to transmit on the sidelink, the UE may groupcast the control and data using the activated resources without dynamic grant. The gNB 201 may deactivate the activated resource using the deactivation DCI.

We disclose a UE may be semi-persistently allocated by the RRC and the activation DCI with groupcast occasions. A Groupcast Occasion (GO) may be defined as a sidelink resource allocation in time, frequency, and space (e.g., directional antenna or panel or directional beam) for groupcasting. The RRC configurations may be configured through the broadcasted signal, e.g., OSI; or through the common or dedicated RRC configuration on the Uu interface.

Detail design for RRC configuration: We disclose the IE SL-ConfigureGrantConfig or SL-ConfigureGrantConfig-Groupcast may carry the following RRC configurations to convey the information of the GO to be activated:

RRC configuration to indicate the type of the sidelink transmission. For example, RRC configuration NR-SL-CommuncationType which may be Broadcast, Groupcast, or unicast if the same IE SL-ConfigureGrantConfig is used for all the sidelink transmission types.

RRC configuration to indicate the type of the carrier. For example, RRC configuration NR-SL-CarrierType may be used. If the NR-SL-CarrierType is configured to be 'Shared', the UE determines the sidelink resource assignment is for shared license carrier between Uu and sidelink. If the NR-SL-CarrierType is configured to be 'Dedicated', the UE determines the sidelink resource assignment is for dedicated sidelink carrier.

RRC configuration to indicate the index of the candidate resource. A UE may be configured with multiple GOs to be activated. Each GO may be associated with one dedicated resource index. For example, RRC configuration NR-GO-Index. The UE may determine which GO is activated/deactivated through the activated/deactivated DCI.

RRC configuration to indicate the numerology of the resource for sidelink transmission. For example, RRC configuration NR-SL-Numerology which may be 15, 30, 60 KHz etc.

RRC configuration to indicate the groupcast transmitting ID on the sidelink. For groupcast sidelink transmission, a UE may be configured with a UE ID on the sidelink. For example, a UE may be configured with a UE ID, e.g., SL-G-RNTI. If a UE need to groupcast on the sidelink, the UE may use SL-G-RNTI as the source ID in the formed group.

RRC configuration to indicate the group ID on the sidelink. A UE may be configured with a group ID, e.g., SL-GD-RNTL The UE may use the configured group ID as the destination group ID.

When generating the SCI, the scrambling sequence for SCI may be jointly initialized by the destination group ID and the source ID. Or the scrambling sequence for SCI may be initialized by one of the destination group ID and source ID with the other one is indicated in the SCI payload. For example, the destination group ID is used to scramble the SCI and source ID is carried by the SCI payload.

RRC configuration to indicate the periodicity of the GO.

RRC configuration to indicate the time domain resource allocation. We disclose the time domain resources for the GO may be configured with the following alternatives:

Alternative 1: A UE may be configured with one or multiple bitmaps to indicate the time domain resources for the GO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be configured by the RRC configuration, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be configured with the time offset, starting point and duration to indicate the time domain resources for the GO. A UE may be configured with the slot/subframe offset of the GO with respect to SFN=0. A UE may be configured with the starting index to indicate the starting point of the GO, where the starting index may be symbol index or mini-slot index within a slot. A UE may be configured with the number of symbols or the number of mini-slots to indicate the duration of the GO. The above-mentioned parameters may be configured with separate configurations or some of the parameters may be configured jointly. For example, a predefined table may contain the combinations of the starting and the duration of time domain resource with each combination associated with an index. A UE may be configured with an index of the table to indicate the value of the starting and the duration.

For groupcast sidelink transmission, a UE may send the same information to multiple directions. The UE may be configured with one time domain resource and determine the time domain resources for all the direction by some pre-defined rules. Or the UE may be configured with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For groupcast sidelink transmission, the configured grant may configure the time domain resources for PSCCH or PSSCH. The time domain resource for PSCCH and PSSCH may be jointly configured, e.g., one time domain resource allocation may be used for both PSCCH and PSSCH. Or the time domain resource for PSCCH and PSSCH may be configured separately, the configured grant may configure two time domain resources for PSCCH and PSSCH respectively.

RRC configuration to indicate the number of the repetition and redundancy version (RV). To improve the reliability, a UE may repeat the groupcast sidelink transmission. The UE may be configured with the number of the repetition and RVs by the gNB 201 through the RRC configuration. Similar idea may be applied to the groupcast sidelink transmission. When a UE repeats the initial transmission, inter-slot repetition or intra-slot repetition may be performed. The UE may use the same symbols or mini-slot in the following slots for repetition. Or the UE may use the symbols or mini-slots in the same slot for the repetition. If beam sweeping is applied in the groupcast, the transmitter UE 202 may repeat the whole beam sweeping, e.g., beam 1, beam 2, . . . , beam k, beam 1, beam 2, . . . , beam k, . . . , beam 1, beam 2, . . . , beam k. Or the UE may repeat for each beam and then do the beam sweeping, e.g., beam 1, beam 1, . . . , beam 1, beam 2, beam 2, . . . , beam 2, . . . , beam k, beam k, . . . , beam k.

RRC configuration to indicate the HARQ feedback related information. A UE may be configured with the number of HARQ process. A UE may be configured with one GO for both transmission and feedback. The resources used for the feedback, e.g., time offset between the transmission and feedback, may be indicated in the SCI in the transmission. Or a UE may be configured with dedicated GOs for transmission and feedback respectively. The GO for transmission and the GO for feedback may be configured with one to one mapping. The receiver UE 203 may send the feedback using the associated feedback GO when a transmission is received.

RRC configuration to indicate the retransmission related information. When NACK is received by the transmitter UE 202, it may perform retransmission. A UE may be configured with dedicated GOs for retransmission. The GO for transmission and the GO for feedback may be configured with one to one mapping. The transmitter UE 202 may send the retransmission using the associated retransmission GO when NACK is received. Or no dedicated retransmission GO may be configured. The UE may use the resources in the configured GO for transmission and retransmission. The resources used for the retransmission, e.g., time offset between the transmission and retransmission, may be indicated in the SCI in the transmission or in the feedback sent by the receiver UE 203.

RRC configuration to indicate the frequency domain resource allocation. A UE may be configured with contiguous frequency resources for the GO. The frequency resources may be configured in RBs or may be configured in subchannels, e.g., in RBGs. With one alternative, the UE may be configured with the parameters StartRB and LengthRB, or the UE may be configured with the parameters StartRBG and LengthRBG. With another alternative, the frequency resources may be configured by a bitmap. Each bit in the bitmap may indicate one RB, one RBG or one subchannel. The UE may be configured with an index to indicate the starting RB, RBG or subchannel associated with the bitmap.

For groupcast sidelink transmission, the configured grant may configure the frequency domain resources for PSCCH or PSSCH. The frequency domain resource for PSCCH and PSSCH may be jointly configured, e.g., one frequency domain resource allocation may be used for both PSCCH and PSSCH if PSCCH and PSSCH are TDM-ed and using the same number of RBs. Or the frequency domain resource for PSCCH and PSSCH may be configured separately, the configured grant may configure two frequency domain resources for PSCCH and PSSCH respectively, e.g., StartRBG-PSCCH, LengthRBG-PSCCH and StartRBG-PSSCH, LengthRBG-PSSCH.

RRC configuration to indicate the beam sweeping information. For groupcast sidelink transmission, the transmitter UE 202 may groupcast the information to multiple directions using multiple beams.

Alternative 1: The gNB 201 may determine the number of the beam sweeping a UE need to perform and may configure the determined value to the UE in the configured grant. Assume a UE is configured to groupcast the information through k directions/beams, the UE may be configured with k GOs for each beam respectively. Or the UE may be configured with one GO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. the UE may be configured by the RRC with one GO containing multiple symbols or mini-slots. The UE may autonomously use the configured symbols and mini-slots within the GO for beam sweeping. The beams used for beam sweeping may be autonomously determined by the transmitter UE 202 based on the sensing or discovering.

Detail design for activation/deactivation DCI: An activation/deactivation DCI may be used to semi-persistently activate/deactivate the GO. To distinguish the activation/deactivation DCI from other DCIs, a new RNTI, e.g., SL-CS-RNTI, may be used to scramble the CRC of the activation/deactivation DCI. To distinguish the activation/deactivation DCI for BO, GO and UO, the activation/deactivation DCI payload may carry a field to indicate the type of sidelink communication that is activated/deactivated.

Or different RNTIs may be used, e.g., SL-BO-CS-RNTI, SL-GO-CS-RNTI, SL-UO-CS-RNTI, to scramble the CRC of the activation/deactivation DCI for BO, GO and UO respectively. A UE may be configured by the RRC with the RNTI for the activation DCI.

The activation/deactivation DCI may also carry the information of the GO to be activated/deactivated. We disclose the activation/deactivation DCI for GO may carry the following information:

Activation/deactivation flag field. One bit may be used in the activation/deactivation DCI to indicate whether the DCI is used for activation or deactivation, e.g., '0' indicating the DCI is used for activation and '1' indicating the DCI is used for deactivation.

Resource indicator field. A UE may be configured with multiple GOs through the RRC to be activated/deactivated. The activation/deactivation DCI may indicate the index of the GO to be activated/deactivated for groupcast sidelink transmission. Assume a UE is configured with 8 GOs, e.g., GO 0 to GO 7, 3 bits resource indicator field may be used with '000' indicating GO 0, '001' indicating GO 1, etc.

Sidelink type indicator field. The activation DCI may indicate the type of sidelink transmission. For example, 2 bits sidelink type indicator field may be used with '00' indicating the DCI is activating broadcast sidelink transmission, '01' indicating the DCI is activating groupcast sidelink transmission, '10' indicating the DCI is activating unicast sidelink transmission etc., '11' indicating the DCI is activating the resource for all types of sidelink transmission.

Carrier type indicator field. A UE may be semi-persistently indicated with the type of the carrier with one bit in the scheduling DCI. For example, if the carrier type indicator field is set to '0', the UE determines the sidelink resource assignment is for shared license carrier between Uu and sidelink; if the carrier type indicator field is set to '1', the UE determines the sidelink resource assignment is for dedicated sidelink carrier.

Groupcast transmitting UE ID field. A UE may be semi-persistently signaled with the UE ID in a group to indicate the source ID. The activation DCI may explicitly UE ID, e.g., SL-G-RNTL Or a UE may be configured with $2^n$ candidate IDs by the RRC where each candidate ID associated with an index. The activation DCI may use an n bits field to indicate the index for the UE to determine the source ID.

Group ID field. A UE may be semi-persistently signaled with the group ID to indicate the destination group ID. The activation DCI may explicitly indicate the group ID, e.g., SL-GD-RNTL Or a UE may be configured with $2^n$ candidate IDs by the RRC where each candidate ID associated with an index. The activation DCI may use an n bits field to indicate the index for the UE to determine the group ID.

Time domain resource allocation field. The Time domain resource allocation field may carry the time domain resource allocation for the GO with the following alternatives:

Alternative 1: A UE may be signaled with one or multiple bitmaps to indicate the time domain resources for the GO. The bitmap may indicate the resource in subframes, in slots, in mini-slots or in symbols. For example, if the bitmap is used for indicating the resource in symbols, it may be mapped to the symbols within a time interval, e.g., $\{b_s, b_{s-1}, \ldots, b_1, b_0\}$ is mapped with $b_s$ to the first symbol and $b_0$ to the last symbol. If bitmap is used for indicating the resource in mini-slots, it may be mapped to the mini-slots within a time interval. For example, $\{b_m, b_{m-1}, \ldots, b_1, b_0\}$ is mapped with $b_m$ to the first mini-slot and $b_0$ to the last mini-slot. Or to save the mapping bits, a two level mapping may be used. Two bit strings may be signaled by the activation DCI, e.g., $\{a_f, a_{f-1}, \ldots, a_1, a_0\}$ is mapped to subframes or slots with $a_f$ to the first subframe or slot and $a_0$ to the last subframe or slot within the time interval. $\{c_s, c_{s-1}, \ldots, c_1, c_0\}$ is mapped to the symbols within a frame or a slot, or $\{c_m, c_{m-1}, \ldots, c_1, c_0\}$ is mapped to the mini-slots within a frame or a slot.

Alternative 2: A UE may be signaled with the time offset, starting point and duration to indicate the time domain resources for the GO. A UE may be signaled with the slot/subframe offset of the GO. The time offset may be with respect to the slot/subframe carrying the activation DCI. A UE may be signaled with the starting index to indicate the starting point of the GO, where the starting index may be symbol index or mini-slot index within a slot. A UE may be signaled with the number of symbols or the number of mini-slots to indicate the duration of the GO. The above-mentioned parameters may be signaled with separate fields or some of the parameters may be signaled jointly. For example, a predefined table may contain the combinations of the starting and the duration of time domain resource with each combination associated with an index. A UE may be signaled with an index of the table to indicate the value of the starting and the duration.

For groupcast sidelink transmission, a UE may send the same information to multiple directions. The UE may be signaled with one time domain resource and determine the time domain resources for all the direction by some predefined rules. Or the UE may be signaled with the time domain resource for each direction respectively. For example, a UE may be indicated with multiple starting and the duration values of the time domain resource. Or a UE may be indicated with gaps between the time domain resource for the transmission of the first direction and for the transmission of the rest directions.

For groupcast sidelink transmission, the activation DCI may signal the time domain resources for PSCCH or PSSCH. The time domain resource for PSCCH and PSSCH may be jointly signaled, e.g., one time domain resource allocation may be used for both PSCCH and PSSCH. Or the time domain resource for PSCCH and PSSCH may be signaled separately, the activation DCI may signal two time domain resources for PSCCH and PSSCH respectively.

Repetition indicator field. To improve the reliability, a UE may repeat the groupcast sidelink transmission. A UE may be signaled with the number of the repetition by the activation DCI. The UE may also be signaled with the pattern of RVs. For example, the RRC configuration may configure the UE with multiple candidate patterns of the RVs with each pattern associated with one index. The UE may be signaled with an index to indicate which pattern is used for repetition. When a UE repeats the initial transmission, inter-slot repetition or intra-slot repetition may be performed. The UE may use the same symbols or mini-slot in the following slots for repetition. Or the UE may use the symbols or mini-slots in the same slot for the repetition.

HARQ process field. A UE may be signaled with the number of HARQ process by the activation DCI.

Frequency domain resource allocation field. The Frequency domain resource allocation field may carry the Frequency domain resource allocation for the GO. A UE may be signaled with contiguous frequency resources for the GO. The frequency resources may be signaled in RBs or may be signaled in subchannels, e.g., in RBGs. With one alternative, the UE may be signaled with the index of lowest RB and the number of the RBs allocated, or the UE may be signaled with the index of lowest RBG and the number of the RBGs allocated. With another alternative, the frequency resources allocation may be signaled by a bitmap. Each bit in the bitmap may indicate one RB, one RBG or one subchannel. The UE may be signaled with an index to indicate the starting RB, RBG or subchannel associated with the bitmap.

For groupcast sidelink transmission, the activation DCI may signal the frequency domain resources for both PSCCH and PSSCH. The frequency domain resource for PSCCH and PSSCH may be jointly signaled, e.g., one frequency domain resource allocation may be used for both PSCCH and PSSCH if PSCCH and PSSCH are TDM-ed and using the same number of RBs. Or the frequency domain resource for PSCCH and PSSCH may be signaled separately, the activation DCI may signal two frequency domain resources for PSCCH and PSSCH respectively.

Beam sweeping information field. For groupcast sidelink transmission, the transmitter UE 202 may groupcast the information to multiple directions using multiple beams with following alternatives:

Alternative 1: The gNB 201 may determine the number of the beam sweeping a UE need to perform and signal it to the UE through the activation DCI. Assume a UE is signaled to groupcast the information through k directions/beams, the UE may be signaled with one BO for all the beams. The beams used for beam sweeping may be configured by the gNB 201. Or the beams used for beam sweeping may be autonomously determined by the transmitter UE 202 based on the sensing or discovering.

Alternative 2: The number of the beam sweeping may be determined by the UE. the UE may be signaled by the activation DCI with one BO containing multiple symbols or mini-slots. The UE may autonomously use the signaled symbols and mini-slots within the BO for beam sweeping. The beams used for beam sweeping may be autonomously determined by the transmitter UE 202 based on the sensing or discovering.

If some of the information of the GO is indicated by the activation DCI, e.g., time domain resource allocation; frequency domain resource allocation; etc., the gNB 201 not configure the same information in the RRC configuration A UE may be dynamically indicated with the SFI. For a UE configured with dedicated sidelink carrier, the UE may only perform sidelink transmission on the symbols that are labeled as 'S'. Or the UE may perform sidelink transmission on the symbols that are labeled as 'S' or 'U'. For a UE configured with shared sidelink carrier between Uu and sidelink, the UE may only perform sidelink transmission on the symbols that are labeled as 'S'.

If there is conflict between the semi-persistently allocated GOs and the DCI signaled SFI, the DCI may overwrite the allocation. The UE may skip the conflict symbols and not perform sidelink transmission on them. If the GO is allocated in mini-slot and there is conflict for part of the symbols in a mini-slot, the UE may skip the whole mini-slot and not perform sidelink transmission on it. Or the UE may only skip the conflicted symbol(s) and perform sidelink transmission on the unconflicted symbol(s) within the mini-slot.

It is understood that the entities (e.g., gNB, gNB-like node, or UE) performing the steps illustrated herein, such as FIG. 3, FIG. 4, FIG. 6, FIG. 7, and FIG. 10-FIG. 20 may be logical entities. The steps may be stored in a memory of, and executing on a processor of, a device, server, or computer system such as those illustrated in FIG. 9C or FIG. 9D. Skipping steps, combining steps, or adding steps between exemplary methods disclosed herein (e.g., FIG. 3, FIG. 4, FIG. 6, and FIG. 7) is contemplated. Table 5 includes exemplary abbreviations and definitions as disclosed herein.

TABLE 5

Abbreviations and Definitions

| Abbreviations | Definitions |
|---|---|
| ACK | ACKnowledgement |
| BWP | Bandwidth Part |
| CE | Control Element |
| CRC | Cyclic Redundancy Check |
| DCI | Downlink Control Information |
| HARQ | Hybrid Automatic Repeat Request |
| IE | Information Element |
| LTE | Long Term Evolution |
| MAC | Medium Access Control |
| MIB | Master Information Block |
| NACK | Non-ACKnowledgement |
| NR | New Radio |
| PSCCH | Physical Sidelink Control Channel |
| PSSCH | Physical Sidelink Shared Channel |
| RAN | Radio Access Network |
| RB | Resource Block |
| RBG | Resource Block Group |
| RNTI | Radio Network Temporary Identifier |
| RRC | Radio Resource Control |
| SCI | Sidelink Control Information |
| SFI | Slot Format Indicator |
| SI | System Information |
| SLV | Starting and Length Value |
| UE | User Equipment |
| V2V | Vehicle-to-Vehicle |
| V2X | Vehicle-to-everything |

Figure 8:
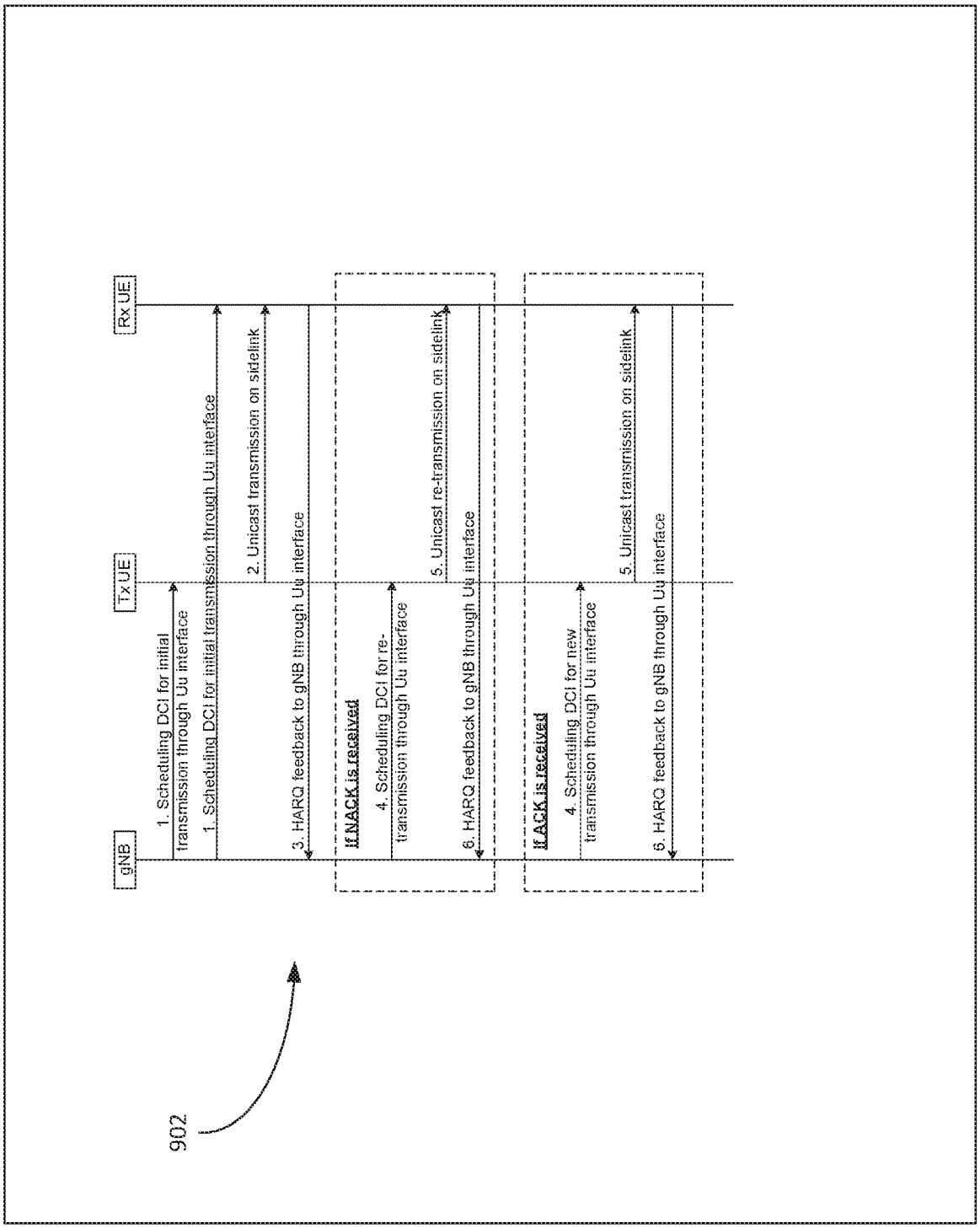
FIG. 8 illustrates an exemplary display (e.g., graphical user interface) that may be generated based on the methods, systems, and devices of mobility signaling load reduction.

FIG. 8 illustrates an exemplary display (e.g., graphical user interface) that may be generated based on the methods, systems, and devices of Uu based Sidelink Control for NR V2X, as discussed herein. Display interface 901 (e.g., touch screen display) may provide text in block 902 associated with Uu based Sidelink Control for NR V2X, such as RRC related parameters, method flow, and RRC associated current conditions. Progress of any of the steps (e.g., sent messages or success of steps) discussed herein may be displayed in block 902. In addition, graphical output 902 may be displayed on display interface 901. Graphical output may be the topology of the devices implementing the methods, systems, and devices of Uu based Sidelink Control for NR V2X, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 9A:
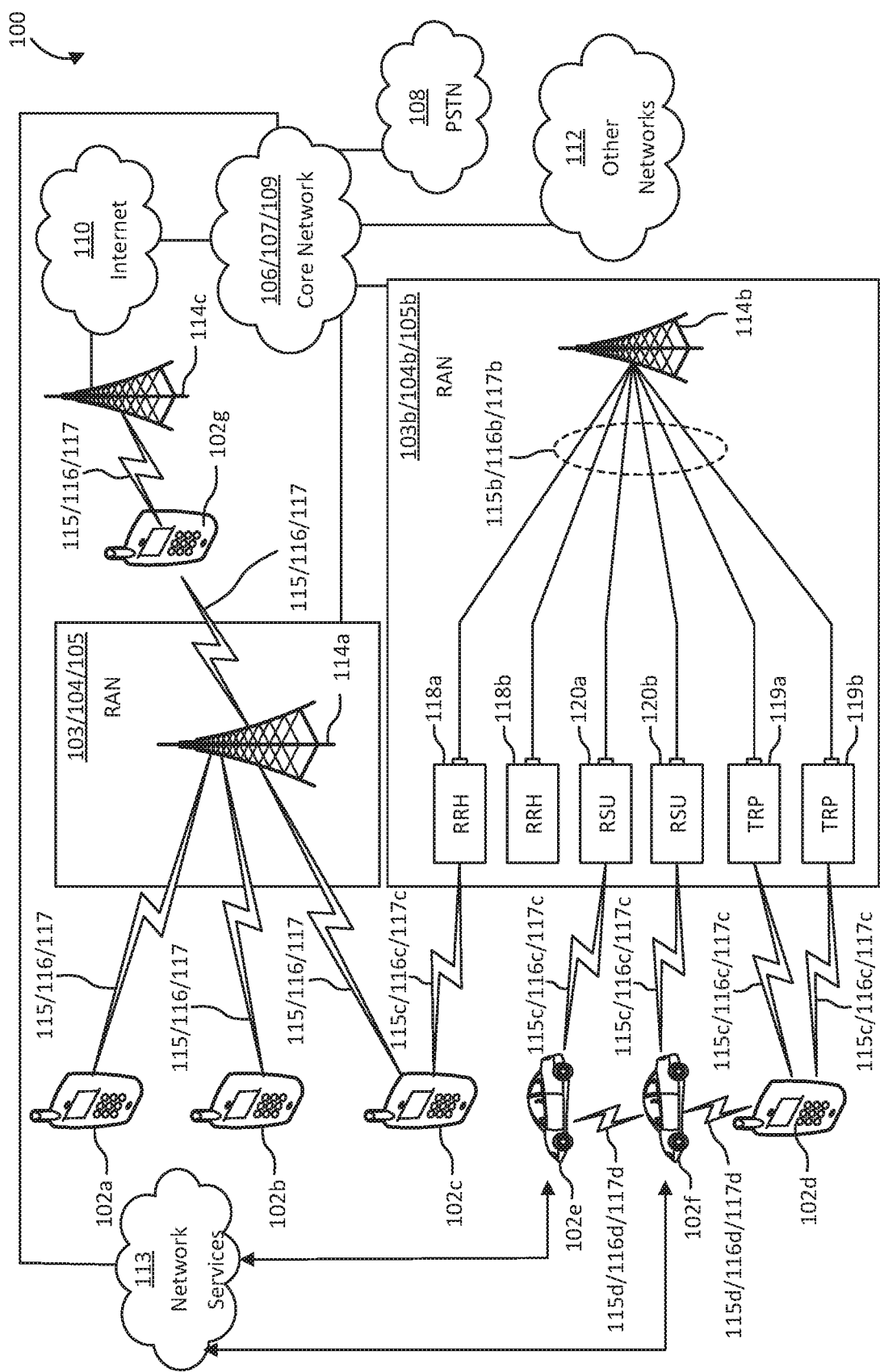
FIG. 9A illustrates an example communications system.

FIG. 9A illustrates an example communications system 100 in which the methods and apparatuses of Uu based sidelink control for NR V2X, such as the systems and methods illustrated in FIG. 3, FIG. 4, FIG. 6, FIG. 7, and FIG. 10-FIG. 20, among others, described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 9A, FIG. 9B, FIG. 9C, FIG. 9D, FIG. 9E, or FIG. 9F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 9A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of Uu based sidelink control for NR V2X, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 9A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of Uu based sidelink control for NR V2X, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 9A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 9A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of Uu based sidelink control for NR V2X, as disclosed herein. For example, the WTRU 102g shown in FIG. 9A may be configured to communicate with the base station 114a, which may employ a cellular-based radio technology, and with the base station 114c, which may employ an IEEE 802 radio technology.

Although not shown in FIG. 9A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 9B:
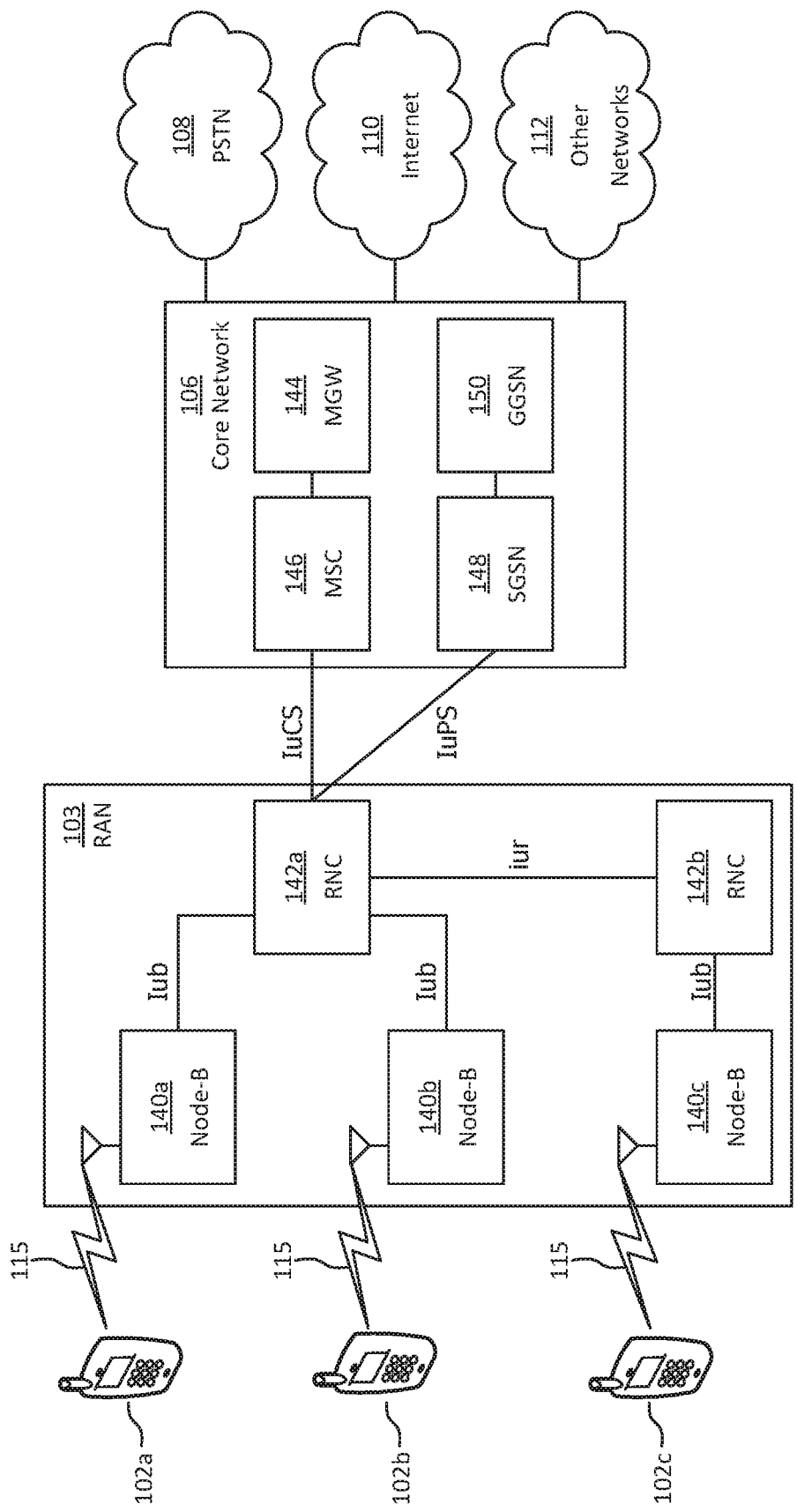
FIG. 9B illustrates an exemplary system that includes RANs and core networks.

FIG. 9B is a system diagram of an example RAN 103 and core network 106 that may implement methods, systems, and devices of Uu based sidelink control for NR V2X, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 9B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 9B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 9B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 9C:
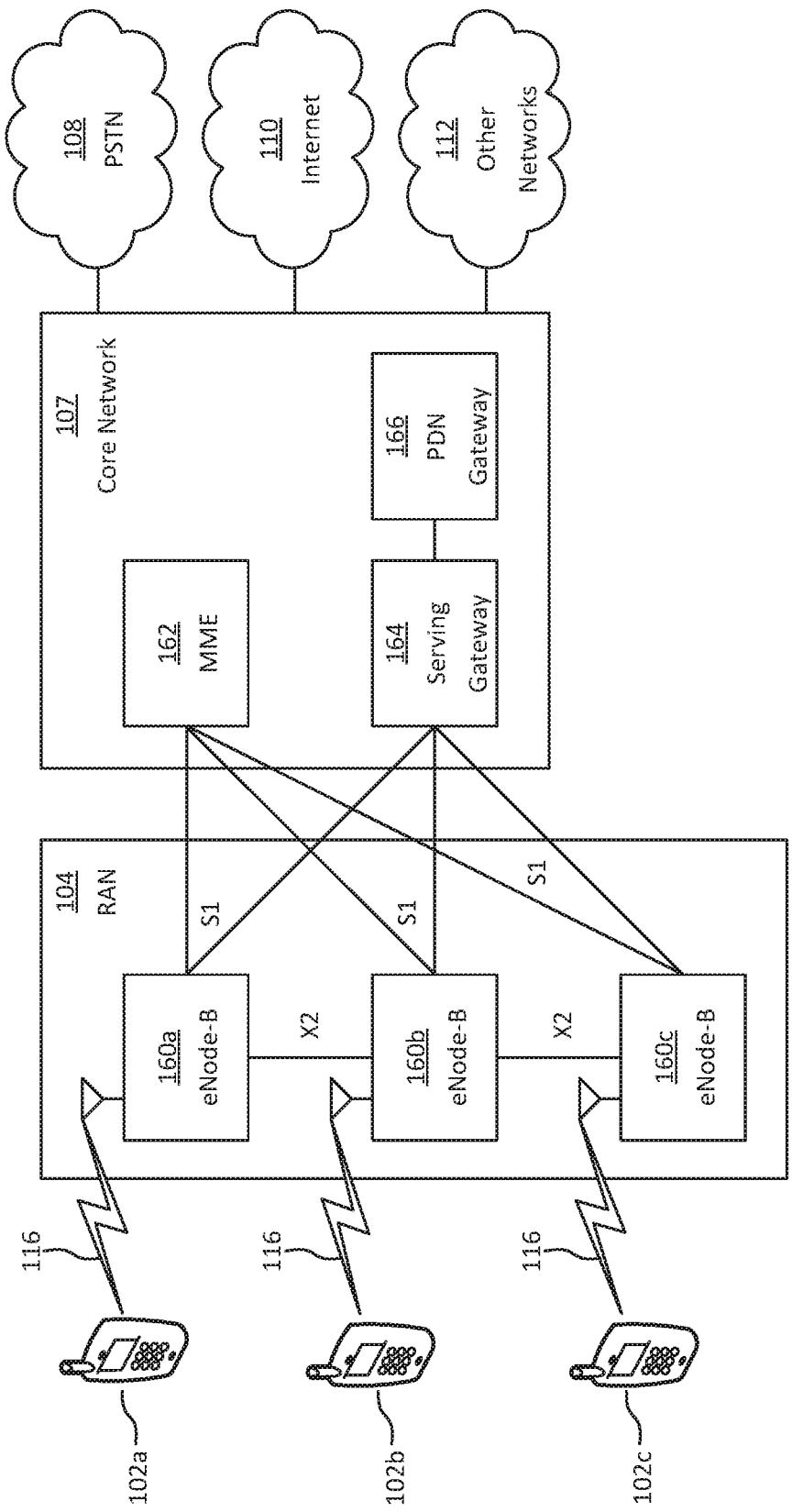
FIG. 9C illustrates an exemplary system that includes RANs and core networks.

FIG. 9C is a system diagram of an example RAN 104 and core network 107 that may implement methods, systems, and devices of Uu based sidelink control for NR V2X, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 9C, the eNode-Bs 160a, 160b, and 160c may communicate with one another over an X2 interface.

The core network 107 shown in FIG. 9C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 9D:
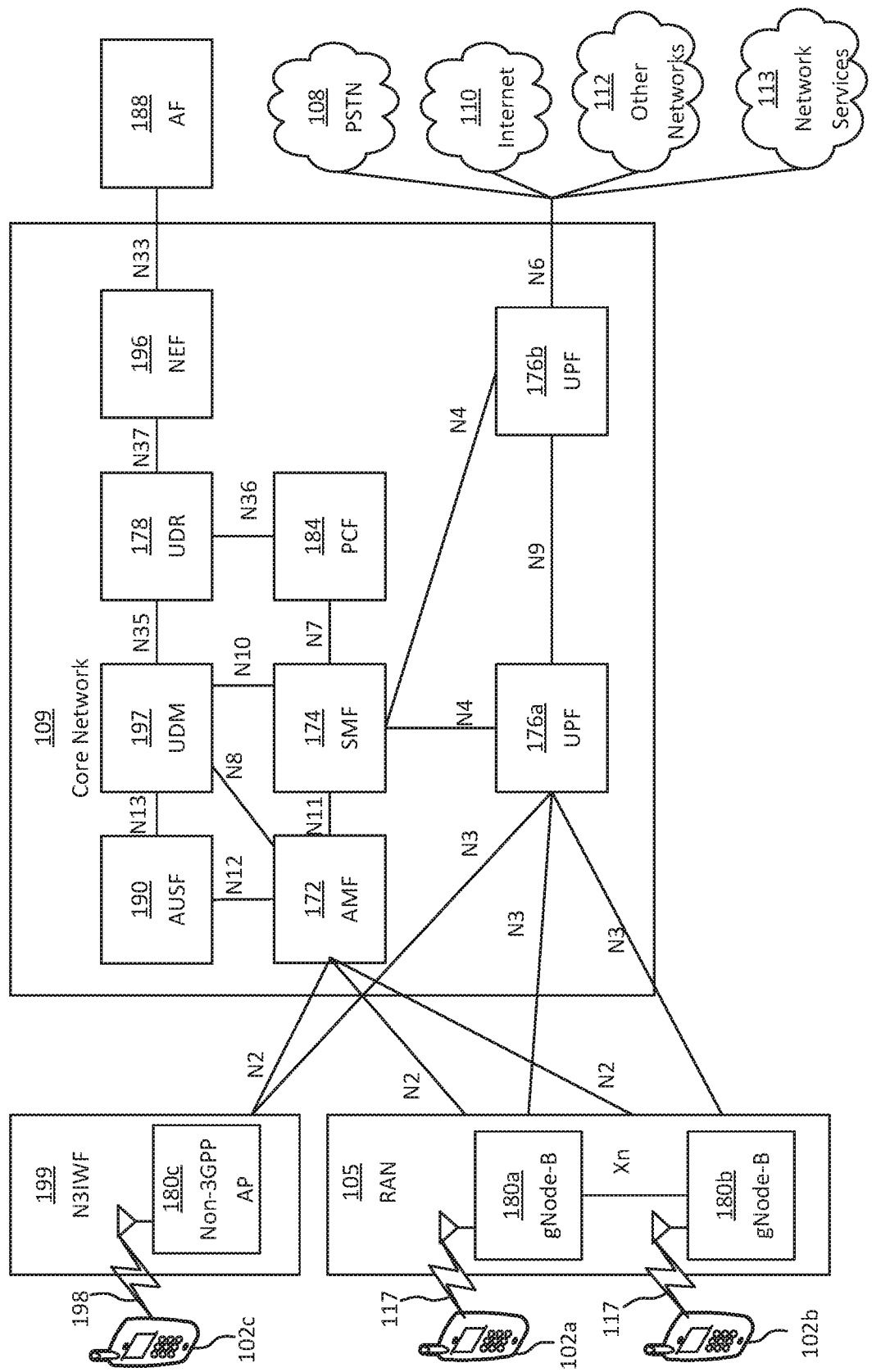
FIG. 9E illustrates another example communications system.
FIG. 9F is a block diagram of an example apparatus or device, such as a WTRU.
FIG. 9G is a block diagram of an exemplary computing system.

FIG. 9D is a system diagram of an example RAN 105 and core network 109 that may implement methods, systems, and devices of Uu based sidelink control for NR V2X, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 9D, the gNode-Bs 180a and 180b may communicate with one another over an Xn interface, for example.

The core network 109 shown in FIG. 9D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 9G.

In the example of FIG. 9D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 9D shows that network functions directly connect to one another, however, it should be appreciated that they may communicate via routing agents such as a diameter routing agent or message buses.

In the example of FIG. 9D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 9D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 9D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 9D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 9A, FIG. 9C, FIG. 9D, or FIG. 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 9A, FIG. 9B, FIG. 9C, FIG. 9D, or FIG. 9E are provided by way of example only, and it is understood that the subject matter disclosed and claimed herein may be embodied or implemented in any similar communication system, whether presently defined or defined in the future.

Figure 9E:
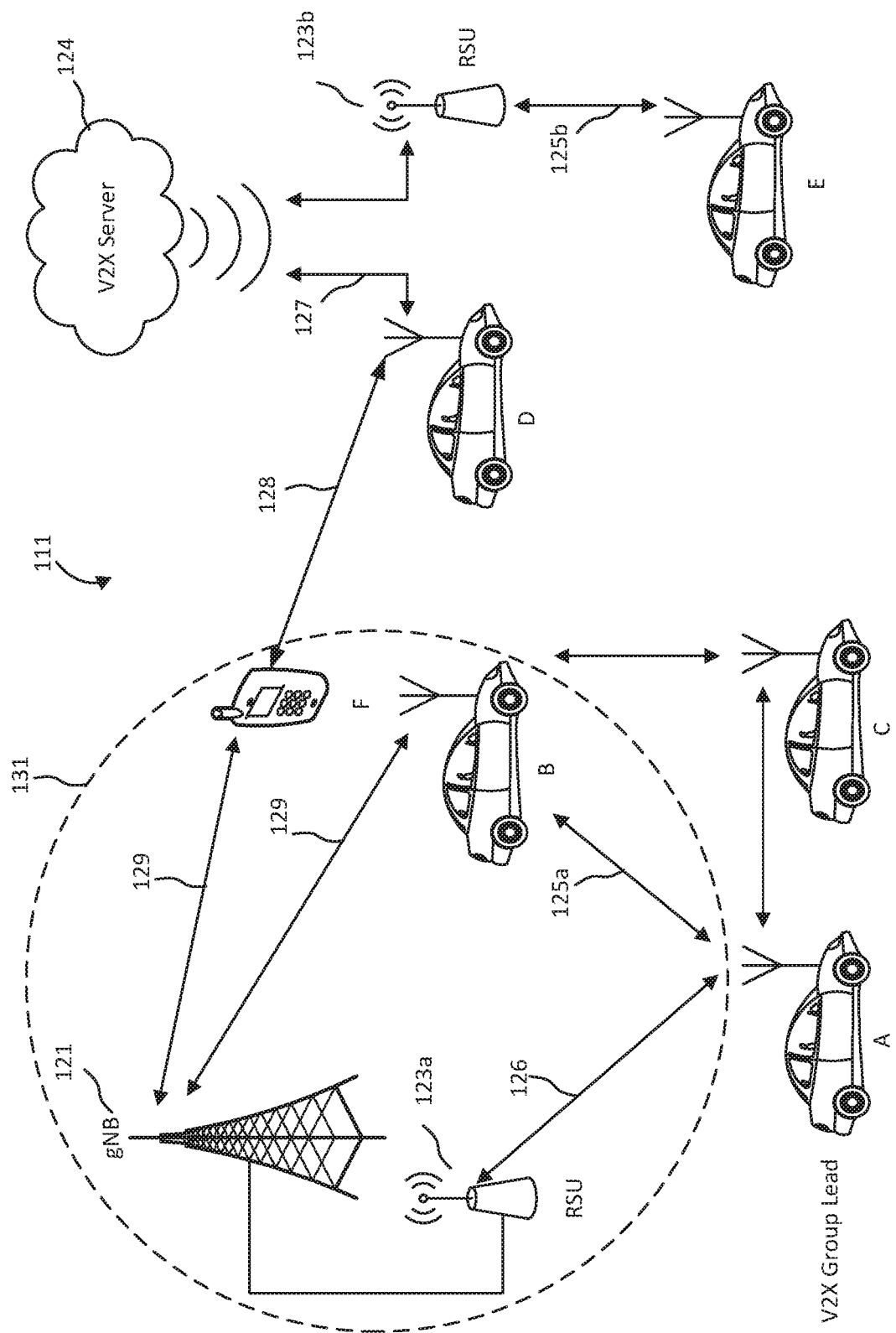

FIG. 9E illustrates an example communications system 111 in which the systems, methods, apparatuses that implement Uu based sidelink control for NR V2X, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 9E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 9E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 9F:
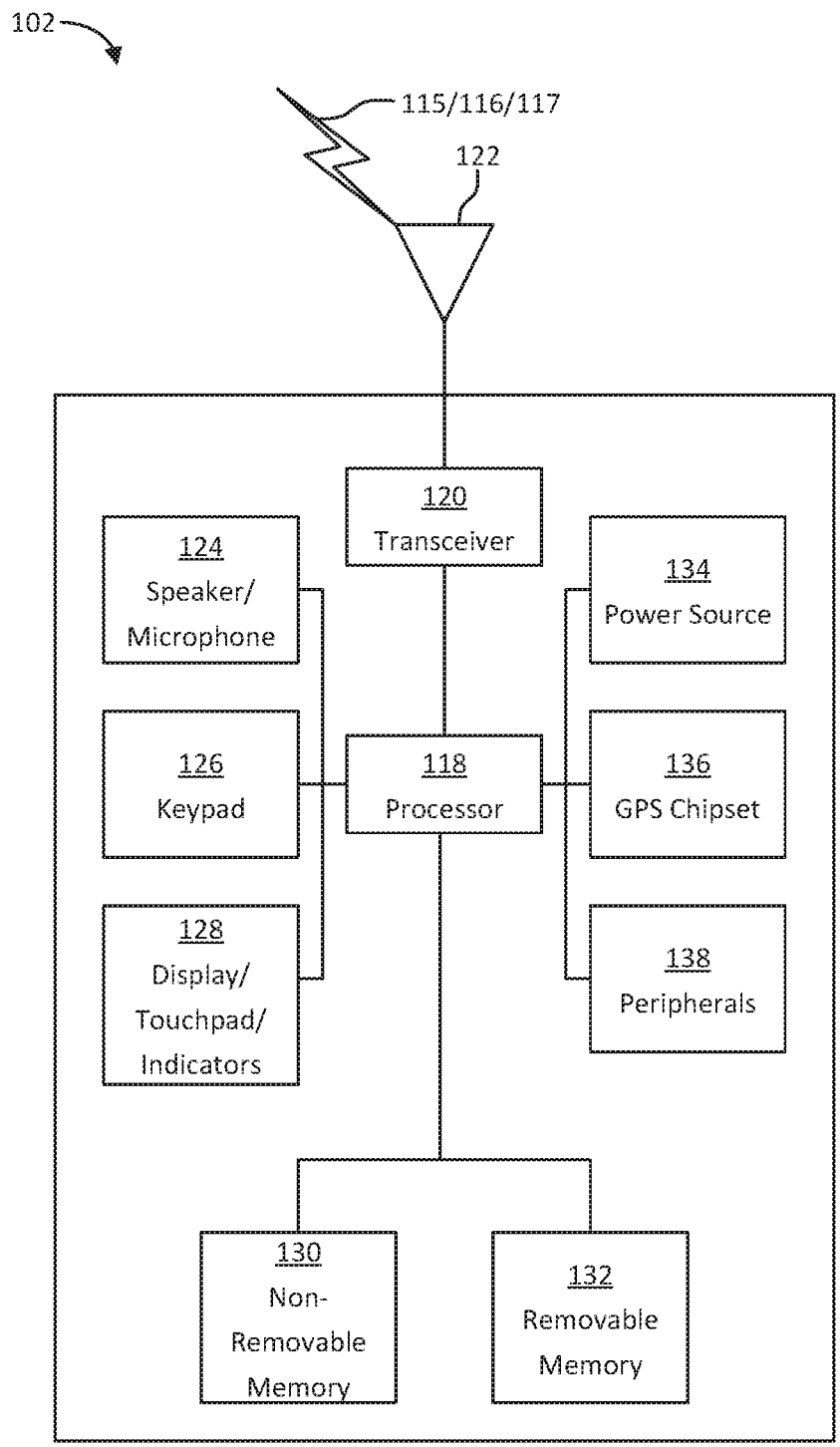

FIG. 9F is a block diagram of an example apparatus or device WTRU 102 that may be configured for wireless communications and operations in accordance with the systems, methods, and apparatuses that implement Uu based sidelink control for NR V2X, described herein, such as a WTRU 102 of FIG. 9A, FIG. 9B, FIG. 9C, FIG. 9D, or FIG. 9E, or FIG. 3-FIG. 7 (e.g., gNB 201, Tx UE 202, or Rx UE 203). As shown in FIG. 9F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 9F and may be an exemplary implementation that performs the disclosed systems and methods for Uu based sidelink control for NR V2X described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 9F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 9A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 9F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the Uu based sidelink control for NR V2X in some of the examples described herein are successful or unsuccessful, or otherwise indicate a status of Uu based sidelink control for NR V2X and associated components. The control lighting patterns, images, or colors on the display or indicators 128 may be reflective of the status of any of the method flows or components in the FIG.'s illustrated or discussed herein (e.g., FIG. 3-FIG. 7, etc.). Disclosed herein are messages and procedures of Uu based sidelink control for NR V2X. The messages and procedures may be extended to provide interface/API for users to request resources via an input source (e.g., speaker/microphone 124, keypad 126, or display/touchpad/indicators 128) and request, configure, or query Uu based sidelink control for NR V2X related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 9G:
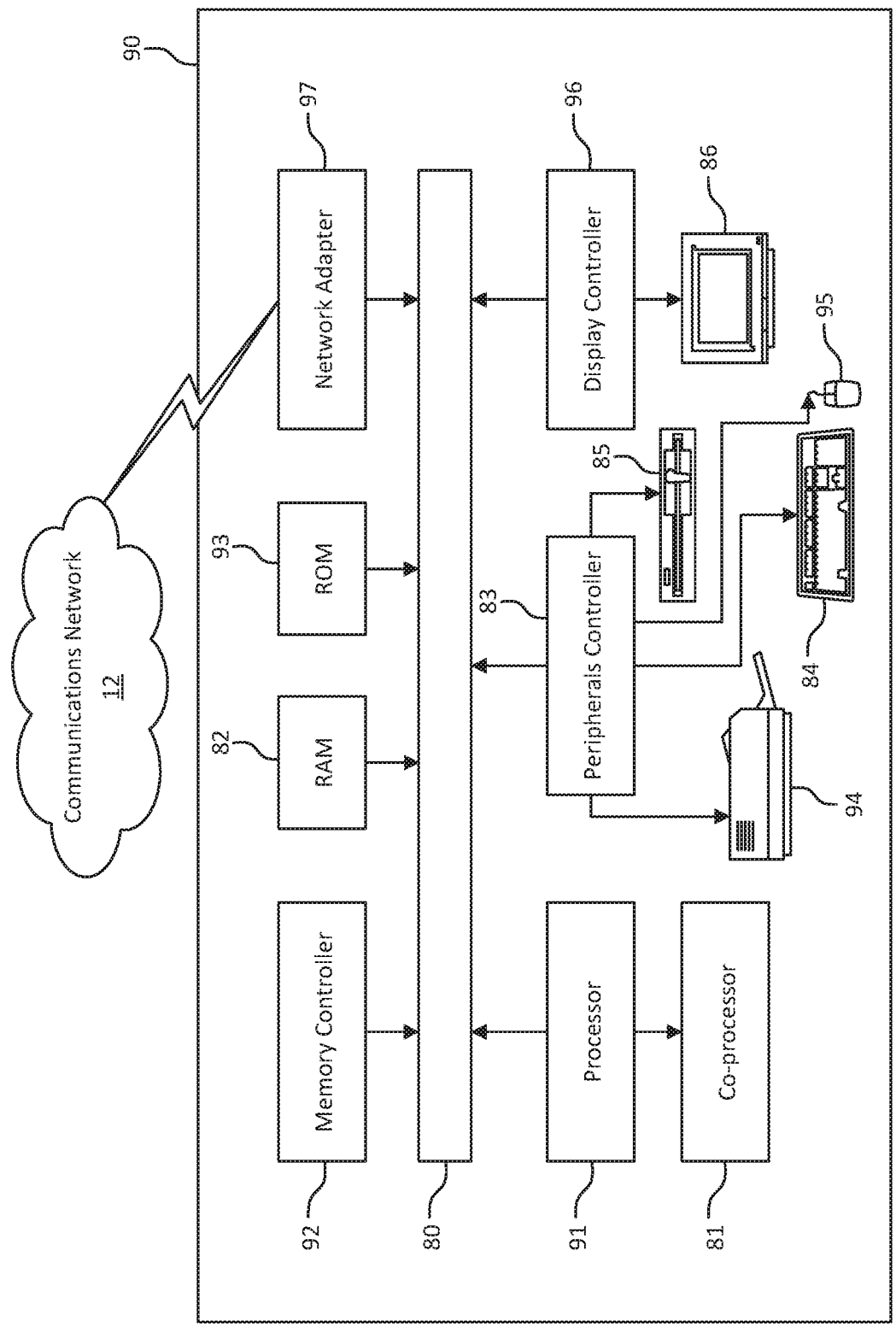

FIG. 9G is a block diagram of an exemplary computing system 90 in which one or more apparatuses of the communications networks illustrated in FIG. 9A, FIG. 9C, FIG. 9D and FIG. 9E as well as Uu based sidelink control for NR V2X, such as the systems and methods illustrated in FIG. 3, FIG. 4, FIG. 6, FIG. 7, and FIG. 10-FIG. 20 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for Uu based sidelink control for NR V2X, such as receiving HARQ feedback through Uu interface or groupcast transmission on a beam on sidelink.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions may be executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 9A, FIG. 9B, FIG. 9C, FIG. 9D, or FIG. 9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—Uu based sidelink control for NR V2X—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein. For example, when it is stated that transmit (Tx) UE 202 or receive (Rx) UE 203 may know the resources used for transmitting or receiving the data on the sidelink, the scenario of both Tx UE 202 and Rx UE 203 know the resources used for transmitting and receiving the data on the sidelink. Other combinations like this example are contemplated. In another example, when it is stated that a UE may be configured with one CORESET for monitoring the scheduling DCI for Tx UE 202 or Rx UE 203, the scenario is contemplated that UE may be configured with one CORESET for monitoring the scheduling DCI for Tx UE 202 and Rx UE 203. Other combinations are contemplated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). For example, the steps of FIG. 15A, FIG. 20, FIG. 21, or FIG. 22 may be interwoven in different combinations. As provided Tx UE may or may not rely on HARQ feedback to determine whether to perform retransmissions. Therefore, portions of FIG. 15A (and accompanying description) may not be integrated into FIG. 20 (and accompany description). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for managing Uu based sidelink control for NR V2X. A method, system, computer readable storage medium, or apparatus has means for obtaining scheduling DCI for initial transmission and retransmission through an interface from a base station; obtaining a unicast transmission sidelink from a Tx UE; and based on one or more of the aforementioned first two steps of obtaining scheduling or obtaining a unicast transmission sidelink, sending HARQ feedback to the Tx UE on sidelink. A method, system, computer readable storage medium, or apparatus has means for obtaining, from a base station, scheduling downlink control information for a first transmission, wherein the first transmission comprises an initial transmission or a retransmission; based on the obtaining of the scheduling downlink control information, sending the first transmission to a receiving user equipment, wherein the first transmission is transmitted via a sidelink; and receiving, based on the sending of the transmission, feedback from the receiving user equipment, wherein the feedback is transmitted via the sidelink. The apparatus may be a transmitting user equipment. The feedback may be HARQ, channel state information (CSI) feedback only, or HARQ+CSI feedback. A method, system, computer readable storage medium, or apparatus has means for forwarding the feedback to the base station, wherein the feedback is transmitted to the base station via a Uu interface. The scheduling downlink control information comprises distinct fields to distinguish scheduling for at least a combination of broadcast transmission, groupcast transmission, or unicast transmission. The scheduling downlink control information may be scrambled using different radio network temporary identifiers for broadcast transmission, groupcast transmission, or unicast transmission. The scheduling downlink control information may include: 1) a first indication of a first feedback resource allocation scheduled on the sidelink for the receiving user equipment transmitting the feedback to the apparatus, or a second indication of a second feedback resource allocation scheduled on a Uu interface for the apparatus transmitting the feedback to the base station. The initial transmission and the retransmission may be scheduled in a same slot as the feedback. All combinations in this paragraph (including the removal or addition of steps) are contemplated in a manner that is consistent with the other portions of the detailed description.

What is claimed is:

1. An apparatus that performs wireless communication, the apparatus comprising:
   a processor; and
   a memory coupled with the processor, the memory comprising executable instructions stored thereon that when executed by the processor cause the processor to effectuate operations comprising:
   receiving a radio resource control (RRC) message from a base station, the RRC message comprising an indication of multiple sidelink resource pools, an indication of a physical uplink control channel (PUCCH) resource for reporting sidelink hybrid automatic repeat request (HARQ) feedback information, and an indication of a sidelink radio network temporary identifier (SL-RNTI);

obtaining, from the base station, scheduling downlink control information for a first transmission using the SL-RNTI, the scheduling downlink control information indicating an index of a sidelink resource pool of the multiple sidelink resource pools to be used for the first transmission wherein the first transmission comprises an initial transmission or a retransmission, wherein the scheduling downlink control information comprises a field indicating timing information for transmission of HARQ feedback for the first transmission to the base station, the timing information being relative to a time when the apparatus receives the HARQ feedback from a receiving user equipment;

based on the obtaining of the scheduling downlink control information, sending the first transmission to the receiving user equipment, wherein the first transmission is transmitted via a sidelink;

receiving, based on the sending of the transmission, the HARQ feedback for the first transmission from the receiving user equipment, wherein the HARQ feedback is received from the receiving user equipment via the sidelink; and sending the HARQ feedback to the base station, wherein the HARQ feedback is sent to the base station via a Uu interface using the PUCCH resource indicated in the RRC message and in accordance with the timing information indicated in the scheduling downlink control information.

2. The apparatus of claim 1, wherein the apparatus is a transmitting user equipment.

3. The apparatus of claim 1, wherein the scheduling downlink control information is used for scheduling physical sidelink control channel (PSCCH) or physical sidelink shared channel (PSSCH).

4. The apparatus of claim 1, wherein the scheduling downlink control information is scrambled using different radio network temporary identifiers for broadcast transmission, groupcast transmission, or unicast transmission.

5. The apparatus of claim 1, wherein the scheduling downlink control information comprises:
a first indication of a first feedback resource allocation scheduled on the sidelink for the receiving user equipment transmitting the feedback to the apparatus, and
a second indication of a second feedback resource allocation scheduled on a Uu interface for the apparatus transmitting the feedback to the base station.

6. The apparatus of claim 1, wherein the initial transmission and the retransmission are scheduled in a same slot as the feedback.

7. A method comprising:
configuring an apparatus with multiple resource pools through radio resource control signaling;
receiving a radio resource control (RRC) message from a base station, the RRC message comprising an indication of multiple sidelink resource pools, an indication of a physical uplink control channel (PUCCH) resource for reporting sidelink hybrid automatic repeat request (HARQ) feedback information, and an indication of a sidelink radio network temporary identifier (SL-RNTI);
obtaining, from the base station, scheduling downlink control information for a first transmission using the SL-RNTI, the scheduling downlink control information indicating an index of a resource pool of the multiple sidelink resource pools to be used for the first transmission, wherein the first transmission comprises an initial transmission or a retransmission, wherein the scheduling downlink control information comprises a field indicating timing information for transmission of HARQ feedback for the first transmission to the base station, the timing information being relative to a time when the apparatus receives the HARQ feedback from a receiving user equipment;

based on the obtaining of the scheduling downlink control information, sending, by the apparatus, the first transmission to the receiving user equipment, wherein the first transmission is transmitted via a sidelink;

receiving, based on the sending of the transmission, the HARQ feedback for the first transmission from the receiving user equipment, wherein the HARQ feedback is is received from the receiving user equipment via the sidelink; and sending the HARQ feedback to the base station, wherein the HARQ feedback is sent to the base station via a Uu interface using the PUCCH resource indicated in the RRC message and in accordance with the timing information indicated in the scheduling downlink control information.

8. The method of claim 7, wherein the scheduling downlink control information comprises distinct fields to distinguish scheduling for at least a combination of broadcast transmission, groupcast transmission, or unicast transmission.

9. The method of claim 7, wherein the scheduling downlink control information is scrambled using different radio network temporary identifiers for broadcast transmission, groupcast transmission, or unicast transmission.

10. The method of claim 7, wherein the scheduling downlink control information comprises:
a first indication of a first feedback resource allocation scheduled on the sidelink for the receiving user equipment transmitting the feedback, and
a second indication of a second feedback resource allocation scheduled on a Uu interface to transmit the feedback to the base station.

11. The method of claim 7, wherein the initial transmission and the retransmission are scheduled in a same slot as the feedback.

12. A computer-readable storage medium storing computer executable instructions that when executed by a computing device cause said computing device to effectuate operations comprising:
receiving a radio resource control (RRC) message from a base station, the RRC message comprising an indication of multiple sidelink resource pools, an indication of a physical uplink control channel (PUCCH) resource for reporting sidelink hybrid automatic repeat request (HARQ) feedback information, and an indication of a sidelink radio network temporary identifier (SL-RNTI);
obtaining, from the base station, scheduling downlink control information for a first transmission using the SL-RNTI, the scheduling downlink control information indicating an index of a sidelink resource pool of the multiple sidelink resource pools to be used for the first transmission wherein the first transmission comprises an initial transmission or a retransmission, wherein the scheduling downlink control information comprises a field indicating timing information for transmission of HARQ feedback for the first transmission to the base station, the timing information being relative to a time when the apparatus receives the HARQ feedback from a receiving user equipment;

receiving, based on the sending of the transmission, the HARQ feedback for the first transmission from the receiving user equipment, wherein the HARQ feedback is received from the receiving user equipment via the sidelink; and sending the HARQ feedback to the base station, wherein the HARQ feedback is sent to the base station via a Uu interface using the PUCCH resource indicated in the RRC message and in accordance with the timing information indicated in the scheduling downlink control information.

13. The computer readable storage medium of claim 12, wherein the scheduling downlink control information comprises distinct fields to distinguish scheduling for at least a combination of broadcast transmission, groupcast transmission, or unicast transmission.

14. The computer readable storage medium of claim 12, wherein the scheduling downlink control information is scrambled using different radio network temporary identifiers for broadcast transmission, groupcast transmission, or unicast transmission.

15. The computer readable storage medium of claim 12, wherein the scheduling downlink control information comprises:
- a first indication of a first feedback resource allocation scheduled on the sidelink for the receiving user equipment transmitting the feedback, and
- a second indication of a second feedback resource allocation scheduled on a Uu interface to transmit the feedback to the base station.

16. The computer readable storage medium of claim 12, wherein the initial transmission and the retransmission are scheduled in a same slot as the feedback.

* * * * *